United States Patent
Zhang et al.

(10) Patent No.: US 10,422,924 B2
(45) Date of Patent: Sep. 24, 2019

(54) STRATIGRAPHIC AND STRUCTURAL INTERPRETATION OF DEVIATED AND HORIZONTAL WELLBORES

(71) Applicant: Schlumberger Technology Corporation, Sugar Land, TX (US)

(72) Inventors: Tuanfeng Zhang, Lexington, MA (US); Neil F. Hurley, Boston, MA (US); Ridvan Akkurt, Lexington, MA (US); David McCormick, Acton, MA (US); Shu Zhang, Riverside, CA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 605 days.

(21) Appl. No.: 14/536,289

(22) Filed: Nov. 7, 2014

(65) Prior Publication Data

US 2015/0134255 A1    May 14, 2015

Related U.S. Application Data

(60) Provisional application No. 61/901,761, filed on Nov. 8, 2013.

(51) Int. Cl.
| | |
|---|---|
| *G01V 99/00* | (2009.01) |
| *G01V 1/40* | (2006.01) |
| *G01V 5/04* | (2006.01) |
| *G01V 9/00* | (2006.01) |
| *E21B 7/04* | (2006.01) |
| *G01V 1/28* | (2006.01) |

(Continued)

(52) U.S. Cl.
CPC .............. *G01V 99/005* (2013.01); *E21B 7/04* (2013.01); *G01V 1/40* (2013.01); *G01V 5/04* (2013.01); *G01V 9/00* (2013.01); *G01V 1/282* (2013.01); *G01V 1/42* (2013.01); *G01V 3/38* (2013.01); *G01V 2210/64* (2013.01)

(58) Field of Classification Search
CPC combination set(s) only.
See application file for complete search history.

(56) References Cited

U.S. PATENT DOCUMENTS

| | | | |
|---|---|---|---|
| 7,359,845 | B2 | 4/2008 | Kelfoun |
| 8,577,660 | B2 | 11/2013 | Wendt et al. |

(Continued)

FOREIGN PATENT DOCUMENTS

| | | |
|---|---|---|
| CN | 1116440 A | 2/1996 |
| CN | 101802649 A | 8/2010 |

(Continued)

OTHER PUBLICATIONS

Stoner, Michael. Technical geosteering finds the sweet spot. E&P Magazine, Nov. 2007, pp. 71-77.*

(Continued)

*Primary Examiner* — Charles D Garber
*Assistant Examiner* — Alia Sabur

(57) ABSTRACT

Methods of generating structural models of highly deviated or horizontal wells may be generated from the measurement of true stratigraphic thickness in three dimensions (TST3D). In one aspect, methods may include generating a structural model from one or more deviation surveys of a horizontal well, one or more single channel log measurements, and a three-dimensional reference surface.

22 Claims, 60 Drawing Sheets

(51) Int. Cl.
*G01V 3/38* (2006.01)
*G01V 1/42* (2006.01)

(56) References Cited

U.S. PATENT DOCUMENTS

| | | |
|---|---|---|
| 2006/0074561 A1 | 4/2006 | Xia et al. |
| 2006/0161406 A1 | 7/2006 | Kelfoun et al. |
| 2006/0293872 A1 | 12/2006 | Zamora et al. |
| 2007/0282774 A1* | 12/2007 | Bouzas .................. G06F 8/10 706/45 |
| 2009/0187391 A1 | 7/2009 | Wendt et al. |
| 2011/0282634 A1 | 11/2011 | Marza et al. |
| 2013/0080059 A1 | 3/2013 | Kumar et al. |
| 2013/0140088 A1* | 6/2013 | Williams .................. E21B 7/04 175/45 |

FOREIGN PATENT DOCUMENTS

| | | |
|---|---|---|
| CN | 102322256 A | 1/2012 |
| CN | 102425374 A | 4/2012 |
| CN | 102713683 A | 10/2012 |
| CN | 103492659 A | 1/2014 |
| CN | 103774989 A | 5/2014 |
| CN | 103993829 A | 8/2014 |
| CN | 103046868 B | 10/2014 |

OTHER PUBLICATIONS

Berg, Charles and Newson, Andrew. Geosteering Using True Stratigraphic Thickness. Unconventional Resources Technology Conference, Denver, Colorado, Aug. 12-14, 2013: pp. 1196-1205.*

Berg, "Calculating true stratigraphic and true vertical thickness", 2012, 35 pages.

Berg, et al., "Using structural dip modeling to determine structure and stratigraphic position", AAPG Convention, Denver, Colorado, Search and Discovery Article #40444, Jun. 7-10, 2009, 9 pages.

Hurley, et al., "Using Borehole Images for Target-Zone Evaluation in Horizontal Wells", AAPG Bulletin, vol. 78, Issue 2, Feb. 1994, pp. 238-246.

Loermans, et al., "On the quest for depth: SPWLA 40th Annual Logging Symposium Transactions", Oslo, Norway, Paper B, 1999, 6 pages.

Newson, et al., "True stratigraphic thickness (TST); An important elements in the exploration for foothills oil and gas reserves", CSPG CSEG Convention, 2007, 2 pages.

Ogochukwu, et al., "Multi-well real-time structural modeling and horizontal well placement: An innovative workflow for shale gas reservoirs:", SPE Preprint 148609, Presented at the SPE Eastern, Regional Meeting, Columbus, Ohio, Aug. 17-19, 2011, 13 pages.

Griffiths, "Well Placement Fundamentals", ISBN-10: 0978853040, Schlumberger, 2008, pp. 69-74.

Tearpock, et al., "Applied Subsurface Geological Mapping with Structural Methods", Prentice Hall, 2 edition, ISBN-10: 0130919489, Aug. 26, 2002, p. 87, p. 88, p. 95, p. 100 and p. 103.

International Search Report and Written Opinion issued in PCT/US2014/064553 dated Feb. 24, 2015, 10 pages.

International Preliminary Report on Patentability of International Application No. PCT/US2014/064553, dated May 19, 2016, pp. 1-7.

English Translation of First Office Action of Chinese Patent Application No. 201480072683.X dated Mar. 24, 2017, pp. 1-5.

* cited by examiner

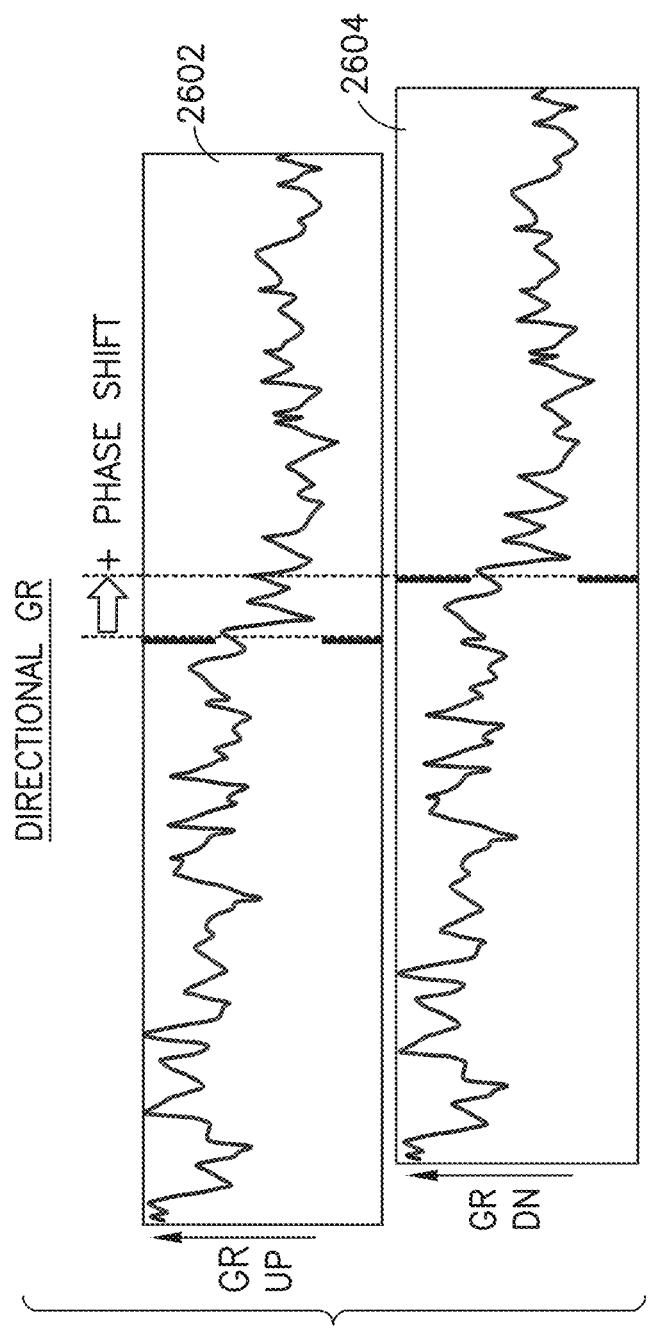

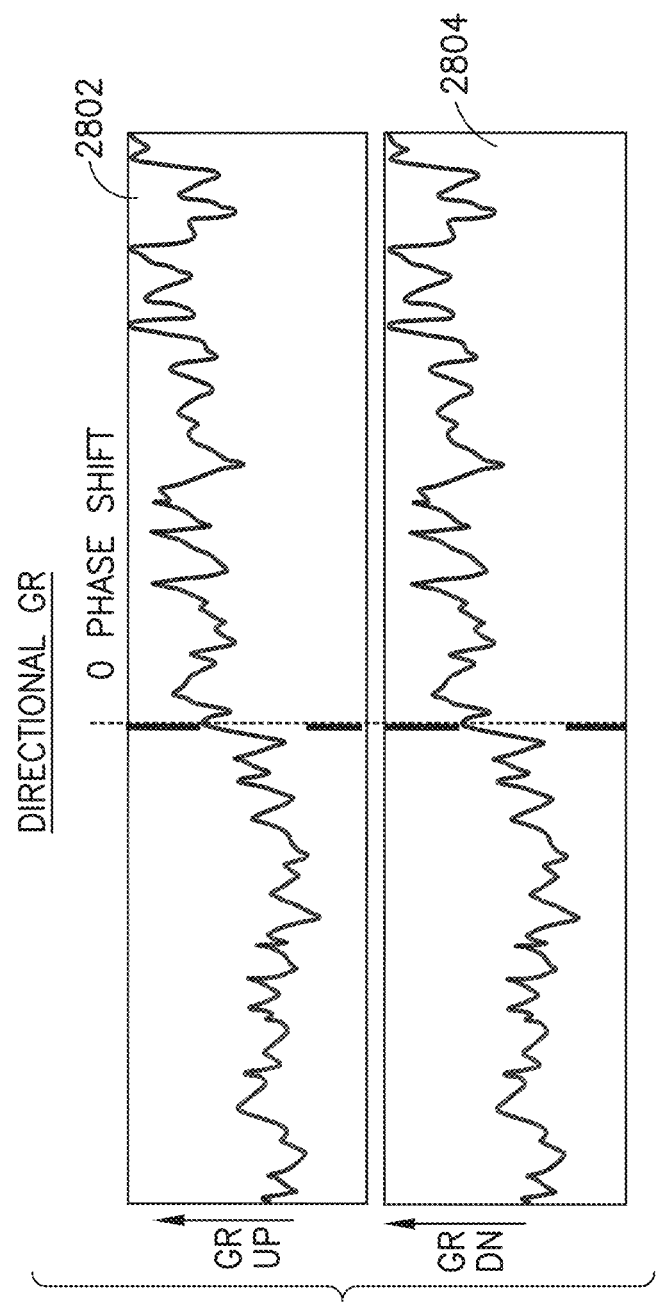

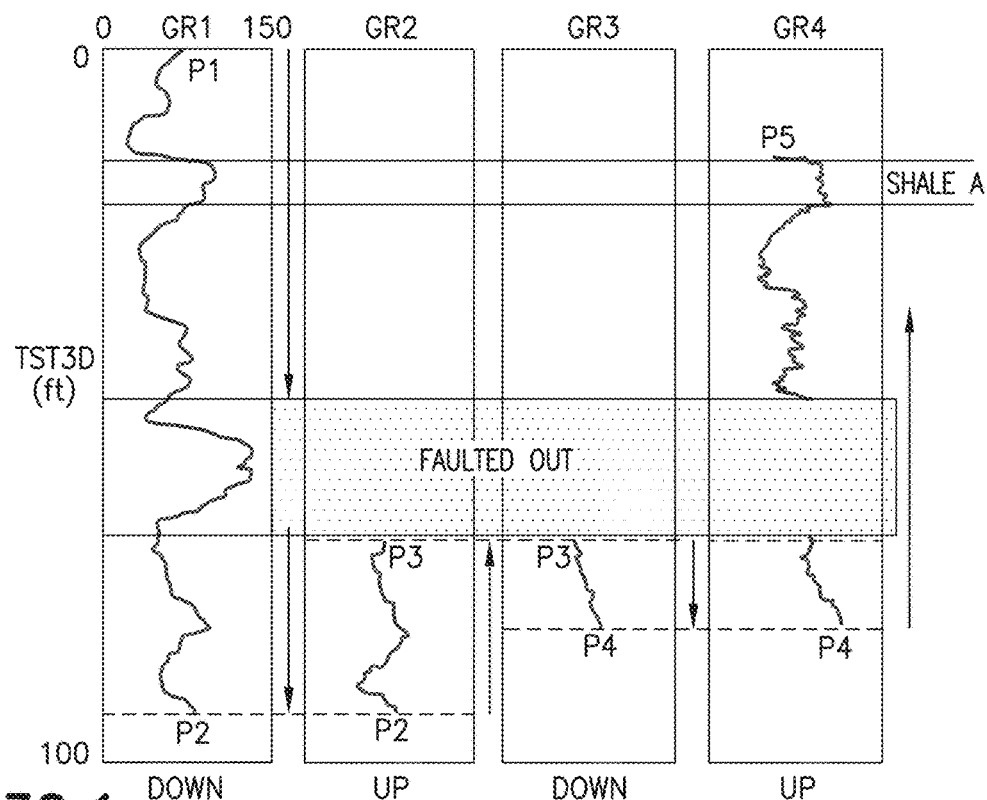
FIG.30.1
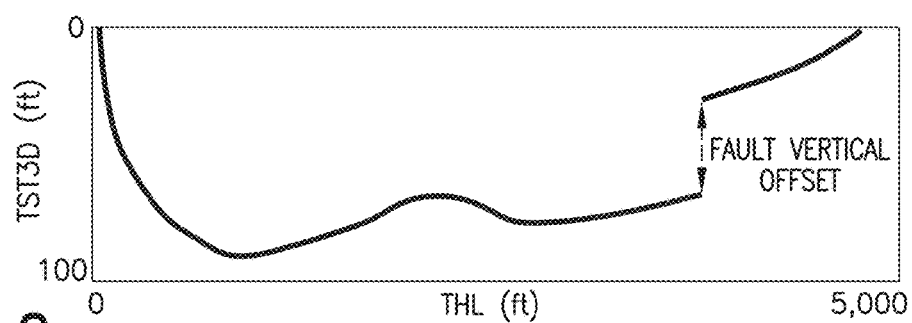
FIG.30.2

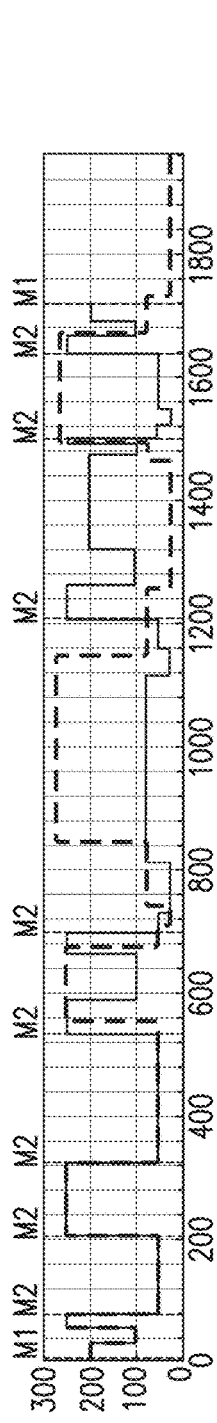
FIG.31.1
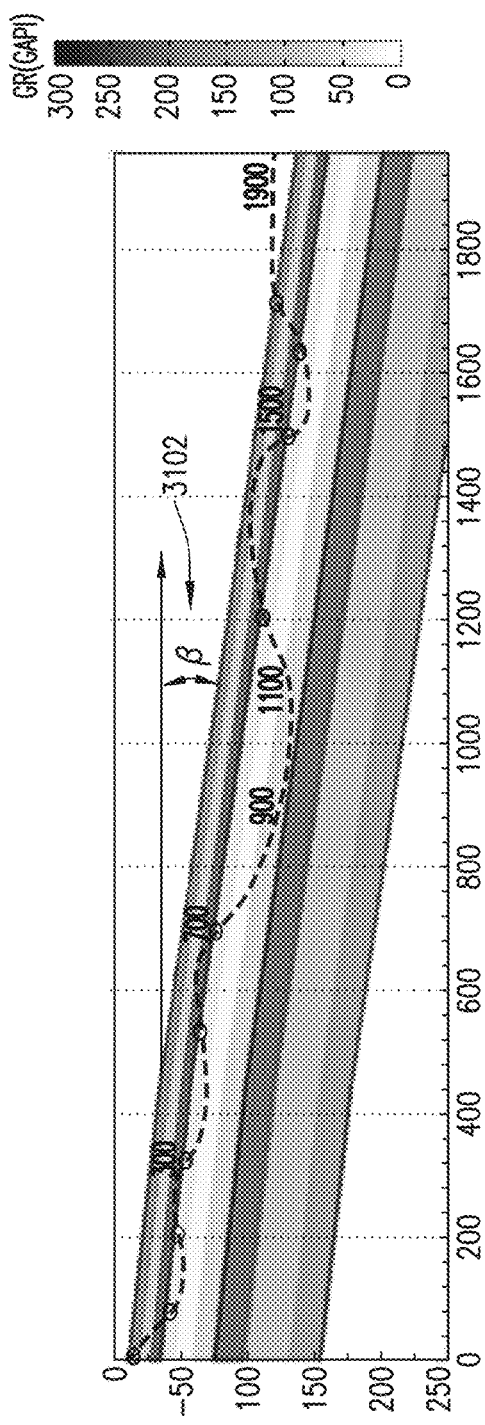
FIG.31.2
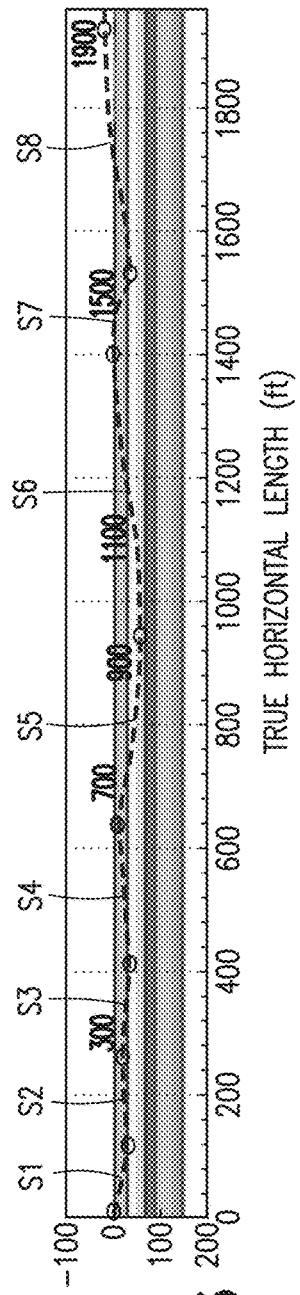
FIG.31.3

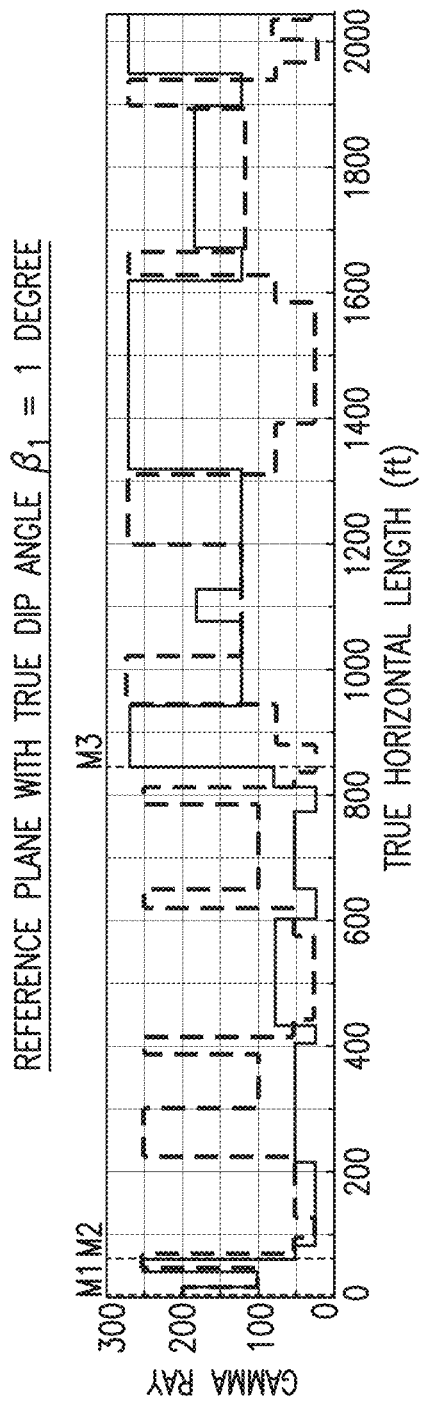
FIG.37.1

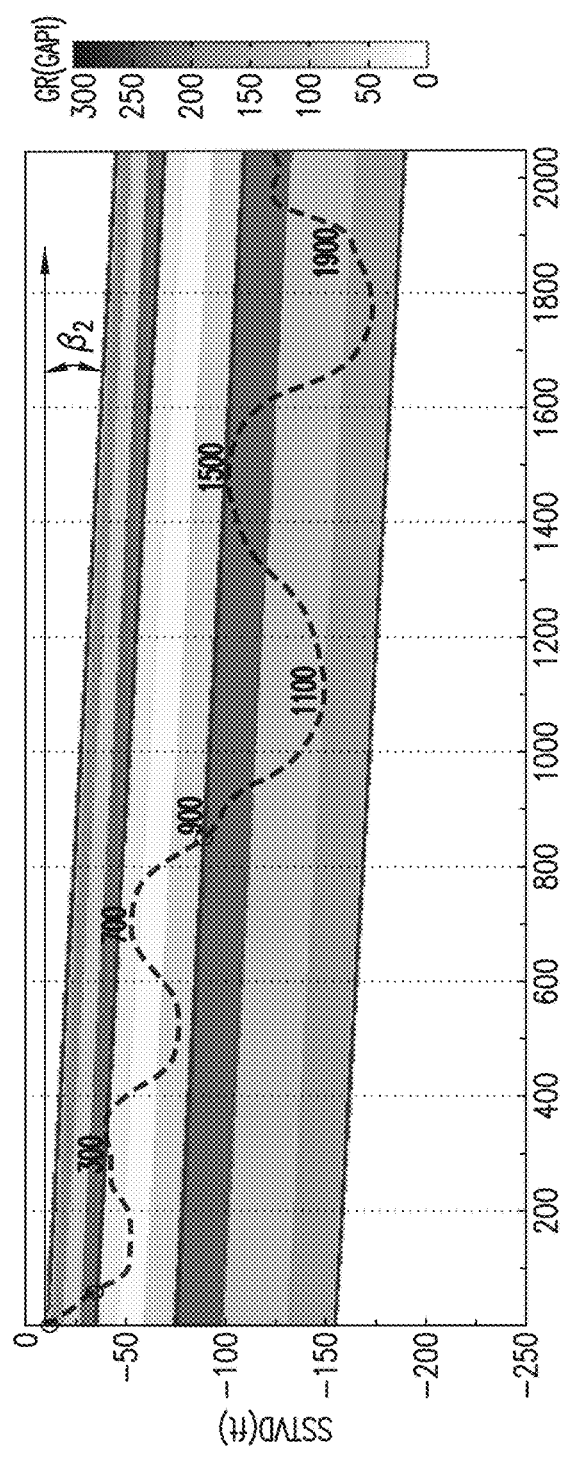
FIG.37.2
FIG.37.3

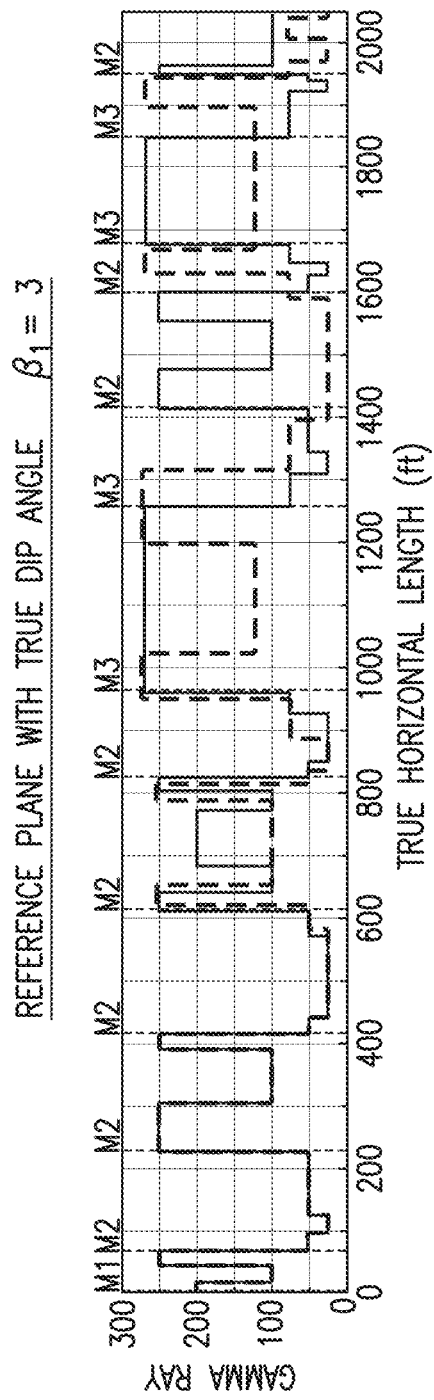
FIG.39.1

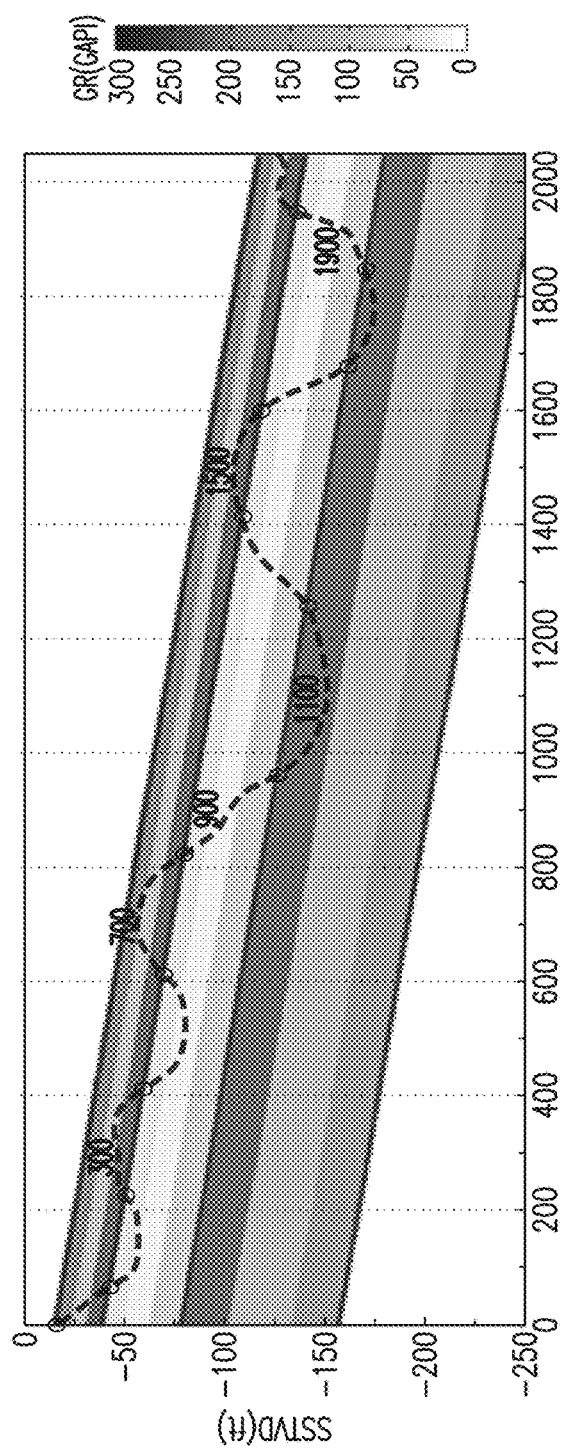
FIG.39.2
FIG.39.3

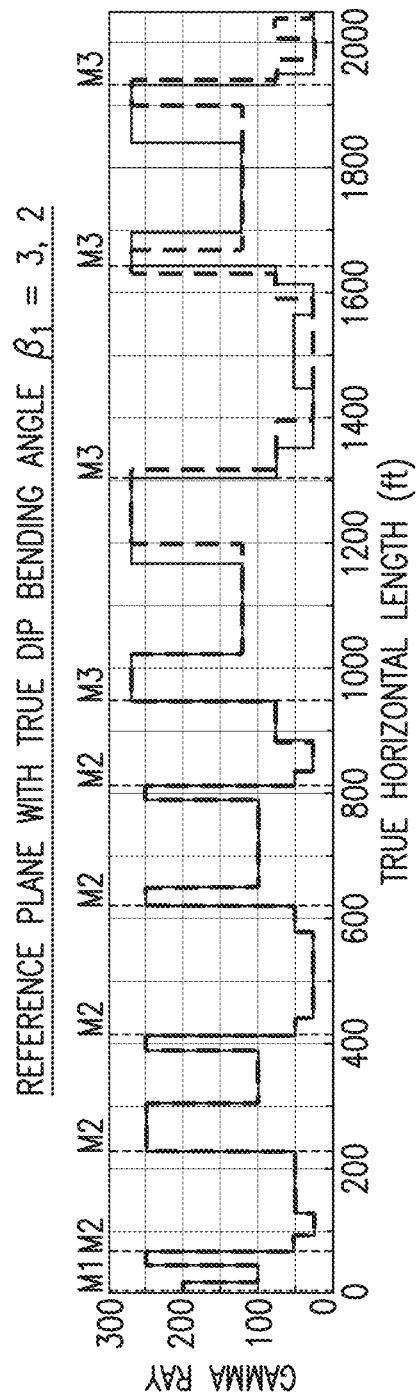
FIG.42.1

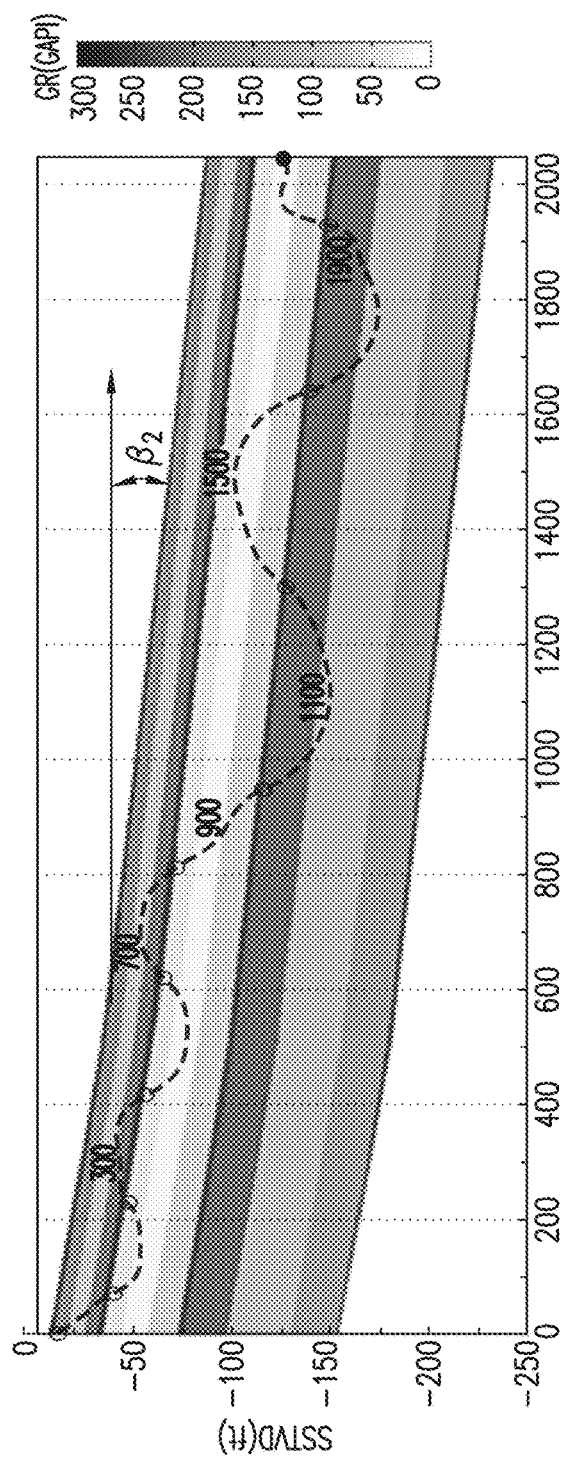
FIG. 42.2
FIG. 42.3

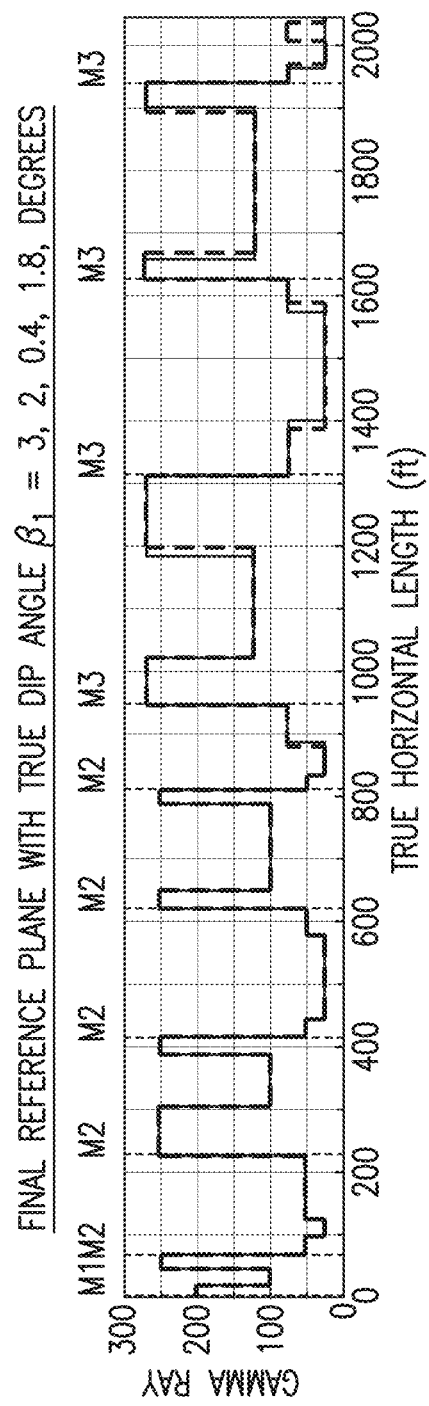
FIG.44.1

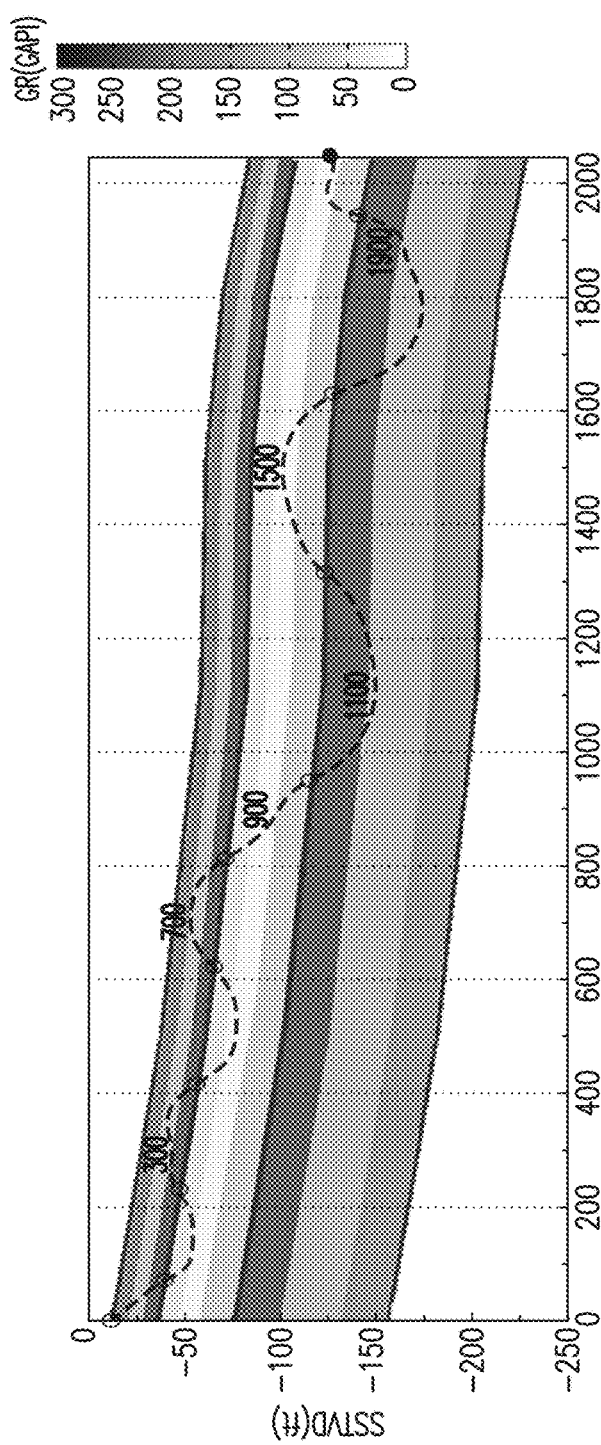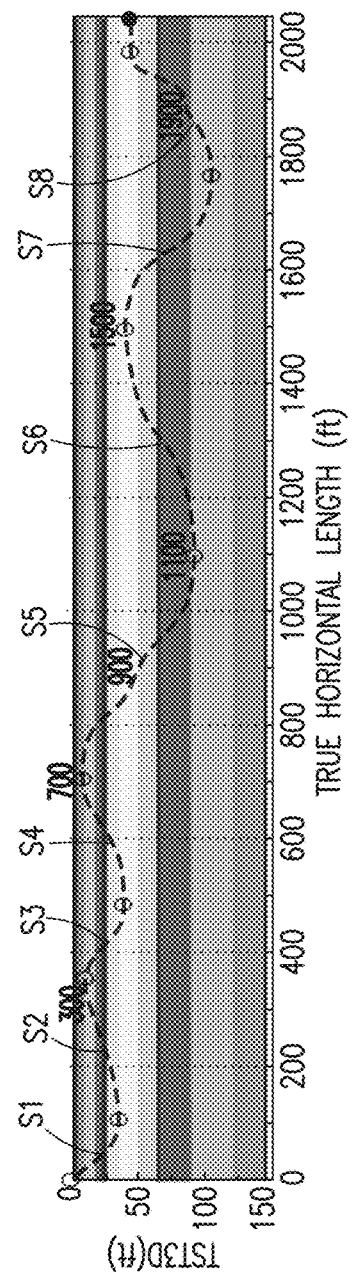
FIG.44.2
FIG.44.3

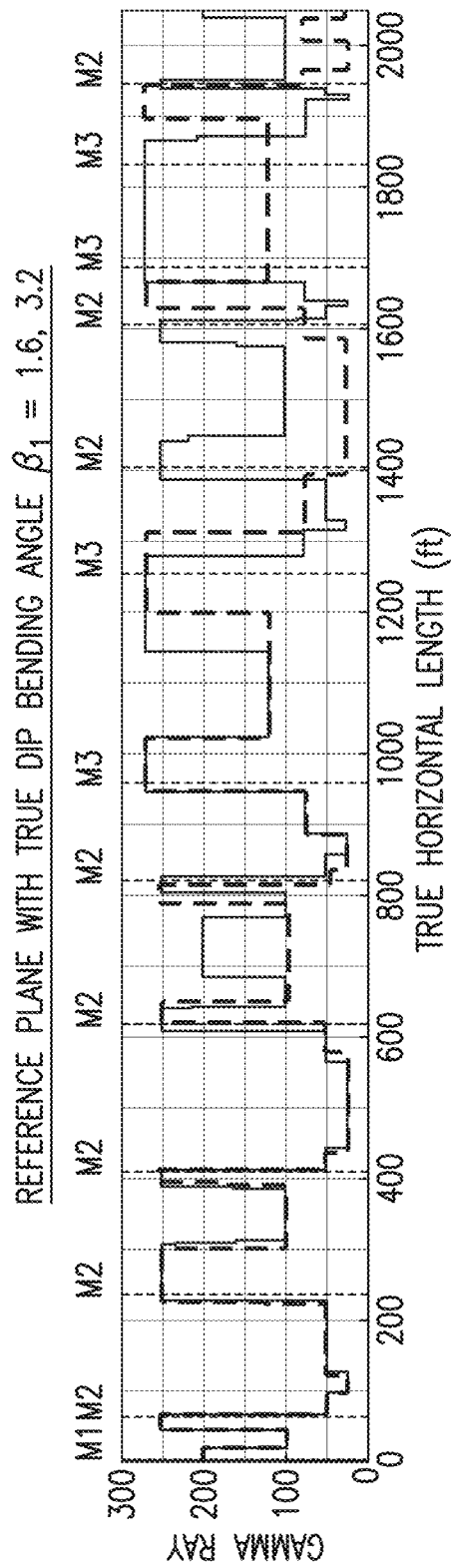
FIG.48.1

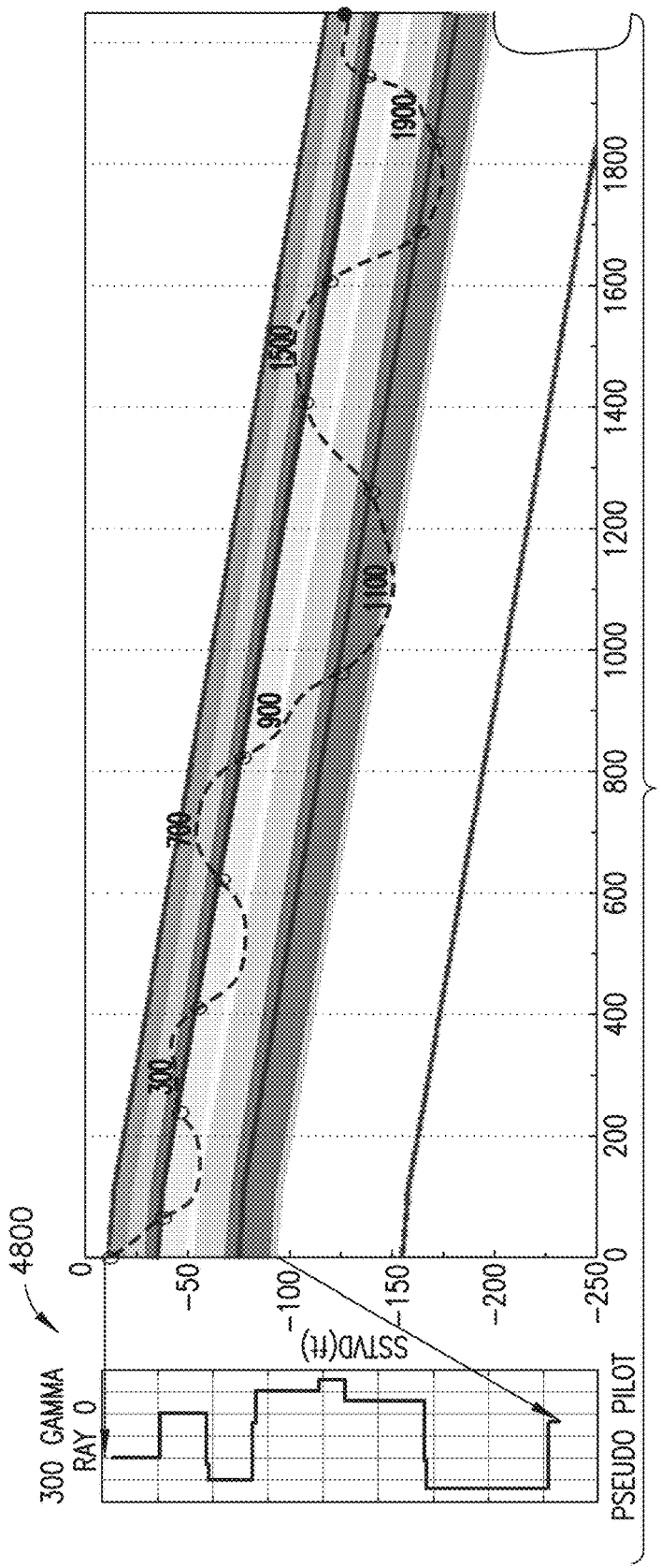
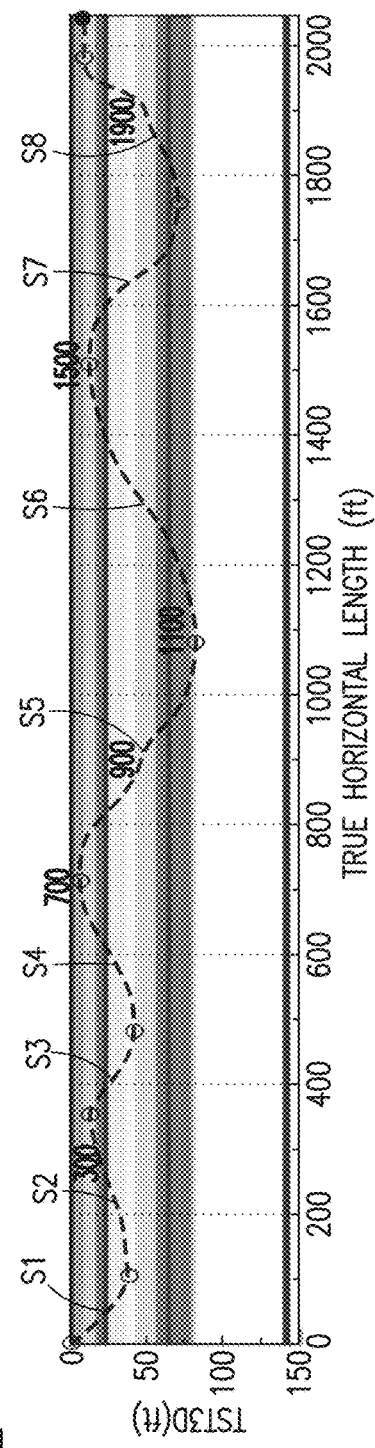
FIG. 48.2
FIG. 48.3

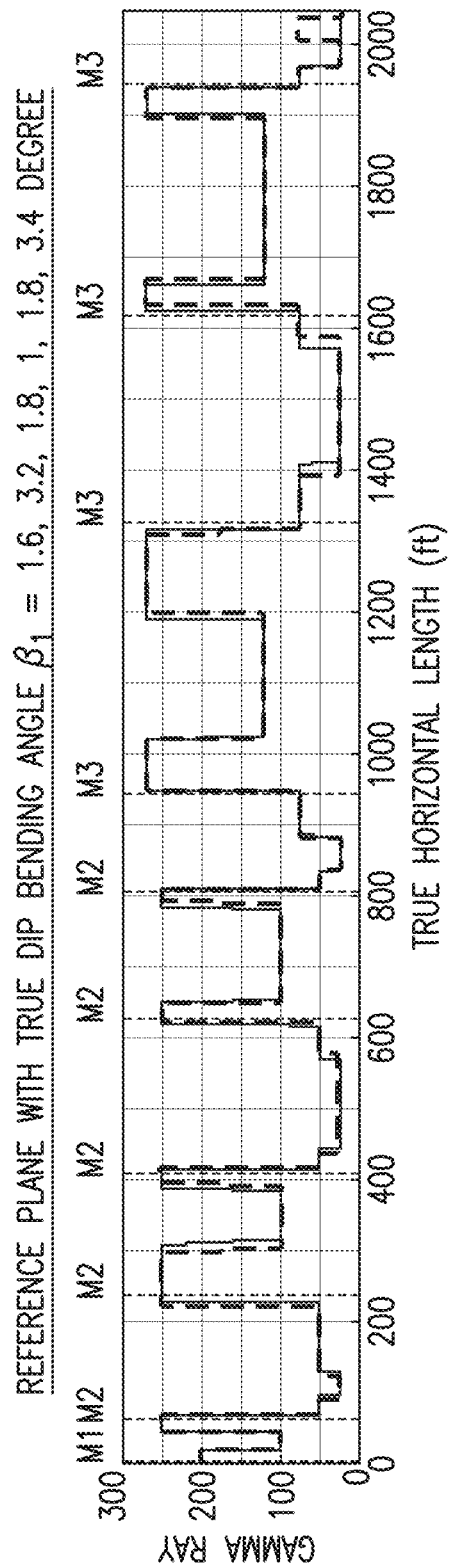
FIG. 49.1

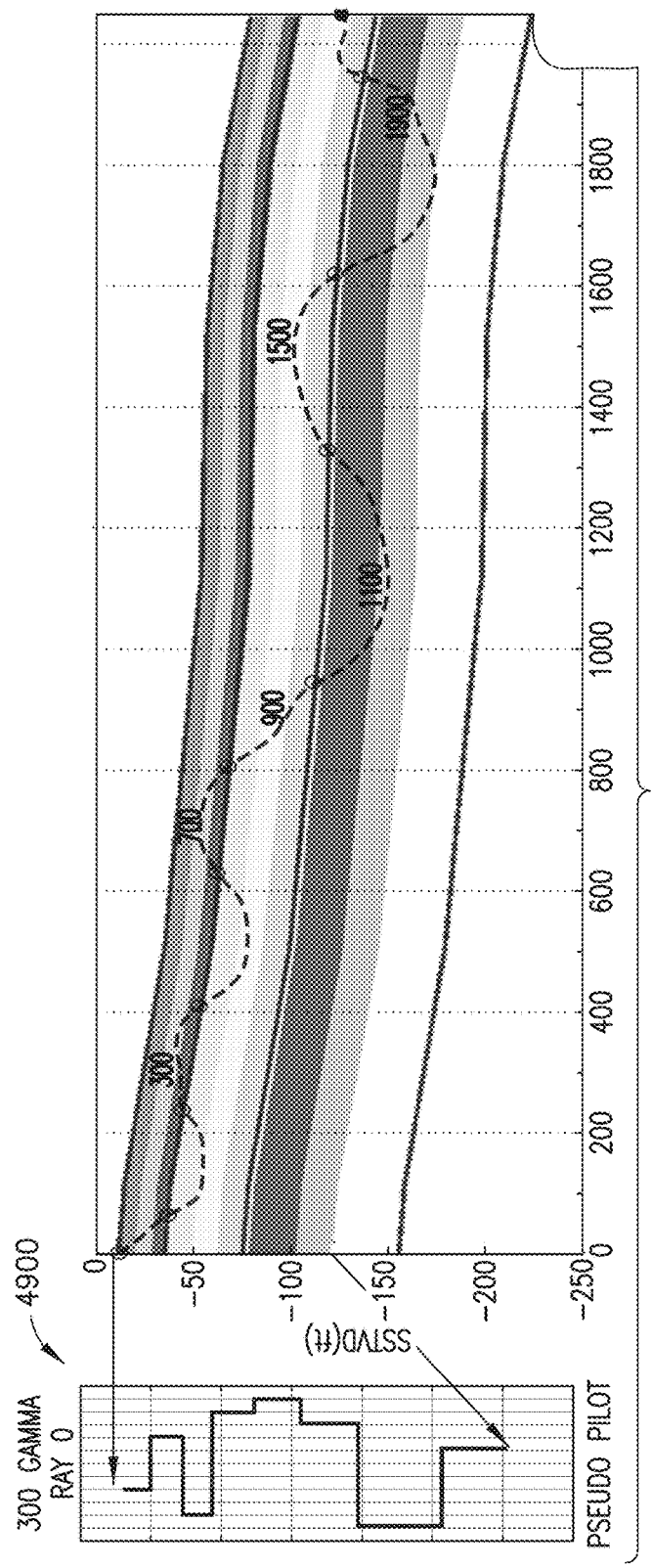
FIG.49.2
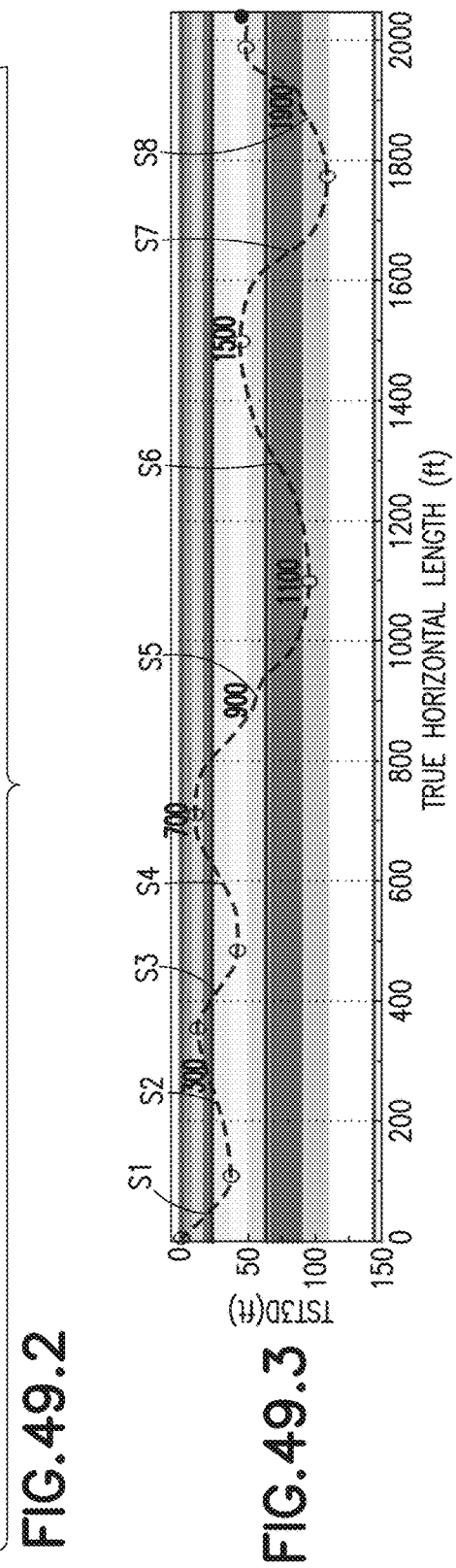
FIG.49.3

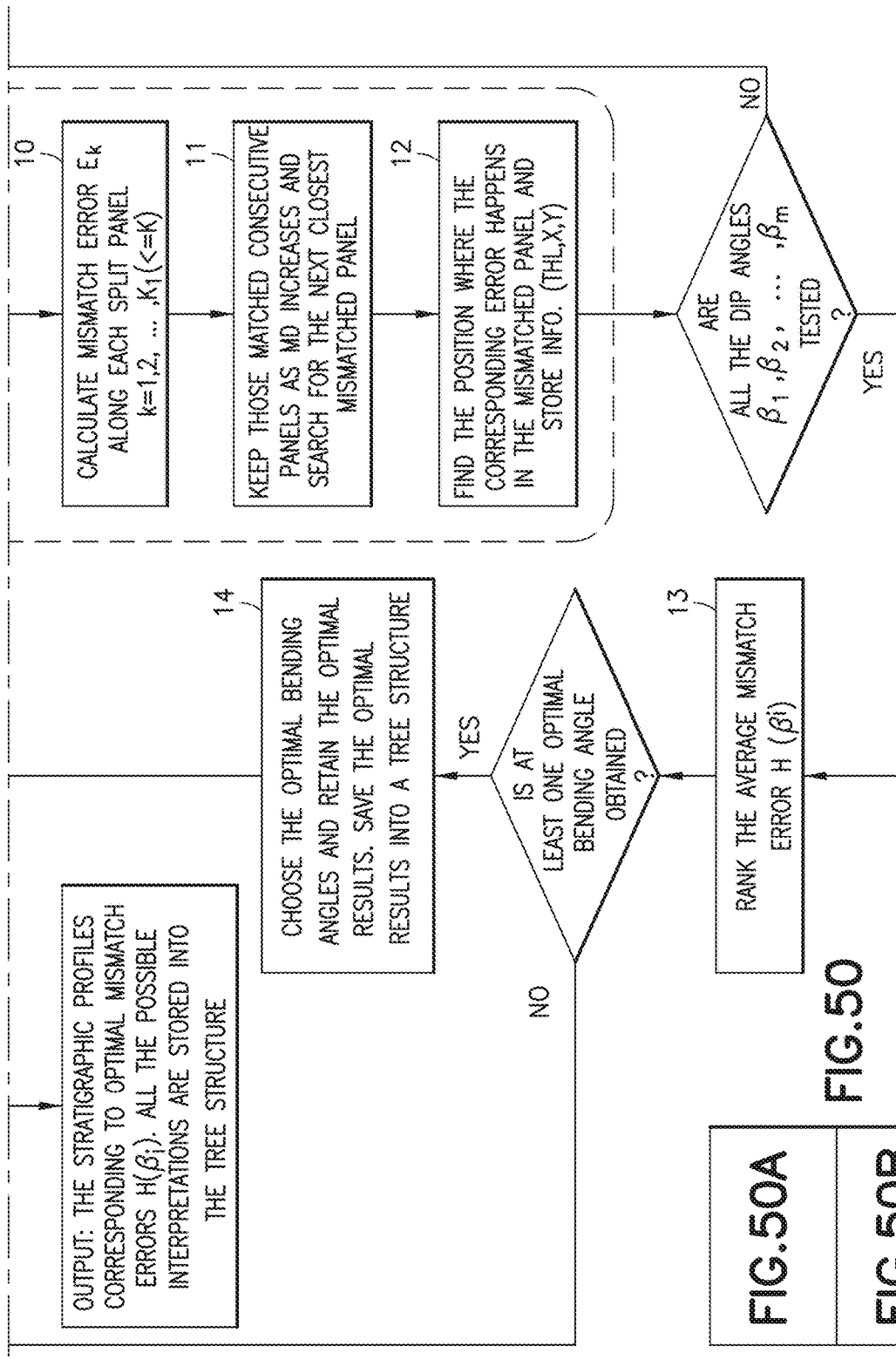

STRATIGRAPHIC AND STRUCTURAL INTERPRETATION OF DEVIATED AND HORIZONTAL WELLBORES

CROSS REFERENCE TO RELATED APPLICATIONS

This application claims priority to U.S. Provisional Patent Application No. 61/901,761, filed Nov. 8, 2013, the entire disclosure of which is hereby expressly incorporated by reference herein.

BACKGROUND

In drilling operations, wellbores are generated in subsurface rock formations for purposes that include the extraction of resources from subterranean reservoirs. Drilling techniques may be varied in some settings to create deviated wellbores to place the wellbore within a particular region, or between stratigraphic layers and other features present within the formation. In directional drilling, for example, a wellbore may exhibit a vertical trajectory initially and, at a later depth, wellbore trajectory may be deviated using one or more types of directional drilling tools and procedures.

Deviated and horizontal wells produced from directional drilling may be useful in some applications to enhance the development of unconventional reservoirs, particularly when combined with enhanced oil recovery techniques such as hydraulic fracturing. However, structural interpretation of deviated and horizontal wells may be challenging in heterogeneous formations containing varying stratigraphic composition, layering, and bed orientation, because a wellbore may pass through the same stratigraphic layer multiple times, creating difficulty in aligning and correlating measurement signatures in data acquired from the formation.

Proper characterization of the formation using data generated from various downhole tools is an important factor in guiding well placement into a given zone of interest. The selected wellbore path for directional drilling may be predetermined in some cases based on interpretation of the 3D geometry of the stratigraphic layering of the subsurface formations, prior to initiation of drilling operations. In other drilling methods, such as logging-while-drilling (LWD) and geosteering, formation characterization may occur during the excavation of a wellbore, or shortly thereafter, through the use of tools integrated into a bottomhole assembly or along a drillstring. LWD may have advantages in some scenarios, particularly when there is concern that formation properties will be altered by the invasion of wellbore fluids or where the use of wireline tools may be difficult.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In an embodiment, a method for stratigraphic and structural modeling of a wellbore is disclosed. The method comprises: obtaining at least one deviation survey from a wellbore; defining a reference surface; calculating a true stratigraphic thickness in three dimensions using a shortest distance in three dimensions between the reference surface and any point along a wellbore path described by a formation measurement; and generating curtain sections and three dimensional stratigraphic and structural models using the computed true stratigraphic thickness in three dimensions.

In other embodiments a method is disclosed comprising obtaining at least one deviation survey from a wellbore; defining a reference surface within a subterranean formation; calculating a true stratigraphic thickness in three dimensions using a shortest distance in three dimensions between the reference surface and any point along a wellbore path described by the at least one deviation survey; generating a three dimensional stratigraphic and structural model using the computed true stratigraphic thickness in three dimensions; determining whether the generated three dimensional model fits the wellbore path described by the at least one deviation survey; and, if fit is unsatisfactory, defining a new reference surface and repeating steps (c) and (d) to generate a subsequent three dimensional stratigraphic and structural model.

In other embodiments, a method is disclosed comprising obtaining at least one deviation survey from a wellbore; obtaining at least one formation measurement; and defining a reference surface using at least one formation measurement. The method further comprises performing the steps of computing a true stratigraphic thickness in three dimensions using a shortest distance in three dimensions between the reference surface and any point along a wellbore path described by the at least one deviation survey; generating a three dimensional stratigraphic and structural model using the computed true stratigraphic thickness in three dimensions; and determining whether the generated three dimensional model fits the wellbore path described by the at least one single channel log measurement.

Other aspects and advantages of the invention will be apparent from the following description and the appended claims.

BRIEF DESCRIPTION OF DRAWINGS

The subject disclosure is further described in the detailed description which follows, in reference to the noted plurality of drawings by way of non-limiting examples of the subject disclosure, in which like reference numerals represent similar parts throughout the several views of the drawings.

FIGS. 26 and 26A are a schematic diagram illustrating an apparent positive phase shift between up and down facing GR logs in a borehole penetrating a stratigraphic section in accordance with embodiments disclosed herein;

FIGS. 28 and 28A are a schematic diagram of a simultaneous baseline shift between up and down facing GR logs in accordance with embodiments disclosed herein;

FIGS. 30.1 and 30.2 illustrate an updated structural model and recalculated TST3D panels for GR logs in accordance with embodiments disclosed herein;

FIGS. 31.1-31.3 are an illustration of one phase of an automated process using TST3D to define a wellbore in accordance with embodiment disclosed herein;

FIGS. 37.1-37.3 depicts a series of graphs produced from a first iteration of an automated interpretation process in accordance with embodiments disclosed herein;

FIGS. 39.1-39.3 depict a series of graphs showing the result of an intermediate step in the fitting of a selected GR curtain section using data derived from forward-modeled GR logs in accordance with embodiments disclosed herein;

FIGS. 42.1-42.3 depict a series of graphs describing updated GR curtain section models after an iteration of an automated interpretation process in accordance with embodiments disclosed herein;

FIGS. 44.1-44.3 depict a series of graphs describing updated GR curtain section models after a subsequent iteration of an automated interpretation process in accordance with embodiments disclosed herein;

FIGS. 48.1-48.3 depict a series of graphs describing updated GR curtain section models after iterations of an automated interpretation process in accordance with embodiments disclosed herein;

FIGS. 49.1-49.3 depict a series of graphs describing a final updated GR curtain section models after iterations of an automated interpretation process in accordance with embodiments disclosed herein;

FIGS. 50A and 50B are a flow diagram of an automated TST3D process in accordance with embodiments disclosed herein.

DETAILED DESCRIPTION

Figure 1:
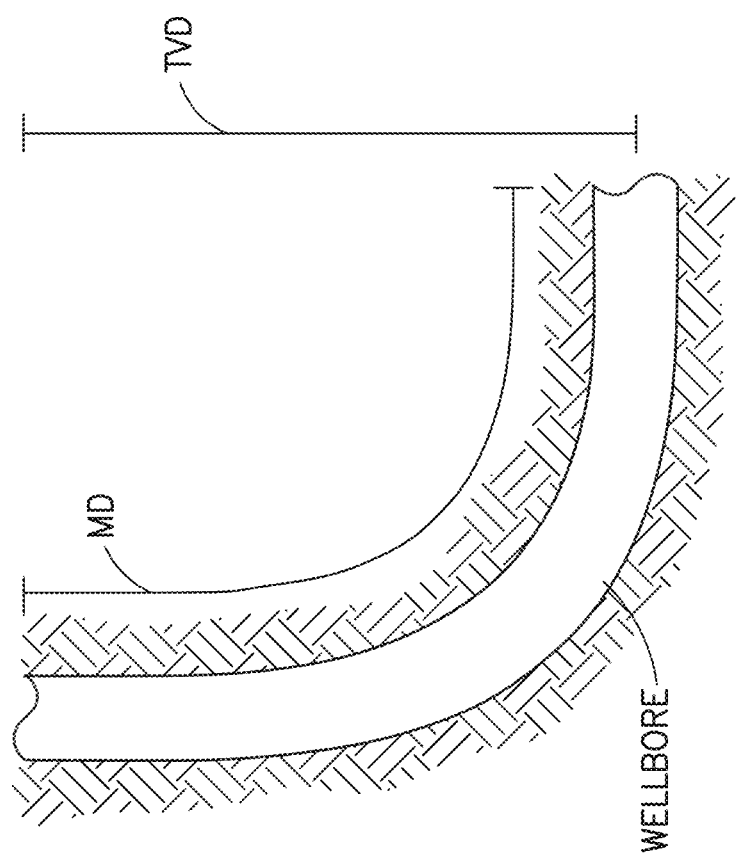
FIG. 1 is an illustration of a segment of a wellbore illustrating measured depth (MD) and true vertical depth (TVD)

The particulars shown herein are by way of example and for purposes of illustrative discussion of the examples of the subject disclosure only and are presented in the cause of providing what is believed to be the most useful and readily understood description of the principles and conceptual aspects of the subject disclosure. In this regard, no attempt is made to show structural details in more detail than is necessary, the description taken with the drawings making apparent to those skilled in the art how the several forms of the subject disclosure may be embodied in practice. Furthermore, like reference numbers and designations in the various drawings indicate like elements.

While most of the terms used herein will be recognizable to those of skill in the art, the following definitions are put forth to aid in the understanding of the present disclosure. It should be understood, however, that when not explicitly defined, terms should be interpreted as adopting a meaning presently accepted by those of skill in the art.

True vertical thickness (TVT) as used herein is the thickness of an interval of a bedding layer of a stratified rock formation, measured in the vertical direction (i.e., toward the center of the earth). In a vertical well, the actual thickness measured from a downhole tool log is the TVT.

True stratigraphic thickness (TST) is the thickness of a bed or rock body after correcting for the structural dip of the stratigraphic layers and the deviation of a penetrating well with respect to the bedding. In horizontal reservoirs (those having zero bed dip), TST is equal to TVT.

Measured depth (MD) is depth recorded along the length of the wellbore. This measurement differs from TVT of a well in all but vertical wells.

Measured log thickness (MLT) is the log output from a downhole tool, where logs may be obtained from measurements including electrical properties (resistivity and conductivity at various frequencies), sonic properties, active and passive nuclear measurements such as gamma ray logs, dimensional measurements of the wellbore, formation fluid sampling, formation pressure measurement, wireline-conveyed sidewall coring tools, cuttings analysis, etc., as a function of wellbore length. In the case of directionally drilled wells, the MLT thickness may be greater or less than the TVT, because the deviation angle of the wellbore increases or decreases the length of the path through the bedding layer.

True vertical depth thickness (TVDT) is the total vertical distance (TVD) between MLT points along the borehole.

True horizontal length (THL) is the total horizontal displacement of a wellbore over a specified interval.

In embodiments directed to offshore operations, true vertical depth subsea (TVDSS) may be used to define well depth, where TVDSS is defined as the vertical distance from a point in the well to a point at mean sea level at the surface. In such instances, TVD may be calculated as TVDSS plus the distance from sea level to the kelly bushing (KB).

"Bedding layers," "bedding," "beds," "stratigraphic layers," and variants of these phrases are layers of sediment or sedimentary rock, also described in the art as stratum for single layers or strata for multiple layers. A bedding layer is the smallest stratigraphic unit, which may be a centimeter or more in thickness, and may be distinguishable from adjacent layers.

Bedding dip angle ($\theta$, theta) is used herein to describe the angle from a planar feature such as rock or sediment layers, bodies, and beds, and a horizontal plane.

Wellbore deviation angle ($\varphi$, phi) is used herein to describe the angle of deviation of a wellbore from a defined vertical plane.

As used herein "reference surface" describes a three dimensional reference surface used to calculate true stratigraphic thickness in accordance with the methods described herein. In one or more embodiments, a reference surface may include stratigraphic features such as curves or faults.

During the course of wellbore construction and completion operations, well log interpretations may find utility in the determination of the stratigraphic position and lateral placement within the layered strata of a formation. Further, in real-time drilling techniques such as geosteering, information received regarding formation and depth characterization may guide the selection of manual or automatic control signals to a bottomhole assembly to guide drillbit trajectory downhole. In addition, methods in accordance with the present disclosure may also include observing and measuring the response of a bottomhole assembly subsequent to submitting a steering command to verify the wellbore is maintaining a proper or anticipated trajectory.

Methods in accordance with the present disclosure may be used in horizontal and directional drilling operations, and can utilize various geologic, petrophysical and seismic data, including gamma ray logs. The drilling operations discussed herein may include drilling for oil or natural gas wells, water wells, or any another type of subsurface well drilling.

In one or more embodiments, methods in accordance with the present disclosure may utilize formation characterization techniques that may involve the determination of true stratigraphic thickness in three dimensions (TST3D) from data obtained from wellbore logs and other structural information acquired during vertical, horizontal, or slant drilling to generate three-dimensional stratigraphic and structural models. In some embodiments, TST3D may be calculated from a defined reference surface that may or may not be faulted. The proposed TST3D calculation may be used in some embodiments as a depth reference framework that is analogous to total vertical depth (TVD) and the measured depth (MD), to correlate logs in horizontal wells. For example, TST3D may allow the identification of faults cut by deviated or horizontal wellbores by comparing the log measurements from TST3D against MD or THL in some embodiments.

Well Depth

Well depth is one of a number of measurements that may be determined when acquiring well logs. With particular respect to FIG. 1, measured depth (MD) is depth recorded along the length of the wellbore. True vertical depth (TVD) is the vertical distance from a point in the well to a point at the surface, for example, the elevation a kelly bushing on the rig floor. This illustration also demonstrates that a deviated wellbore MD may differ from TVD, because wellbore deviations can increase MD relative to TVD.

Thickness

Rock layer thickness may be measured in accordance with the present disclosure by a numbers of way including, but not limited to: true stratigraphic thickness (TST), the thickness of a rock layer measured perpendicular to the formation layering; true vertical thickness (TVT), defined as the thickness measured vertically at a point; measured log thickness (MLT), defined as the thickness of a given interval measured along the well trajectory itself; true vertical depth thickness (TVDT), defined as the MLT between two specific points in a deviated well as measured in TVD.

Figure 2:
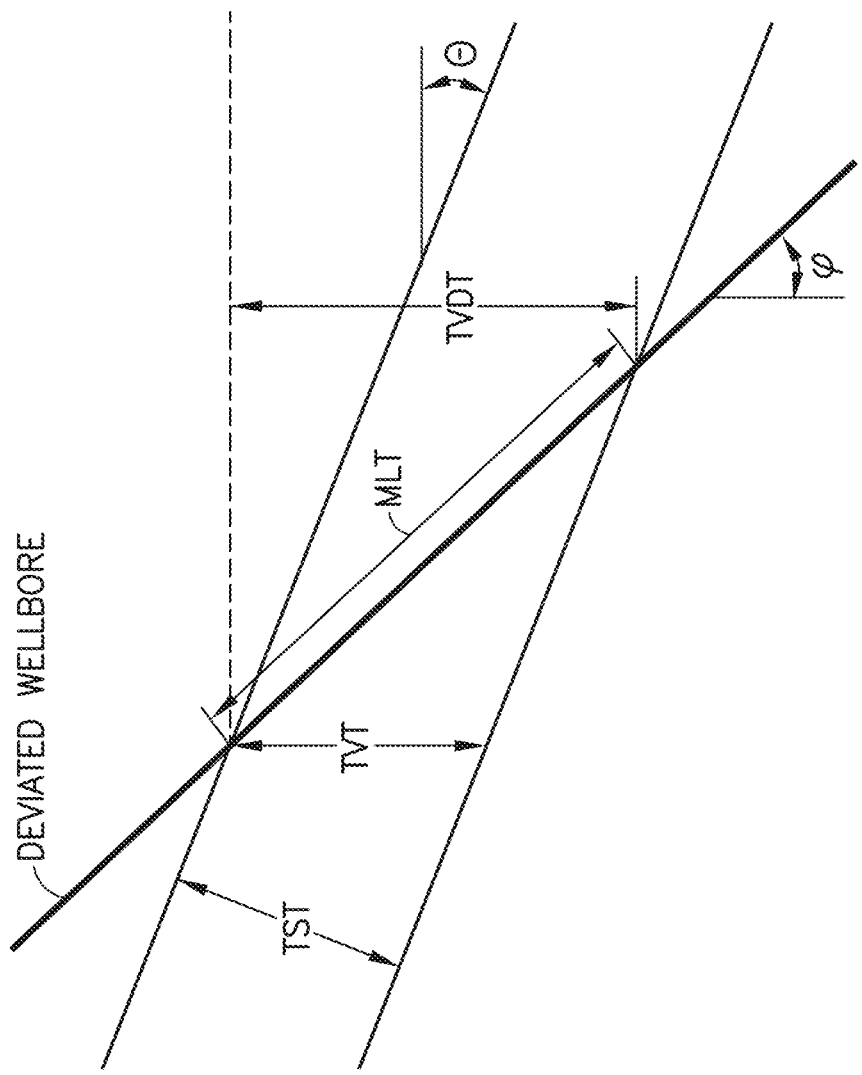
FIG. 2 illustrates cross-sectional thickness measurements in a deviated well penetrating down-dip through a dipping stratigraphic layer.
Figure 3:
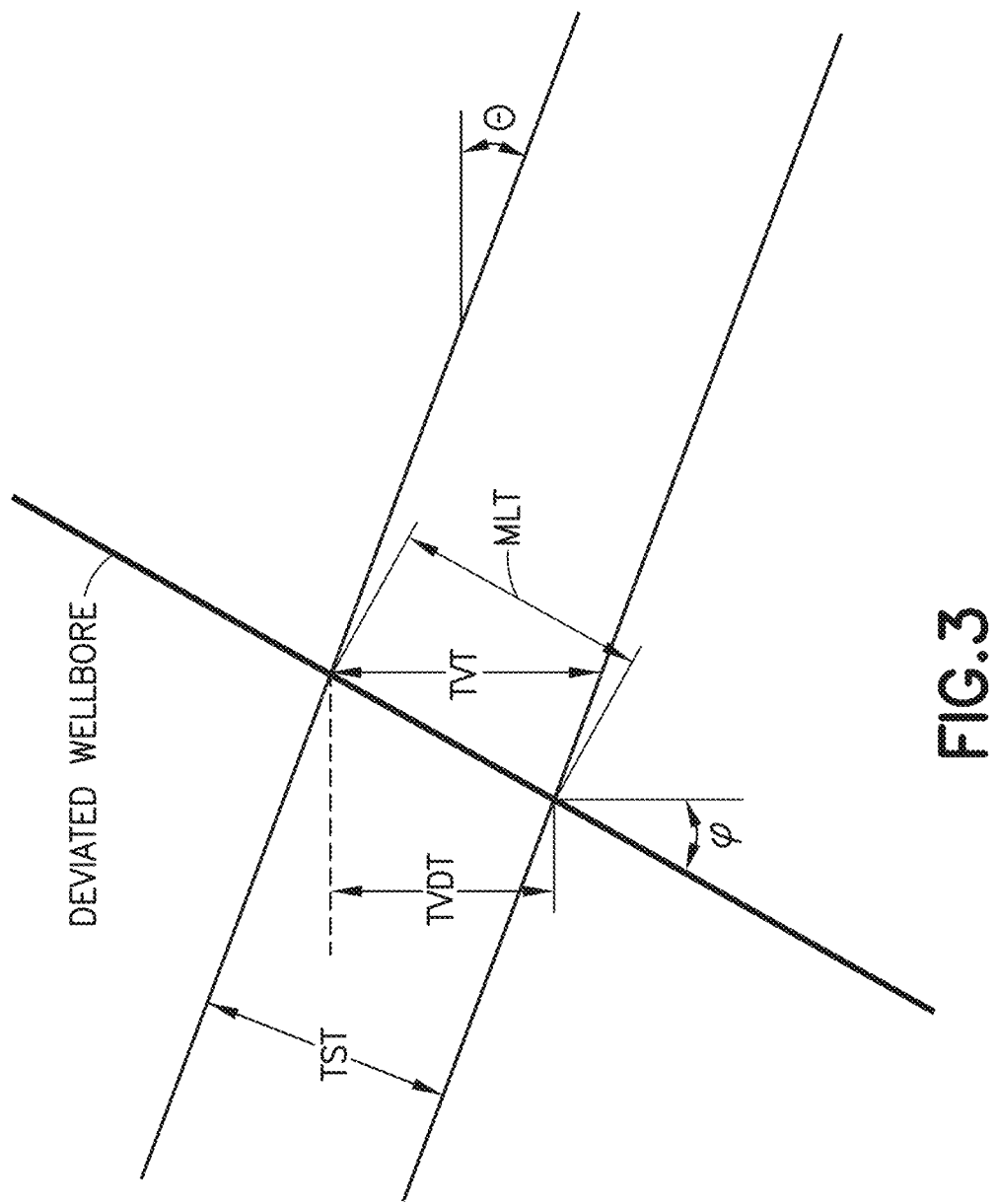
FIG. 3 illustrates a cross-sectional view of thickness measurements in a deviated well penetrating an up-dip through a dipping stratigraphic layer.

These concepts are illustrated in FIGS. 2 and 3 for deviated wells having different orientations. With particular respect to FIG. 2, a deviated well is shown passing through a stratigraphic layer in which the TVDT is greater that the TVT, and where the wellbore intersects a layer having a dip angle θ and a wellbore deviation angle φ. Another possible scenario is shown in FIG. 3, in which TVDT is less than TVT. However, other scenarios exist, such as the case in which TST is equal to TVT for a vertical well that cuts through a horizontal bed. As shown in these examples, TST is often less than or equal to TVT and MLT.

Calculation of True Stratigraphic Thickness

Unlike TVD and MLT, which may be affected by well trajectory and bedding-plane orientation, TST may be used to measure the intrinsic formation layer thickness, regardless of how the well penetrates the formation. The relationship between MLT and TVT may be described in some embodiments by equation (1):

$$TVT = MLT[\cos(\varphi) - (\sin(\varphi)\cos(\alpha)\tan(\theta))] \quad (1)$$

where MLT is the measured log thickness, TVT is the true vertical thickness, θ is the bed dip angle, α is the difference between well azimuth and bed dip azimuth, and φ is the wellbore deviation angle.

Figure 4:
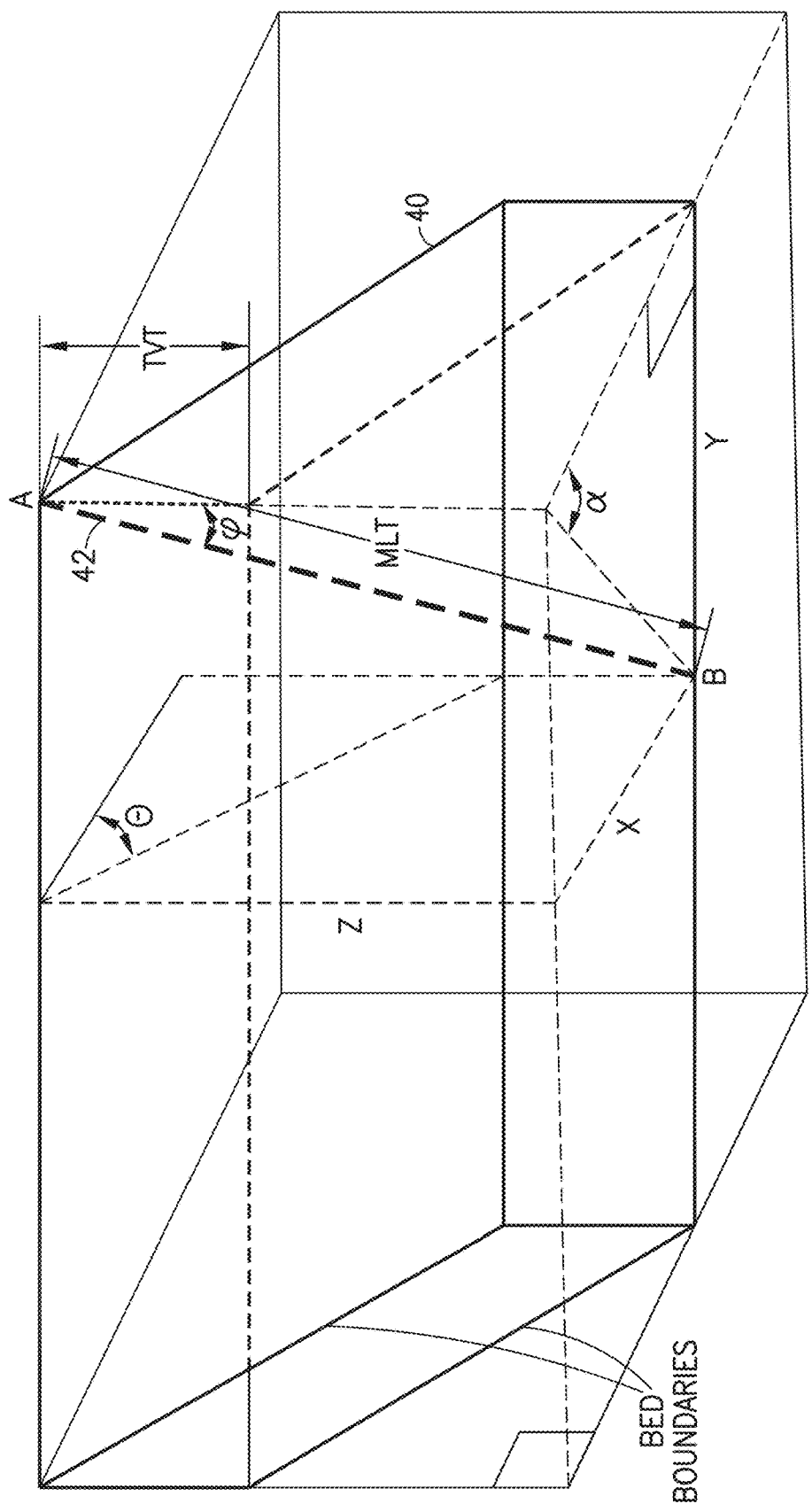
FIG. 4 illustrates parameters of a 3D coordinate system in accordance with embodiments disclosed herein.

With particular respect to FIG. 4, the parameters used in equation (1) are illustrated in an orthogonal 3D coordinate system denoted by axes X, Y, and Z. The highlighted bed is the cuboid 40 delimited by dark gray bed boundaries and having a dip angle θ from the horizontal. Wellbore 42 is represented by a thick dashed black line that enters the formation at location A and exits at location B. A wellbore (black) penetrates a dipping bed (gray) in 3D. TVT is determined from measured log thickness (MLT). The three angles θ, φ, and α are used as shown in equation (1) to calculate true vertical thickness. Note that MLT in FIG. 4 depends on well path, regardless of bedding-plane orientation. To convert MLT to TVT, a correction factor is needed, which may be provided in some embodiments by equations such as equation 1. In embodiments using equation 1, several scenarios may simplify the equation. For example, in horizontal beds (θ=0), or a wellbore parallel to the strike direction of the bed (α=0), TVT=MDT·cos(φ), where MDT is measured depth thickness; hence, the correction factor is related to the wellbore deviation. For a vertical well (φ=0), TVT is equal to MLT, regardless of bed orientation. Once TVT is computed, true stratigraphic thickness may be derived in some embodiments using the equation 2 shown below.

$$TST = TVT \cos(\theta) \quad (2)$$

TST is an intrinsic quantity determined by bed thickness, regardless of bed orientation and well path. However, calculation of TST for a subsurface geological layer from borehole measurements may require consideration of the spatial geometric relationship between the well path and the stratigraphic layer. Another consideration is that equation 1 and the TST formula equation 2 assume a planar bedding surface. For a non-planar surface, use of either equation may introduce error, and more spatial information may be required, which may involve the calculation of the true stratigraphic thickness in three dimensions (TST3D).

Well Log Correlations

Well log curves may be used in some embodiments to delineate boundaries of subsurface rock layers to prepare subsurface maps, three-dimensional models, and cross sections. This may involve well-log correlation, a form of pattern recognition. Correlation is defined as the mapping of structural or stratigraphic units that are equivalent in time, age, or stratigraphic position. With particular respect to FIG. 5, an embodiment in which three rock layers are identified using gamma ray (GR) logs in a vertical well 52 and a deviated well 54 is shown. The GR log signature in the deviated well 54 is stretched (present over a longer interval) compared to the log in the vertical well 52.

Figure 5:
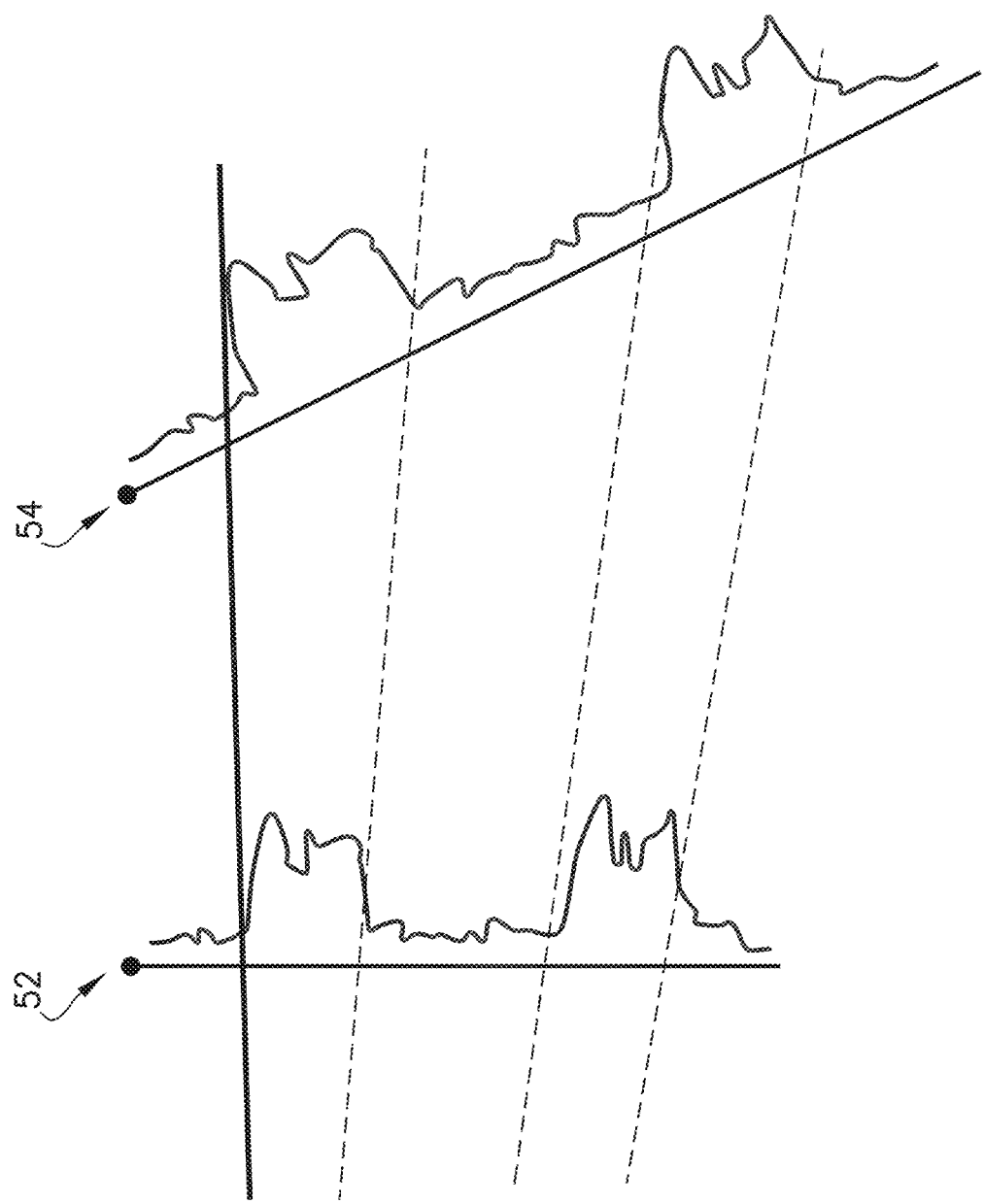
FIG. 5 illustrates a comparison of measurements in vertical and deviated wellbores passing through a multi-layered formation in accordance with embodiments disclosed herein.

While GR logs are show in the embodiment shown in FIG. 5, in principal any measurement could be used that is collected from wellbore techniques known in the art that measure intrinsic formation properties that may be interpreted as lithology or sedimentary facies. For example, other techniques suitable for measuring formation properties include wireline logging, measurement-while-drilling, logging-while-drilling, and the like.

In addition to determining distinct layers, log patterns may also be used to determine the character or composition of the stratigraphic layers such as the presence of sand or shale sequences in stratigraphic column. For example, the vertical succession of stratigraphic layers in a well log may be used to identify correlative stratigraphic units in some embodiments. It is also noted that GR log patterns from deviated well 54 are stretched because the MLT is greater than the MD when compared to the vertical well. However, TST and dip angle of the layer may or may not vary between wells.

Logging-While-Drilling Interpretation (LWD) in Horizontal Wells

LWD applications in horizontal wells may take into account a number of factors including: well placement, real-time formation evaluation, stratigraphic and structural interpretation, borehole profile computation, geomechanical analysis, and completion optimization. Further, wellbore logs and formation measurements obtained through LWD or other logging techniques may be used with deviation surveys in some embodiments to create stratigraphic and structural models. However, well log interpretation may become difficult where a deviated wellbore penetrates the same bedding plane multiple times, such as when the deviation of a borehole changes with respect to formation dip.

Figure 6:
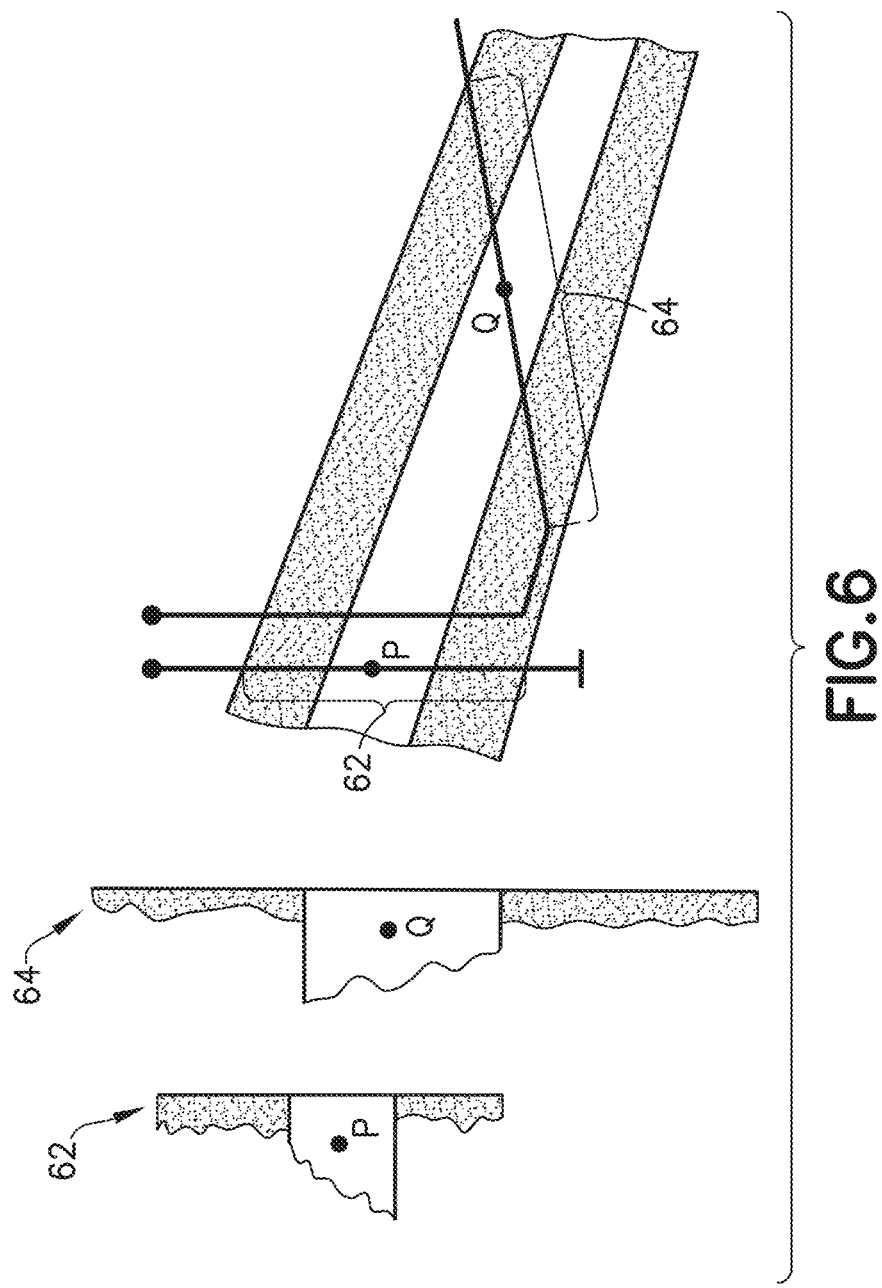
FIG. 6 illustrates a comparison of stratigraphic profile and wellbore log patterns between vertical and deviated wellbores in accordance with embodiments disclosed herein.

With particular respect to FIG. 6, a comparison of hypothetical GR log signatures from a vertical well 62 and deviated well 64 is shown. Corresponding GR log displays 62 and 64 indicated by the brackets are shown in MD. Note that GR signature at point Q in the sandstone layer (light gray) is a stretched mirror image of the GR signature at point P. The vertical borehole 62, passes through the target reservoir (light gray) bounded by two shale layers (dark gray). The horizontal borehole 64, passes through the first shale layer, the target reservoir, nearly reaches the base of the second shale layer, then follows the bed for a short distance before traveling back upward, cutting through the sand layer and finally exiting the top of the first shale layer. Note that the log pattern around target Q seen in GR 2 is a stretched mirror image of the signature observed in GR 1 as the wellbore traverses target P in the vertical wellbore.

When the reservoir stratigraphic profile is unknown and only GR logs and deviation surveys are available, it is often ambiguous to correlate layer boundaries in wells using displays of GR in true vertical depth (TVD). For example, the same log pattern may come from other stratigraphic layers, or the wellbore may cut the same layer multiple times. Unique solutions may be difficult to achieve, especially in non-distinctive interbedded siltstones, tight carbonates, and shales.

Figure 7:
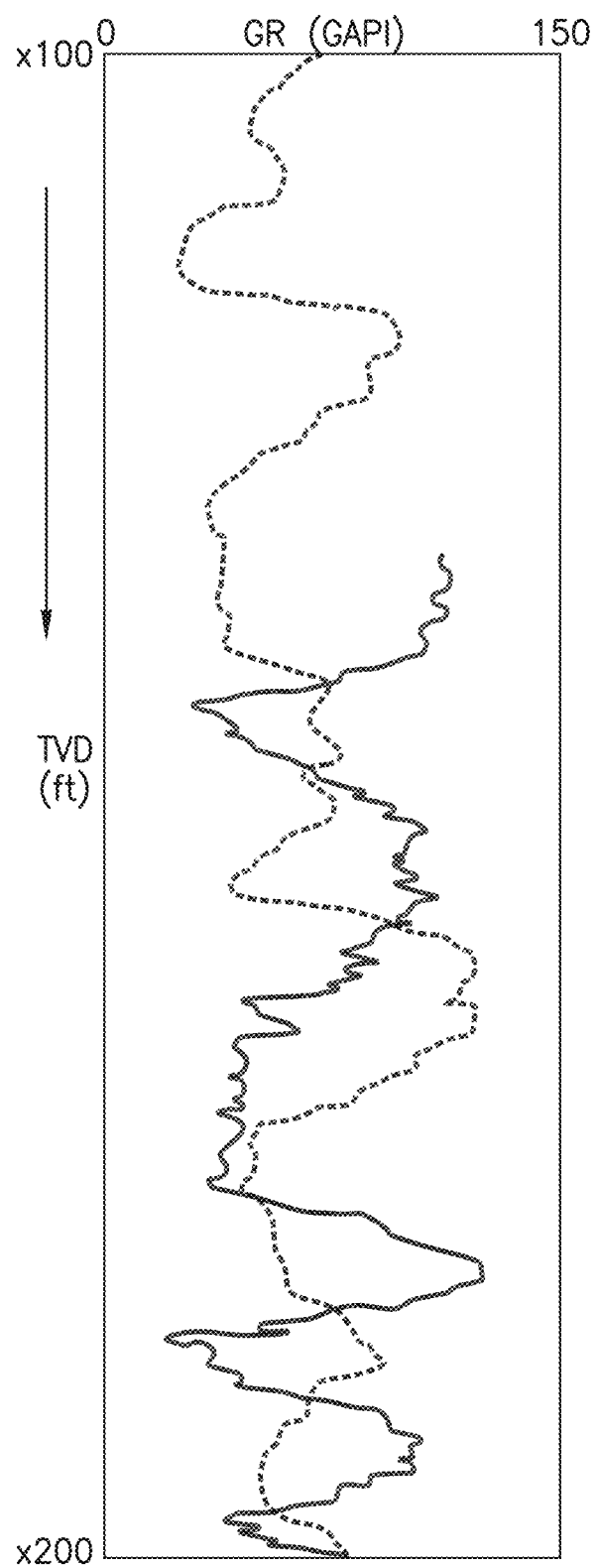
FIG. 7 illustrates a GR log displayed in TVD in a horizontal well drilled in dipping beds in accordance with embodiments disclosed herein.

With particular respect to FIG. 7, log data are displayed in which TVD is acquired in dipping bed layers from a deviated well that penetrates downward and then upward with respect to the true vertical depth. The well path in this case has both a down-going section (dotted curve) and an up-going section (black curve) in terms TVD. Because the well cuts both down a stratigraphic section and then up through the stratigraphic section, a crossover in the GR log signature is observed because TVD does not represent TST. The dotted curve represents the downgoing GR and the black curve represents the upgoing GR log.

Because of bed dip, log signatures in the downgoing (dotted) portion of the well do not match log signatures in the upgoing (black) portion of the well. These two curves may rarely overlap perfectly, unless the studied subsurface reservoir has zero dip and planar surfaces with constant thickness. The TVD display may eliminate some of the stretching seen in FIG. 6, but there is a shift of log peaks because of bedding dip.

In one or more embodiments, improved alignment may be achieved if the GR log is displayed using TST, rather than TVD. By correcting the GR log to correspond to TST, points in a wellbore are aligned in the same stratigraphic position. For example, as illustrated in FIG. 6, nearly identical GR readings will occur at points P and Q. In some embodiments, log displays in TST may also eliminate stretching and distortion, producing upward and downward logs that more closely match, as opposed to appearing as mirror images when displayed as a function of TVD.

Missing and Repeated Section Caused by Faults

In one or more embodiments, log correlation may be conducted if log patterns seen in one well are also observed in other wells. Well log correlation can provide useful information regarding subsurface stratigraphic and structural geology. For example, by matching features between well logs, an accurate interpolation may be made for intervening subsurface regions. In situations in which individual layers may be correlated across several wells, it may also be possible to derive information regarding the depositional environment and/or stratigraphic sequence of the subsurface region, including the location or accessibility of hydrocarbon resources.

Figure 8:
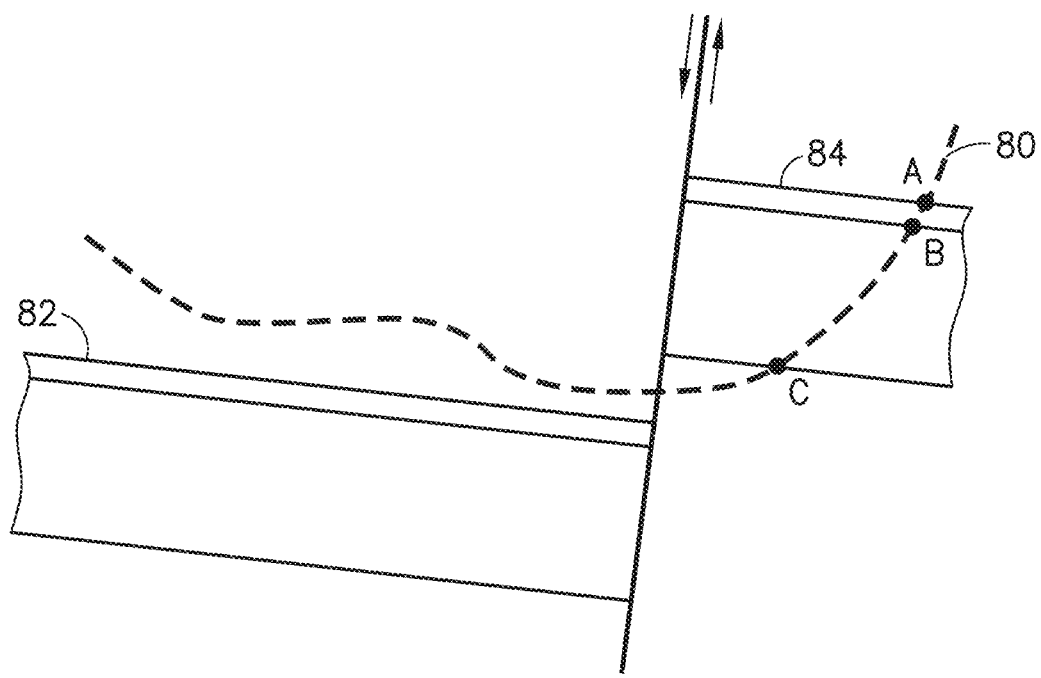
FIG. 8 illustrates a cross-sectional view of a normal fault resulting in a missing log section in accordance with embodiments disclosed herein.
Figure 9:
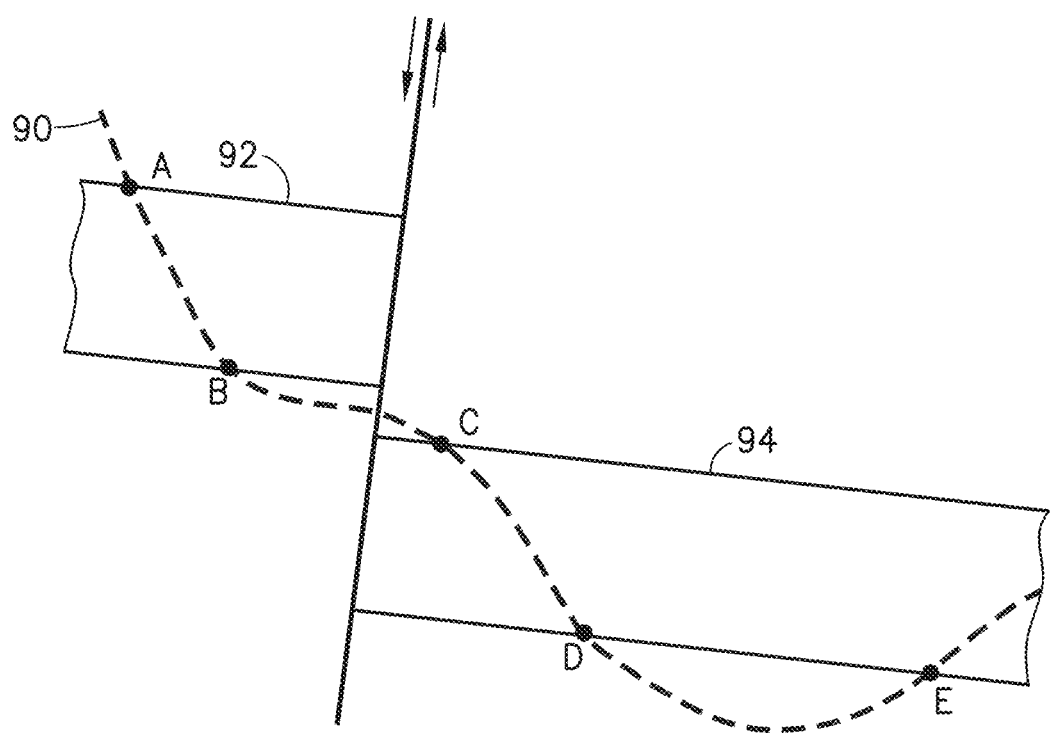
FIG. 9 illustrates a cross-sectional view of a reverse fault resulting in repeated log sections in accordance with embodiments disclosed herein.

In reservoirs containing no faults, stratigraphic layers may vary in true stratigraphic thickness proportionally and correlating well logs may be relatively straightforward. However, in reservoirs containing one or more faults, a logged interval may contain layers and other features that are not present in logs obtained from other wells, which may result in cutting out of some or all of a stratigraphic section (commonly referred to as "missing sections") and the incomplete characterization of the logged formation. Illustrations of this concept are shown in FIGS. 8 and 9. In FIG. 8, a horizontal well 80 (dashed line) cuts through a normal (extensional) fault. The log section corresponding to the shale layer (between points A and B) in the upthrown block 84 disappears when the layer shifts in the downthrown block 82.

In another example illustrated in the reverse (contractional) fault is shown in FIG. 9, log sections may be repeated at deeper TVD, as observed as wellbore 90 (dashed line) traverses a faulted stratigraphic layer twice: once passing from A to B in 92 and then again from C to D in downthrown block 94. The sand layer between points A and B is encountered a second time between points C and D. The base of the layer is once again encountered at point E.

Figure 10:
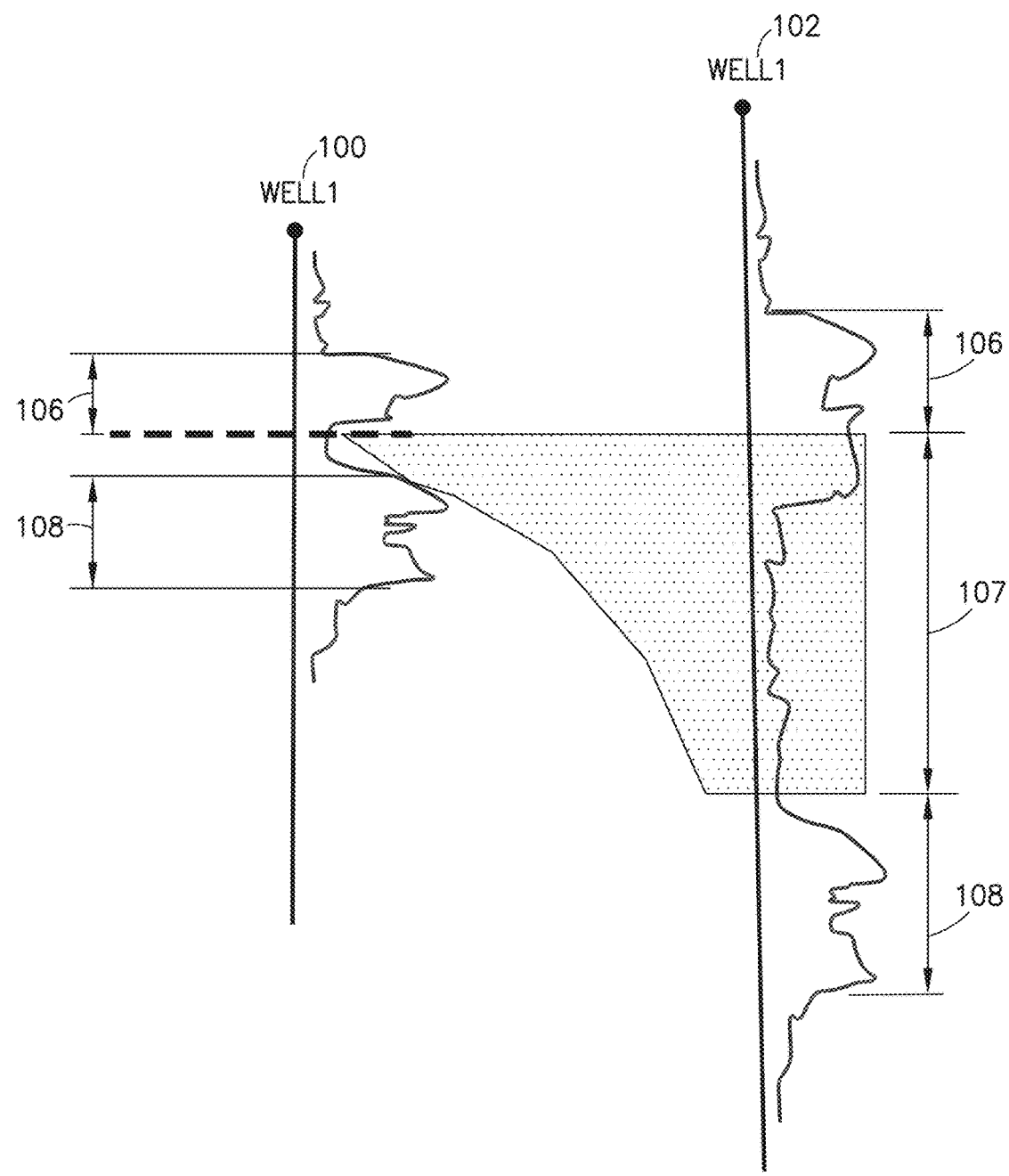
FIG. 10 illustrates a cross-sectional view of a correlation of a vertical well with a deviated well to locate depth and determine the amount of missing section for a fault in the vertical well in accordance with embodiments disclosed herein.

With particular respect to FIG. 10, an example is shown in which log correlations in MD for a vertical well 100 and a deviated well 102 are interpreted as an indication of the presence of a fault. As shown, intervals 106, 107 and 108 are identified in the deviated well 102. However, interval 107 in the deviated well is missing in the vertical well 100 due to a fault (dashed line) cut by the vertical well through the indicated log section. As a result, part of the sand layer and most of the interval beneath it are faulted out of vertical well 100, which is illustrated by shading in well. In one or more embodiments, detailed log correlations in accordance with the present disclosure may be used to identify such missing and reputed sections, interpret faults, and improve well log correlations.

True Stratigraphic Thickness in 3D Concept and Computation

In one or more embodiments, well logging data may be used to calculate the true stratigraphic thickness in 3D (TST3D). True stratigraphic thickness represents the thickness of a layer measured perpendicular to its surface boundaries and corrected for dip and wellbore deviation (trajectory).

In one or more embodiments, TST3D may be calculated by determining the shortest distance between a reference surface and a point along the borehole path. TST3D measurements may be calculated using a parallel reference surface, because such an approximation is consistent with the natural formation of parallel bedding layers within a formation in which sedimentary particles are transported, deposited, and compacted under the influence of gravity. These sedimentary particles tend to be deposited in rock layers that lie essentially parallel to overlying or underlying marker horizons.

In one or more embodiments, a reference surface may be any consistent stratigraphic layer (such as a log top or other geologic measurement) in a given region. For example, a recognized shale layer having a maximum flooding surface with good well-to-well correlations may serve as a useful reference surface for TST3D calculations in some embodiments. In some embodiments, an arbitrary horizontal or dipping plane may be used in the absence of a reference surface. Reference surfaces may be above or below the path of the borehole, and may have any amount of variable dip or be offset by faults. Once a reference surface is defined, TST3D may be calculated in some embodiments along a wellbore path as the shortest distance between any MD location, often measured in a predefined depth increment (such as 0.5 ft (0.15 m)), and the reference surface in 3D space.

In one or more embodiments, reference surfaces may be mapped using a number of analytical measurements including seismic data, well logs, borehole imaging logs, and the like. In some embodiments, formation measurements may include data derived from wellbore tools capable of measuring electrical properties (resistivity and conductivity at various frequencies), sonic or acoustic properties, density, porosity, active and passive nuclear measurements such as gamma ray or neutron porosity, dimensional measurements of the wellbore, formation fluid sampling, formation pressure measurement, wireline-conveyed sidewall coring tools, core sampling, cuttings analysis, and any other techniques known in the art to determine stratigraphic and structural information about a given formation such as changes in formation properties between sedimentary layers. In one or more embodiments, any of the wellbore measurements described above may be obtained from wellbore tools using static or dynamic techniques, including logging-while-drilling, measurement-while-drilling, tool push techniques such as pipe-conveyance or tough logging conditions (TLC), or collection of cuttings from the wellbore.

In some embodiments, formation modeling techniques may also include formation information derived using wellbore tools such as those used in ThruBit™ logging services available from Schlumberger LTD, which may include services tools that can be run as individual components or in triple- or quad-configurations. In some embodiments, wellbore measurements may include telemetry, gamma ray, array induction, neutron tool measurements, density, waveform sonic measurements, spectral gamma ray, and the like.

Figure 11:
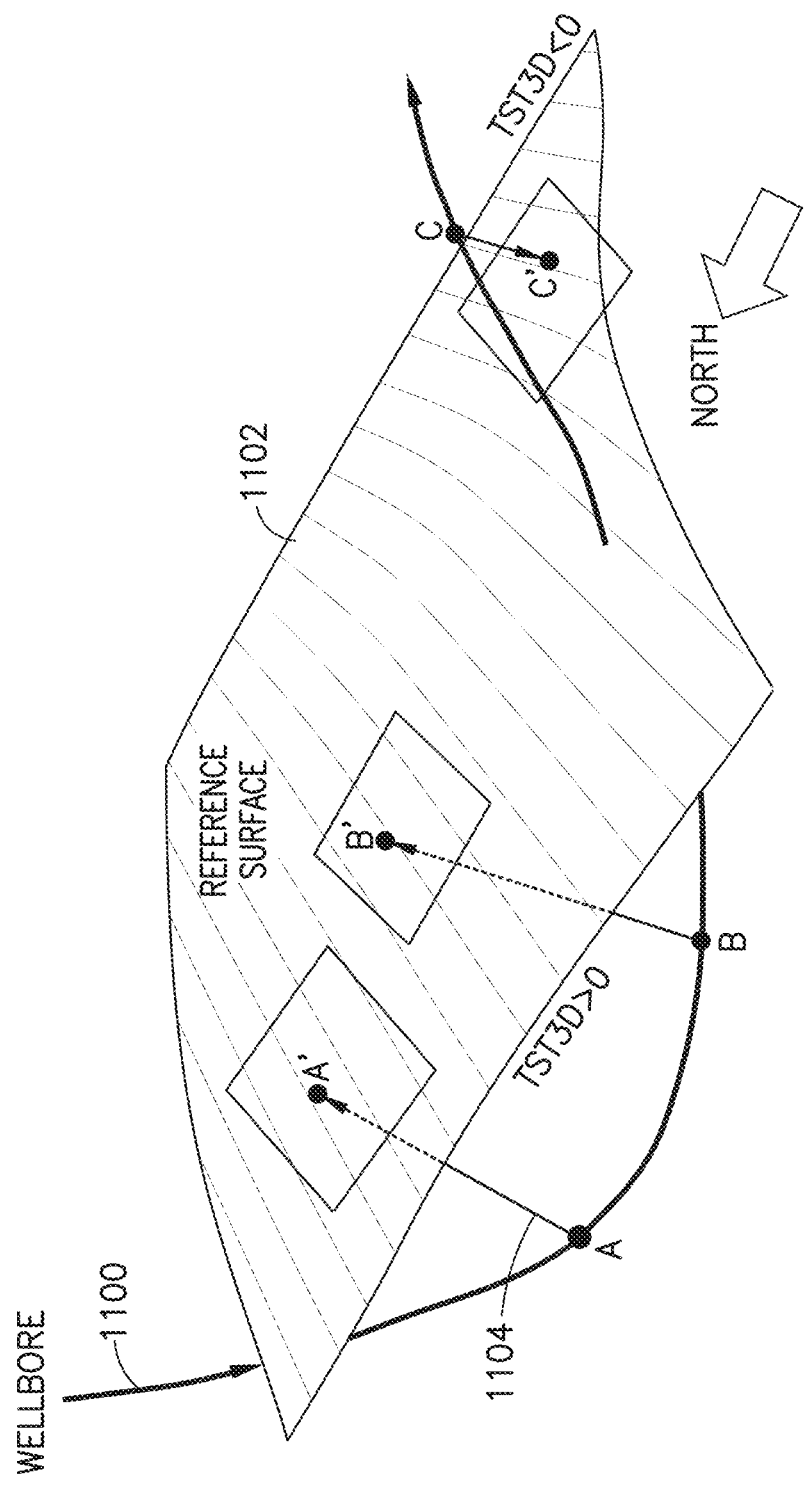
FIG. 11 illustrates a method of calculating TST3D from comparison with a reference surface in accordance with embodiments disclosed herein.

With particular respect to FIG. 11, an embodiment of the TST3D is shown. A wellbore 1100 cuts down into a formation having a reference surface 1102, travels horizontally, back up through the reference surface, and later exits the formation. A reference surface 1102 is shown as having a dip to the south-southeast. The deviated wellbore path 1100 is represented as a solid black line. TST3D projections are shown for 3 arbitrary points (A, B, and C) along the borehole path. The lines of shortest distance to the reference surface 1102 intersect that plane at points A', B', and C'. Squares at the point of contact of the lines (e.g., A-A', B-B', and C-C') with the reference surface 1102 are tangent planes to the reference surface at points A', B', and C'.

Along the wellbore, TST3D may be computed as the length of a line segment spanning the distance between the borehole location at a given MD (e.g., A, B, and C) and the reference surface, where the line segment from the borehole 1100 to the tangent to the reference surface 1102 is normal to the reference surface at the point of intersection. In FIG. 11, TST3D is the distance calculated from the selected MD to a point on a plane tangent to the reference surface (e.g., A', B' and C'); shown as the line 1104 between A and A', for example.

TST3D is computed as the shortest distance between each point on the borehole path and the reference surface. Depending on the orientation of the borehole and reference surface, the shortest distance may not be in the vertical plane of the borehole path. Further, it is noted that these points do not need to lie in the plane along the borehole azimuth of the deviated well. Depending on borehole deviation and dip of the reference surface, TST3D points may lie outside of the intersection of a vertical plane with the borehole itself. As shown in FIG. 11, TST3D values are defined as positive (TST3D>0) below the reference surface, negative above the reference surface (TST3D<0), and zero where (TST3D=0) where the borehole intersects the reference surface.

In one or more embodiments, TST3D calculations derived from correlated wellbore measurements may be adjusted to take into account the presence of faults that may cut through and offset a selected reference surface and other stratal surfaces. In one example, TST3D may be defined and computed in a stratigraphic layer containing a normal fault. With particular respect to FIG. 12, a wellbore 1200 penetrates the top surface of a reference layer 1202 in the upthrown block, passes through the fault 1203, and enters the formation in the downthrown block 1206. Points A, B, C, D, E, and F represent MD sample locations along the well trajectory.

For points C and D that lie in the upthrown block, the calculation of TST3D uses a hypothetical projected "restored top" 1204 to account for the offset of the downthrown block along the fault. The projected restored top (1204) may be created by mathematically shifting the surface of the downthrown block 1206 upward along the fault plane until it connects with the top surface 1202 in the upthrown block across the fault 1203. After the wellbore cuts through the fault, the top surface in the downthrown block is then used as the reference for TST3D calculations. For example, prior to point X along wellbore 1200 (prior to the intersection of fault 1203 with reference surface 1202), TST3D is calculated as the distance from the wellbore to reference surface 1202 (points A and B in this example). Next, for positions in the segment of wellbore between points X (the position of the wellbore 1200 at which the reference surface 1202 intercepts the fault 1203) and Y (the point at which the wellbore 1200 intercepts the fault 1203), points C and D in this example, TST3D is calculated as the distance from the wellbore to restored top 1204 that was created by projecting a surface from upthrown block 1202. Finally, for positions along the wellbore past the intersection of the fault 1203 and wellbore 1200 (at MD values greater than at point Y), TST3D is calculated as the distance from the wellbore to downthrown reference surface 1206.

Figure 12:
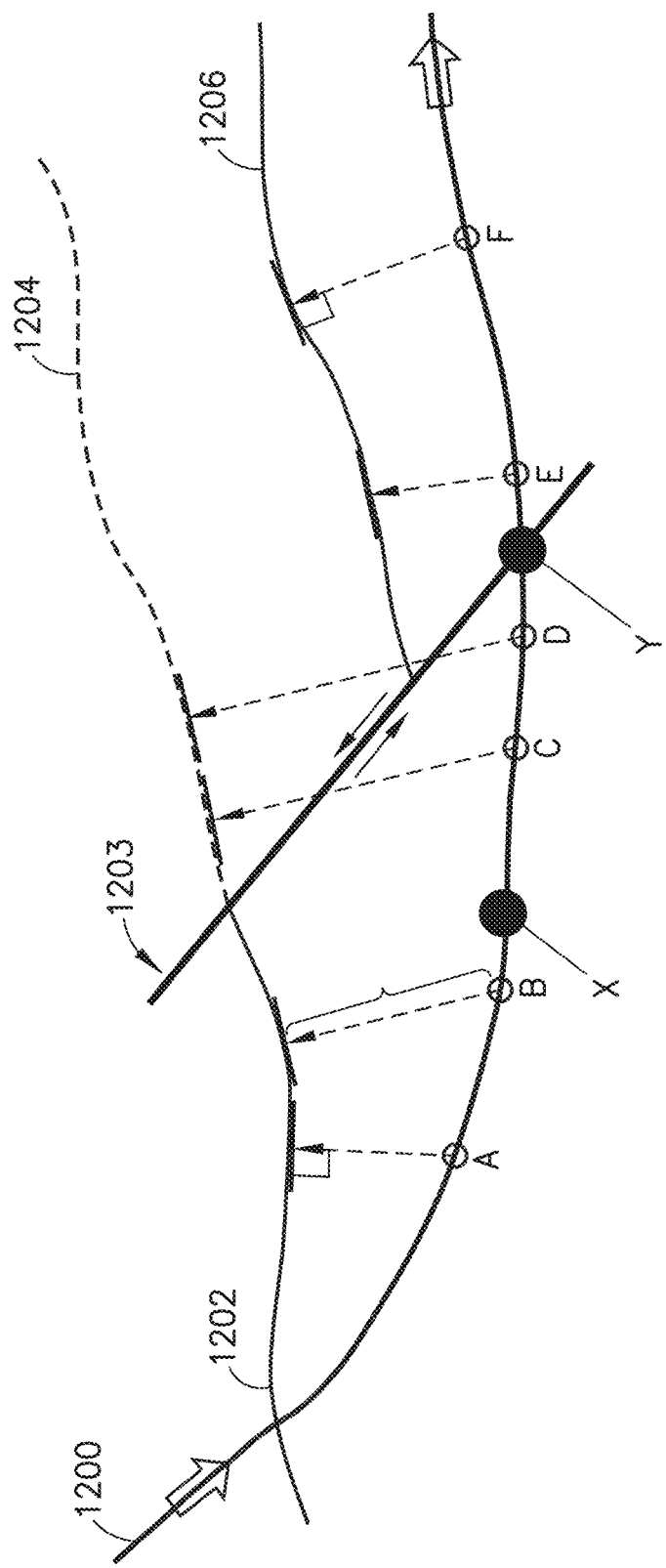
FIG. 12 illustrates an embodiment of a TST3D calculation applied to a cross section view of a wellbore that cuts through a normal fault in accordance with embodiments disclosed herein.
Figure 13:
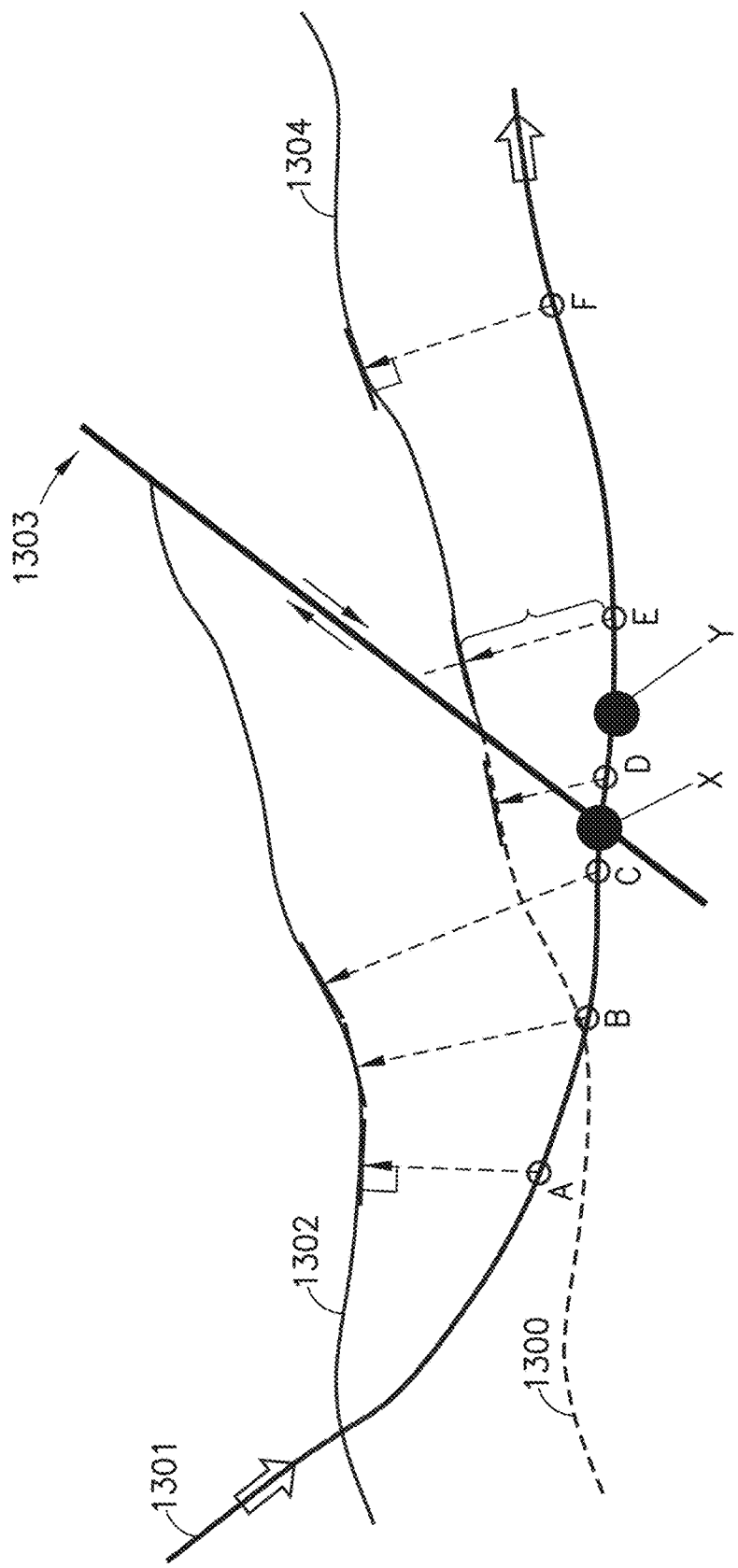
FIG. 13 illustrates an embodiment of a TST3D calculation along a wellbore that cuts through a reverse fault in accordance with embodiments disclosed herein.

With particular respect to FIG. 13, a reverse fault may be modeled similarly. A wellbore 1301 traverses a formation block having a surface 1302, after passing through a fault 1303, the wellbore enters the downthrown block 1304. Here, using similar principles to those discussed with respect to FIG. 12, TST3D for points in the wellbore having a MD less than point X (the intersection of wellbore 1301 with reverse fault 1303) is measured as the distance from the wellbore to the reference surface 1302. For positions in the segment of the wellbore between points X and Y (the position of the wellbore 1301 that corresponds to the intersection of downthrown reference surface 1304 and reverse fault 1303) such as point D, TST3D is calculated as the distance from the wellbore 1301 to a surface projected form the downthrown block, creating a restored top 1304. For positions in wellbore 1301 greater than point Y, TST3D is calculated as the distance between the wellbore and reference surface 1304.

Example of TST3D Workflow

In one or more embodiments, when the sense and amount of offset of the fault are uncertain, an iterative process may be needed to determine a proper TST3D model of the formation traversed by the wellbore. Knowledge of regional and local geology may be used to provide starting values for the local stratigraphic and structural geometry. Further, interactive interpretation of the borehole profile, in conjunction with knowledge of MD, TVD, and TST3D, may reduce the number of iterations required to determine the offset.

In one or more embodiments, methods for the structural interpretation in deviated wellbores using TST3D may be performed manually or by automation of one or more steps. In the initial steps, a vertical pilot well may be drilled within the vicinity of the deviated well such that an initial model of log measurements may be created from log data such as GR measurements.

In some embodiments, an initial model may be simplified, or "layer-cake", in which the initial log measurement is interpreted as a series of layers having constant average values; where each of the layers may be assumed to be constant in thickness and parallel to a reference surface.

Layers may be created by segmentation and discretization processes in some embodiments. For example, layer creation techniques may include "log squaring" in which logs are segmented at one or more inflections point and simplified, with respect to the original continuous log measurement, as step-wise discretized log values that may be useful to define bedding boundaries within the squared log.

Next, a curtain section (a vertical slice of the simplified property model) having a constant model layer thickness, may be bent along a series of vertical hinge lines along the curtain section, proceeding from shallowest to deepest measured depth from the left to the right as the measured depth (MD) in the deviated well.

Following insertion of one or more fold hinges and hinge rotation of the model along the curtain section, a new model log response may be calculated from the intersection of the well path with the newly deformed model. The new model log response may then be compared to the real measurements along the wellbore, and the process of hinge-insertion and bending of the model along the curtain section is repeated until an acceptable level of match is attained as judged by the user or by a mathematical measure of acceptable fit.

Figure 14:
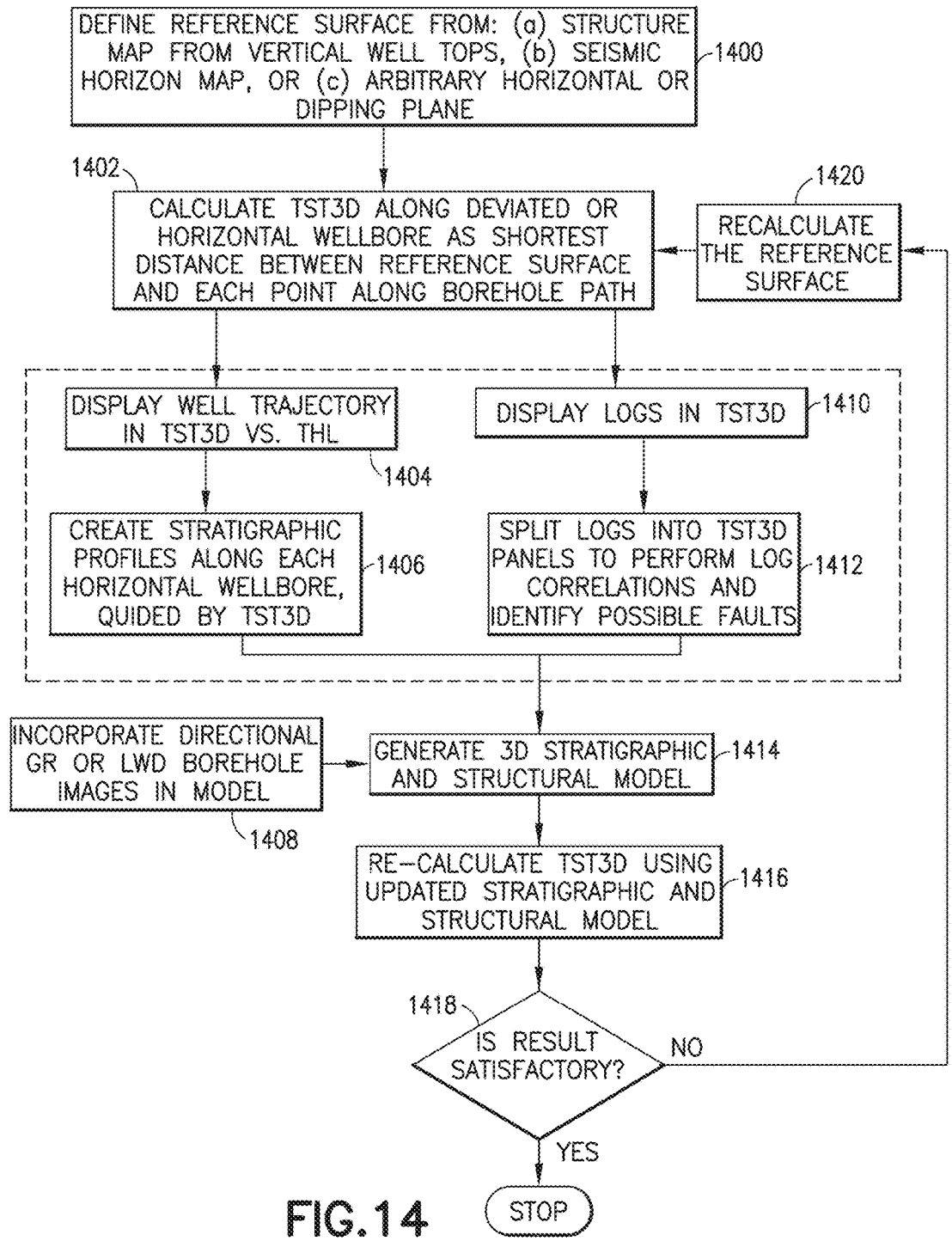
FIG. 14 is a flow chart illustrating an embodiment of a TST3D calculation in accordance with the present disclosure.
Figure 15:
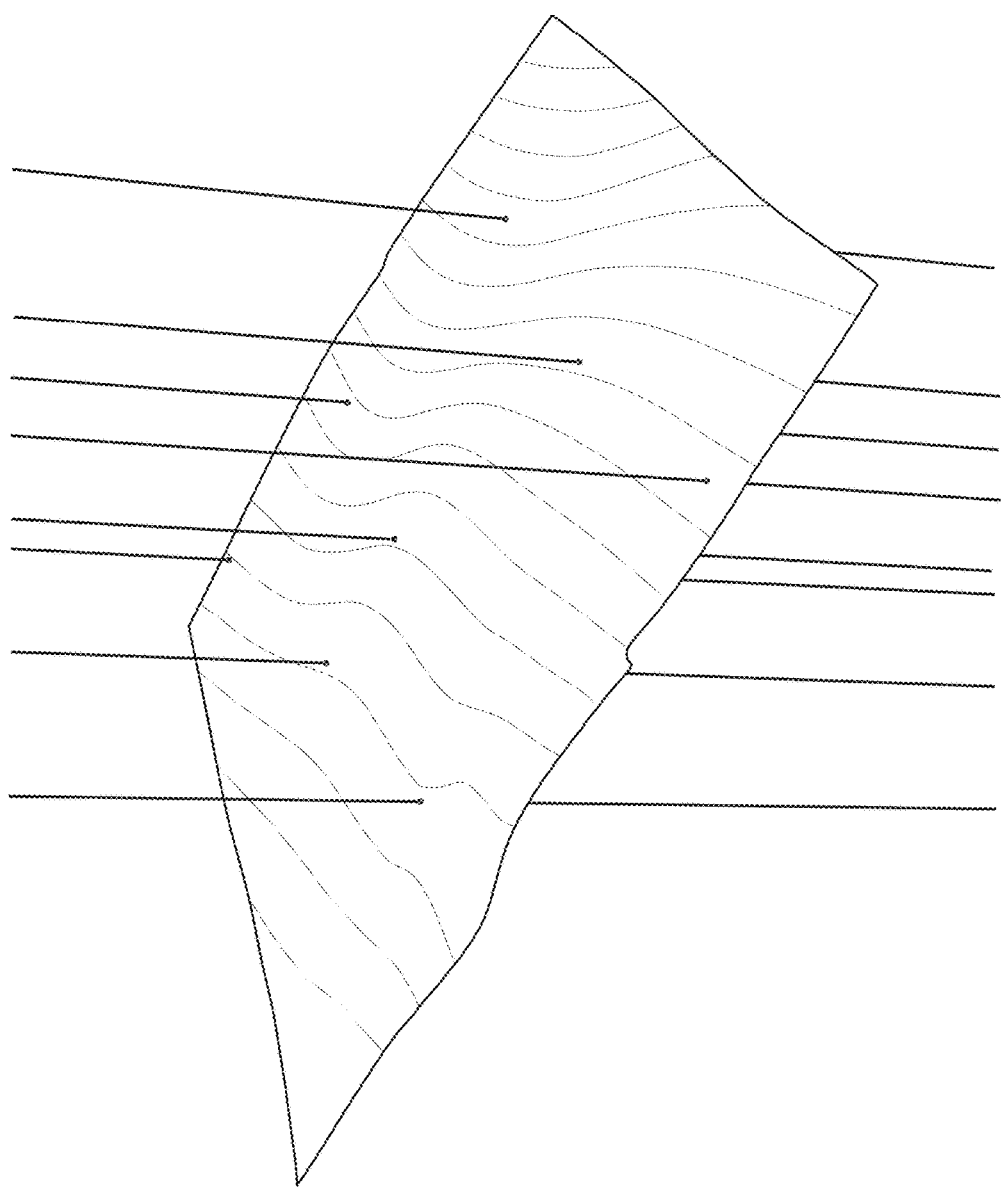
FIG. 15 illustrates a contoured reference surface generated using vertical well tops in accordance with embodiments disclosed herein.

With particular respect to FIG. 14, an embodiment of the TST3D workflow is illustrated. In process 1400, a reference surface is defined from available data such as a regional structure map generated using stratigraphic well tops, mapped seismic horizon data, or an arbitrary horizontal or dipping plane. In one or more embodiments, a reference surface could be generated from well tops, seismically derived surfaces, or any combination of techniques used to generate information about the formation. In some embodiments, a reference surface may be constructed from an arbitrarily selected plane or parametric surface, or combined with any of the aforementioned techniques. An example of a reference surface is presented in FIG. 15, which shows a reference surface generated using log tops picked from intersection of well with stratigraphic surfaces.

In process 1402 of FIG. 14, TST3D is calculated along deviated or horizontal wellbores. For example, as discussed with respect to FIG. 11, TST3D may be computed along a wellbore using a selected reference surface by determining the shortest distance between the reference surface and each point of MD along the borehole path. Each TST3D value may then be associated with its corresponding MD and TVD values.

Next, the user could go through the processes 1404 and 1406, or 1410 and 1412, depending on the objectives. In some embodiments, if faulting is not present in a given region, processes 1404 and 1406 may be used to expedite the calculation TST3D.

In process 1404, the well trajectory in TST3D vs.—THL is generated. With particular respect to FIG. 16, an example of two displays of the same well trajectory in TVD vs. THL (1602) and TST3D vs. THL (1604) is shown. In 1604, the display of well trajectory in TST3D shows wellbore penetration in stratigraphic terms. The y-axis is the computed TST3D value, corresponding to the true stratigraphic thickness in 3D, relative to the chosen reference surface. In this example, the TST3D calculation starts at the position where the wellbore cuts the reference surface (TST3D=0). The maximum TST3D value of 90 feet occurs at location B, which corresponds to a greater THL than the one suggested by the maximum TVD at location A' in the top display. At the toe of the wellbore, negative TST3D values suggest that the drilled interval finished above the reference surface.

Figure 16:
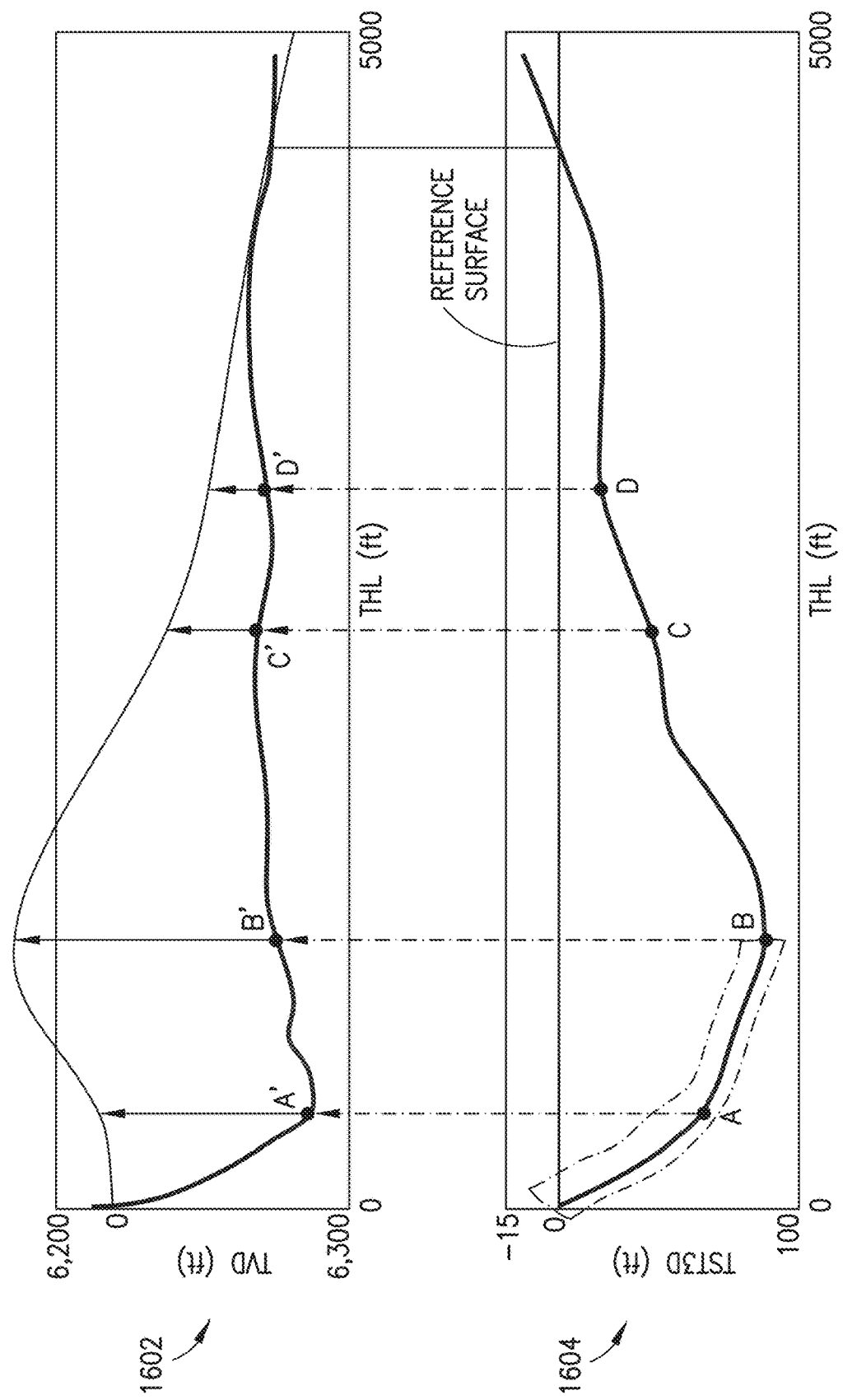
FIG. 16 illustrates a well trajectory displayed in TVD vs. THL and TST3D vs. THL in accordance with embodiments disclosed herein.

Several points of interest are noted in FIG. 16. First, 1602 indicates that the deviated wellbore reached maximum TVD at location A', then moved parallel to the formation from points B' to C' to D' and beyond. Further, TVD in 1602 increases between points A' and B', while TST3D decreases between equivalent points A and B. If the beds were horizontal, TVD plot 1602 could be interpreted as a wellbore moving up through stratigraphic section from point A' to B'. However, TST3D plot 1604 shows that the well moved down through stratigraphic section in the equivalent interval from point A to B. In a second artifact, the TVD plot 1602 suggests the borehole moved essentially parallel to stratigraphic layers from point C' to D', while TST3D plot 1604 shows that the borehole moved up through stratigraphic section in the equivalent interval C to D.

In process 1406 of FIG. 14, stratigraphic profiles are created along each deviated wellbore, guided by TST3D. Displays of TST3D vs. THL, such as the one presented in FIG. 16, can be used to assist interpretation of the stratigraphic profile in deviated wells based on LWD gamma ray (GR) measurements.

Figure 17:
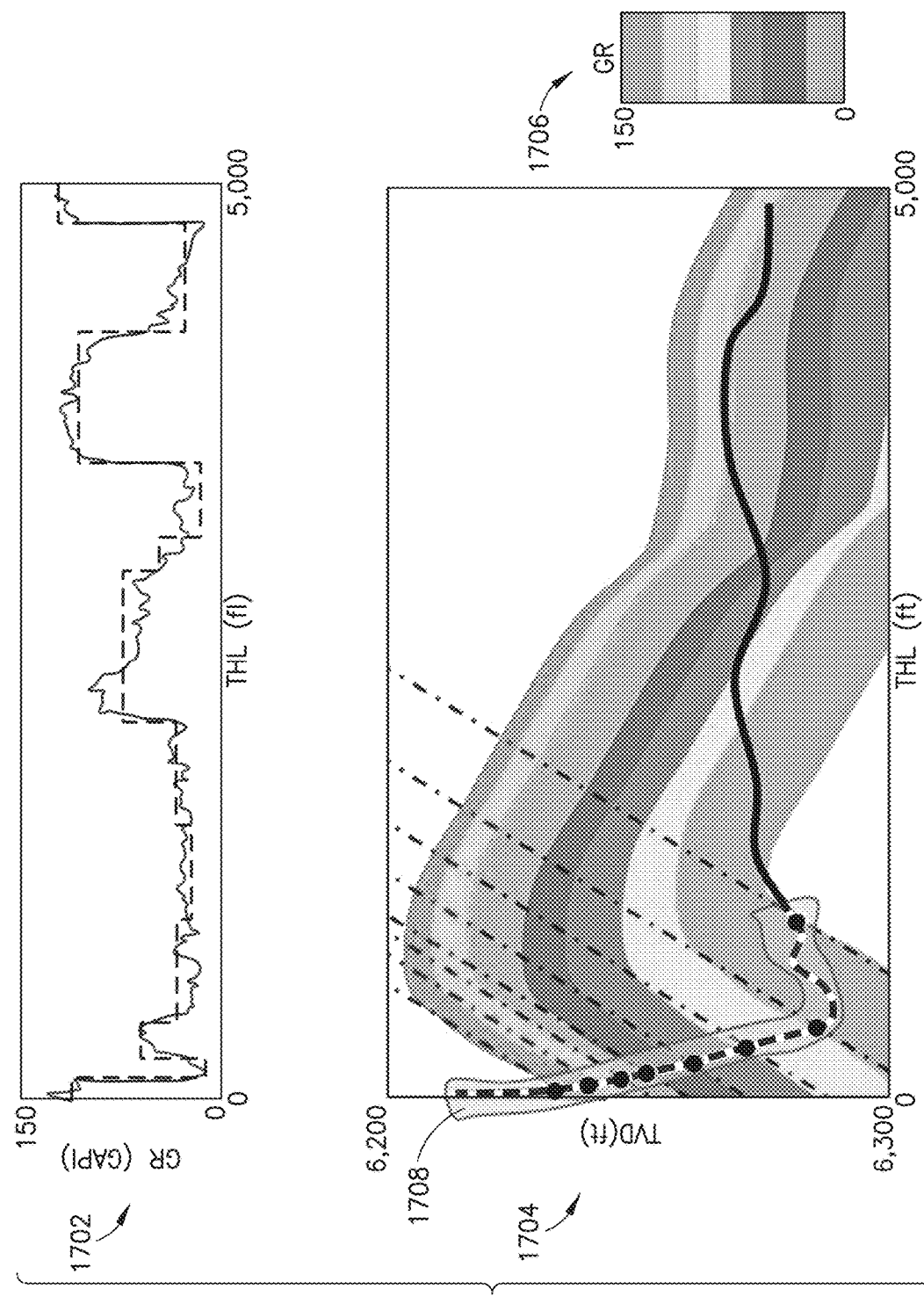
FIG. 17 illustrates a GR curtain section in accordance with embodiments disclosed herein.

FIG. 17 illustrates how a GR cross section along a deviated wellbore 1704 can be created. The y-axis is TVD, and the x-axis is the true horizontal length of the wellbore, defined as the length of the wellbore projected onto the XY-plane. To generate a GR cross section, which may be equivalently described as a curtain section, the interpreter may use a nearby vertical well, or pilot well, to provide a complete GR vertical sequence.

The vertical GR log may then be used in some embodiments as a template to perform forward modeling by progressively bending a layer-cake GR model so that the modeled GR curve (broken stepwise trace in 1702) matches the actual GR measurement (black curve in 1702). Moreover, curtain sections may also incorporate bedding dip information to guide the bending of the stratigraphic layers. In one or more embodiments, bedding dip information may be obtained from logs generated from wellbore imaging techniques and/or additional pilot-well data.

With particular respect to FIG. 17, a comparison of measured GR (black line, 1702) vs. forward modeled GR (dotted line, 1702) is shown. Shaded bars show the relative intensity of GR signature in API units as defined in legend 1706. The shaded area 1708 in the near-vertical part of the horizontal well is used to construct the forward GR model. In some embodiments, vertical well information may be derived from one or more pilot wells, such as the one presented in this example. The stratigraphic low point is located near the heel of the well. Note that vertical exaggeration is 28:1 in this curtain section;

In the near-vertical portion of the deviated wellbore, surface tops may be selected on the basis of GR measurements correlated with MD. A layer-cake GR model may then be initiated with a dip to ensure the surface boundary lines (black dashed lines in FIG. 17) are parallel and follow the correct order as MD increases. Next, the layer-cake GR surfaces are bent while traveling from decreasing THL to increasing THL in 1702 and 1704, guided by the TST3D display (such as that presented in FIG. 16) to achieve a better match between the GR measurement (black curve, 1702) and the forward model of the GR log (dotted curve, 1702). The color gradations in the curtain section of 1704 indicates GR magnitude in different layers. In some embodiments, however, the GR values may vary within the layers.

In one or more embodiments, the TST3D approach may be used to create curtain sections with no pre-existing pilot wells or interpreted bedding-plane dips from borehole images. For example, a vertical pilot well may be replaced by the vertical and deviated portion of the horizontal well, which may extend from the surface to a MD location with the maximum TST3D, as indicated by 1708 in FIG. 17.

Figure 18:
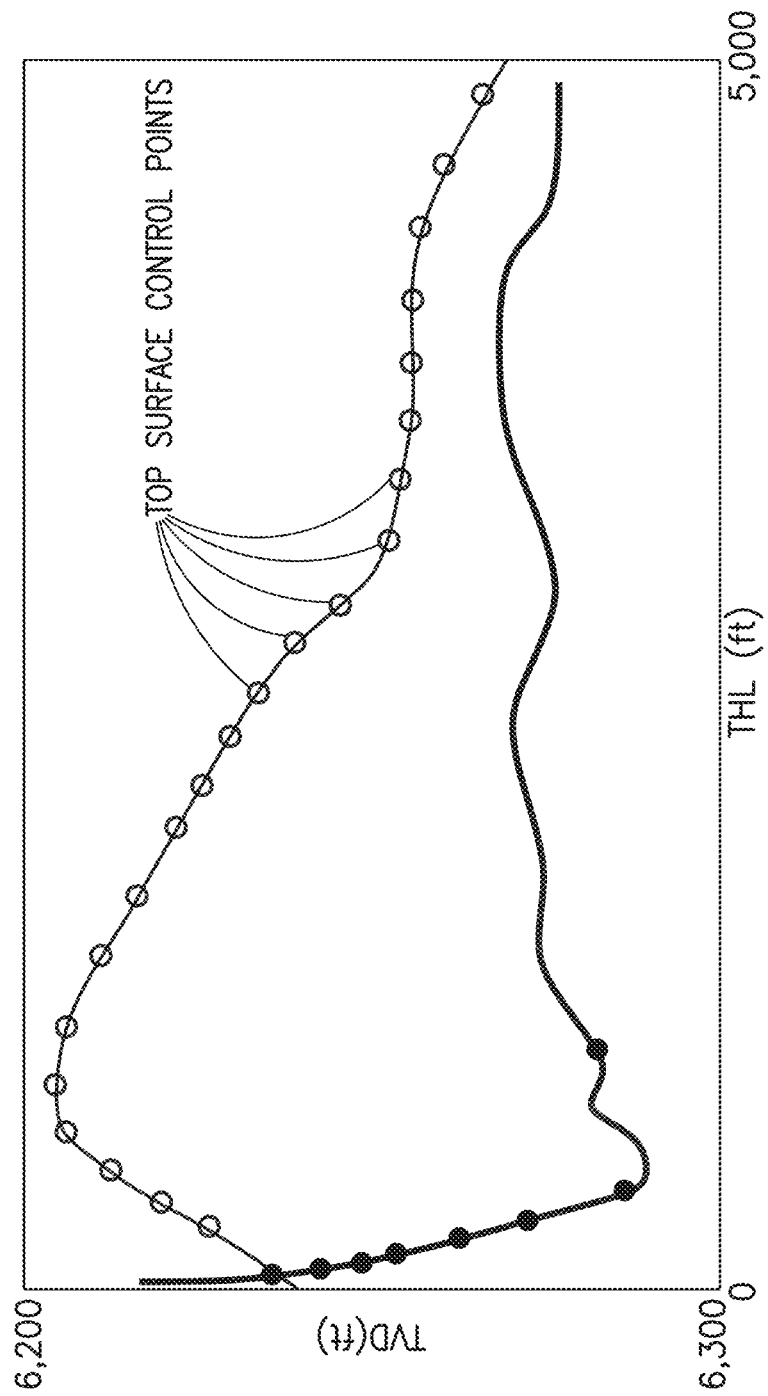
FIG. 18 illustrates the selection of stratigraphic control points extracted from curtain section in accordance with embodiments disclosed herein.

Steps 1404 and 1406 of FIG. 14 may be repeated in some embodiments for other lateral wells in a specified area to generate other GR curtain sections. Each curtain section may contain sampled information about stratigraphic surfaces in a cross-section view, as determined by the corresponding well trajectory and GR modeling. Later, modeled surfaces in each curtain section may be exported as point sets to further constrain local refinement of structural surfaces in 3D near the modeled wellbores. As shown in FIG. 18, control points extracted from the top surface of the curtain section in FIG. 17, available for each picked stratigraphic horizon, can be imported into structural modeling software to improve the accuracy of the model.

Fault Interpretation Steps

In wellbore intervals containing one or more faults, processes 1410 and 1412 of the TST3D flowchart in FIG. 14 may be used. In step 1410, after TST3D is computed (as discussed with respect to FIG. 11), GR logs may be displayed using TST3D as the depth reference framework in some embodiments, which may supplement and contrast with conventional TVD and MD displays.

Figure 19:
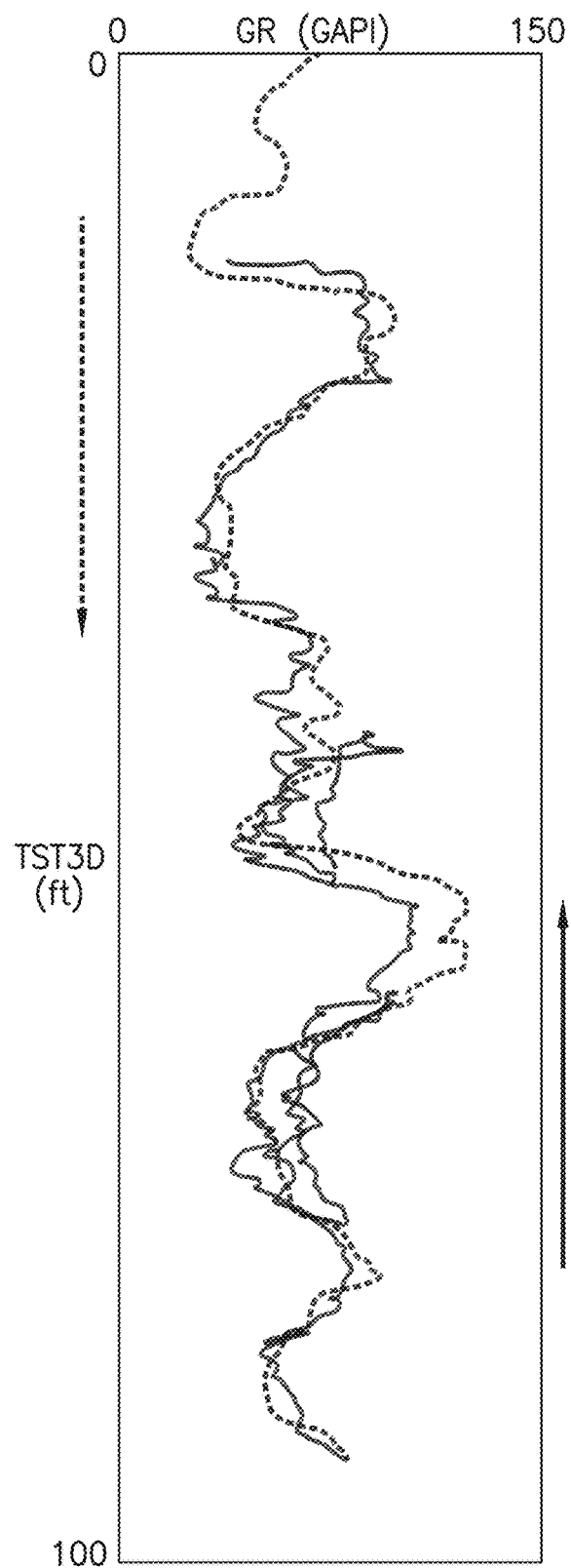
FIG. 19 illustrates a display of GR log as a function of TST3D in accordance with embodiments disclosed herein. With particular reference to FIG. 19, a black curve represents the downgoing GR and a dotted curve represents the upgoing GR logs. Compare this to FIG. 7, a similar log that uses the TVD depth reference.

With particular respect to FIG. 19, a GR log is displayed using a TST3D depth reference in a deviated well. The y-axis is computed TST3D and the x-axis is the GR value. The dotted curve represents the downgoing (increasing in depth) GR with increasing stratigraphic thickness up to the maximum TST3D of 95 ft. Beyond this point, the wellbore climbs stratigraphic section, leading to the upgoing (decreasing in thickness) TST3D plot (black curve). For the upgoing GR plot, there are wellbore intervals associated with local increase and decrease of TST3D, leading to GR crossover. In general, the match is good between the downgoing and upgoing GR logs, because they are now displayed in a stratigraphic depth reference. Here, the strong correlation between logs displayed in TST3D evidence a good fit between the interpreted local data and the structural model.

In case there is no fault or truncation (by unconformity or pinchout, for example), and stratigraphic thickness does not change significantly, the upward and downward GR curves should agree, even though they may not overlap precisely. Lateral variation in GR values, slight bed thickness changes, and inconsistent log measurements can give rise to the signal mismatch. Given the fact that the length of a deviated wellbore is generally less than 5,000 ft, these assumptions are reasonable. Note that compared to the downgoing GR (dotted curve), the upgoing GR (black curve) is less smooth, which may indicate that dense samples are represented in the lateral part of the wellbore where the relative dip between the formation and the wellbore is lower.

In process 1412 of FIG. 14, TST3D logs may be split into sequential TST3D panels. To perform detailed log correlation in deviated wellbores, the display in FIG. 19 can be replaced by a series of GR displays using panels created for monotonically increasing or decreasing intervals of computed TST3D. With particular respect to FIG. 20, TST3D panels of GR logs are prepared using information derived from the TST3D log used in FIG. 19. In the sequential panels GR1-GR6, each panel indicates an interval of a wellbore that monotonically moves down or up through a given stratigraphic interval. This sequential display facilitates log correlation, such as the identification of shale layers 2002 and 2004, because the same GR signature should be aligned horizontally at the same value of TST3D.

Figure 20:
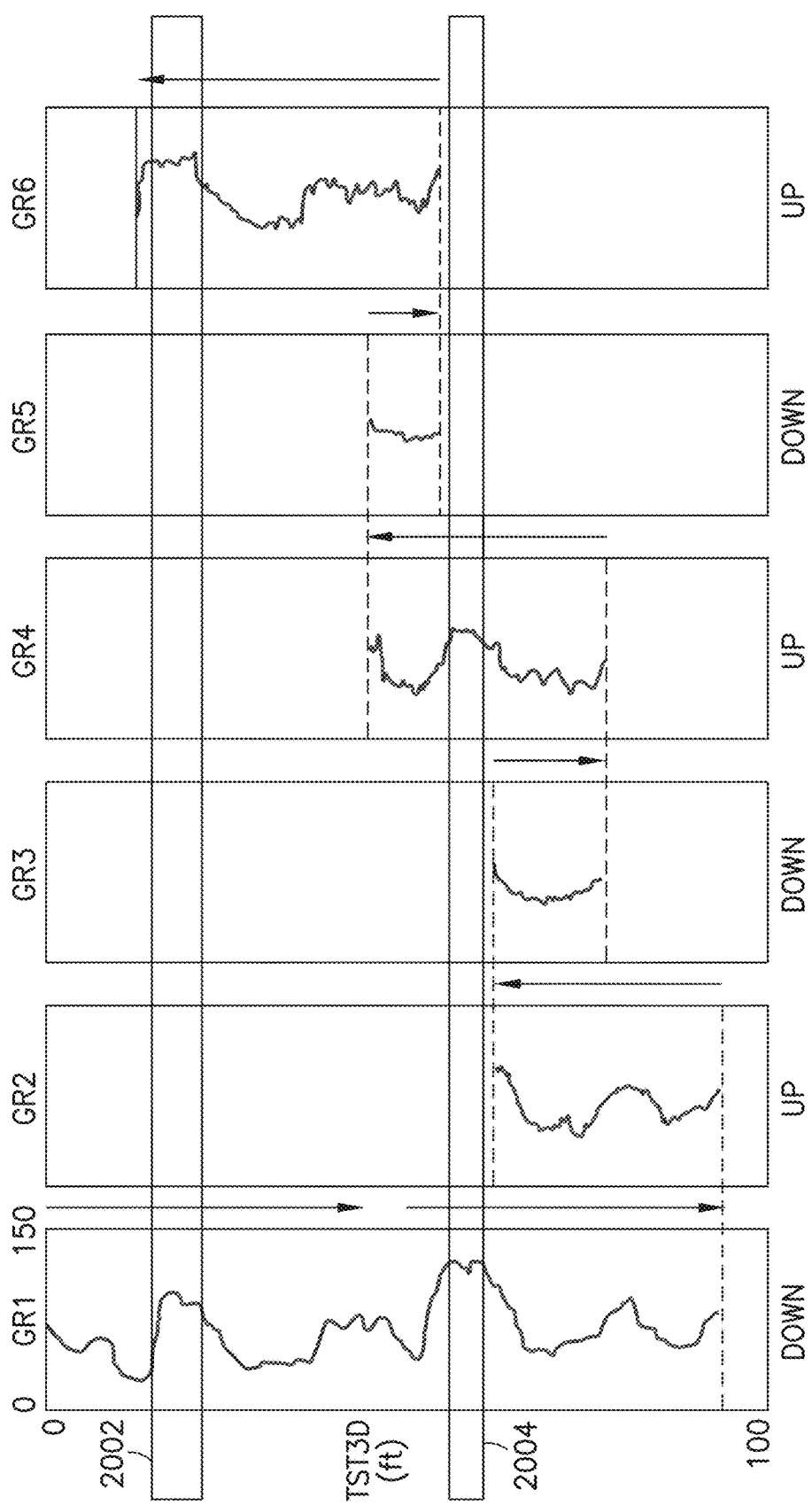
FIG. 20 illustrates GR log panels as a function of TST3D from a deviated well in accordance with embodiments disclosed herein. Arrows indicate whether the well section is up-going or down-going with respect to the trust stratigraphic layering.
Figure 21:
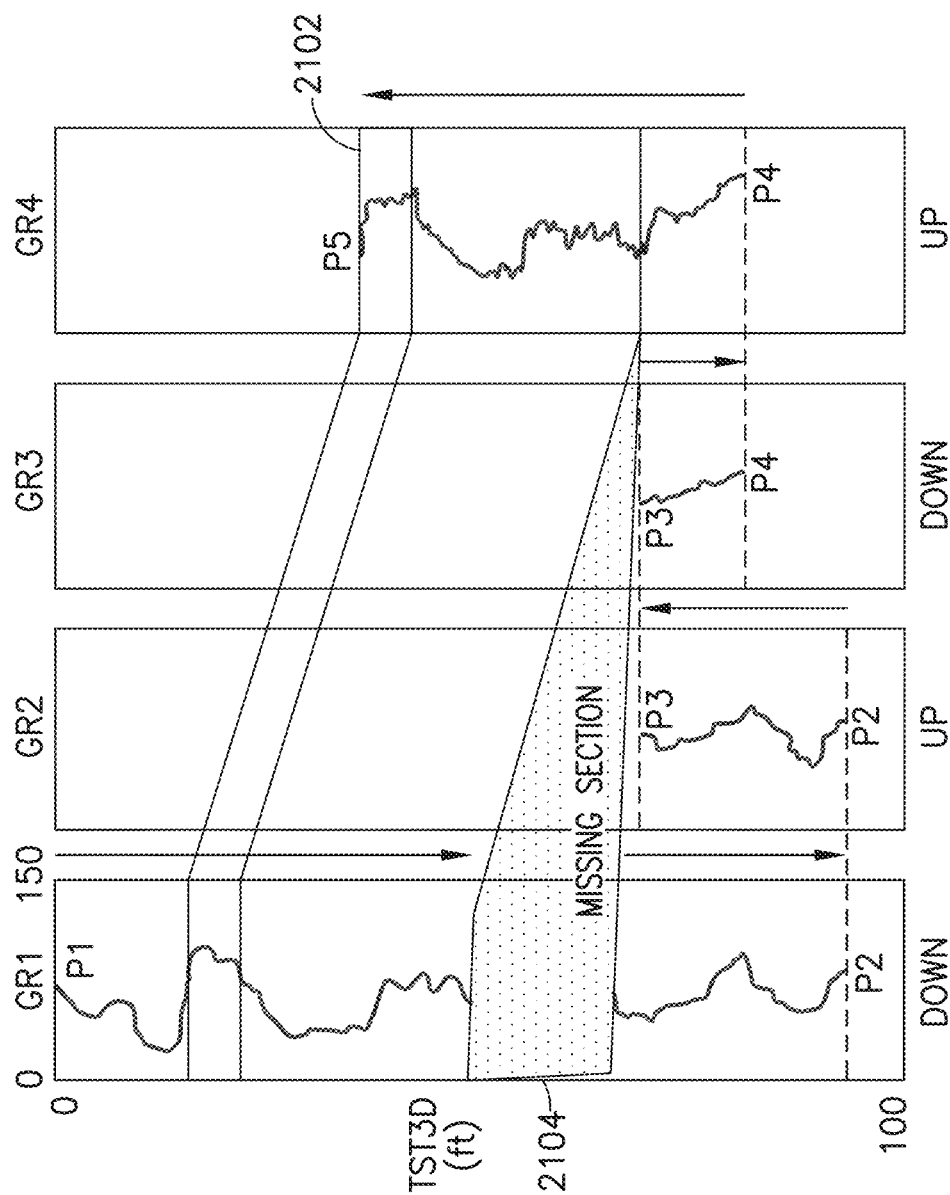
FIG. 21 illustrates a missing stratigraphic section identified from the GR log panels using TST3D in accordance with embodiments disclosed herein.

Log displays generated using TST3D panels may allow the identification of possible faults and estimate their depth and amount of offset. FIG. 21 illustrates procedures used to identify a missing section and determine fault locations cut by a wellbore. Downgoing GR1 is the same as that shown in FIG. 20, however, the GR signatures in the respective horizontal trajectories are different. Detailed log correlation by TST3D suggests a portion of GR section in the vertical (or deviated wellbore) in the first panel is missing in the deviated wellbore. This could be explained by the presence of a fault that is intersected by the wellbore. The intersection is located in the wellbore interval that starts at point P4 and ends at P5, which is the last MD interval of the GR measurement. In addition, it is observed that shale layer 2004 in FIG. 20 is missing and is interpreted to have been faulted out in FIG. 21, whereas shale layer 2102 (corresponding to 2002 in FIG. 20) is still visible.

The GR display in TST3D panels shows a clear TST3D-based depth mismatch, because TST3D is computed based on the initial non-faulted reference structural surface, such as the surface shown in FIG. 11. This mismatch is also an indication of the potential presence of a fault, and the amount of mismatch is related to the magnitude of vertical offset of the fault.

Figure 22:
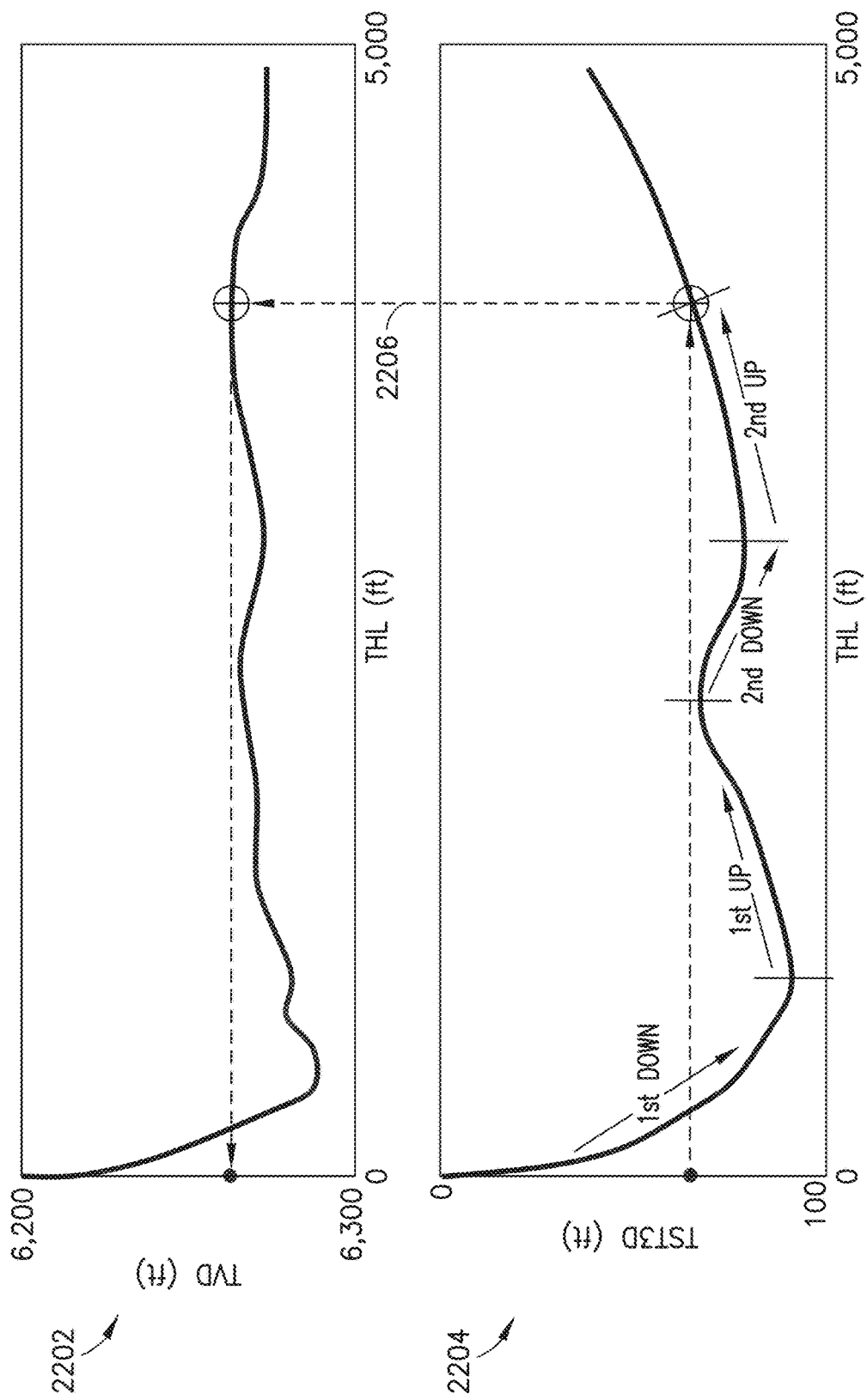
FIG. 22 illustrates the determination of a fault location cut by the wellbore by comparing TVD vs. THL and TST3D vs. THL in accordance with embodiments disclosed herein.

To accurately estimate the fault intersection in the wellbore, displays of TVD vs. THL and TST3D vs. THL may be combined in some embodiments. FIG. 22 illustrates an embodiment of a procedure used to determine the fault location cut by the wellbore. As an example, the TST3D value of the fault 2104 (shaded area) from the TST3D panel display in FIG. 21 is assumed to occur at approximately 70 ft TST3D. The corresponding value in 2204 of FIG. 22 correlates to the second upgoing GR signature, also shown in the last panel of FIG. 21. The corresponding value 2206 is then mapped onto the THL of the intersection in the display of TVD vs. THL 2202 to obtain the respective TVD.

Figure 23:
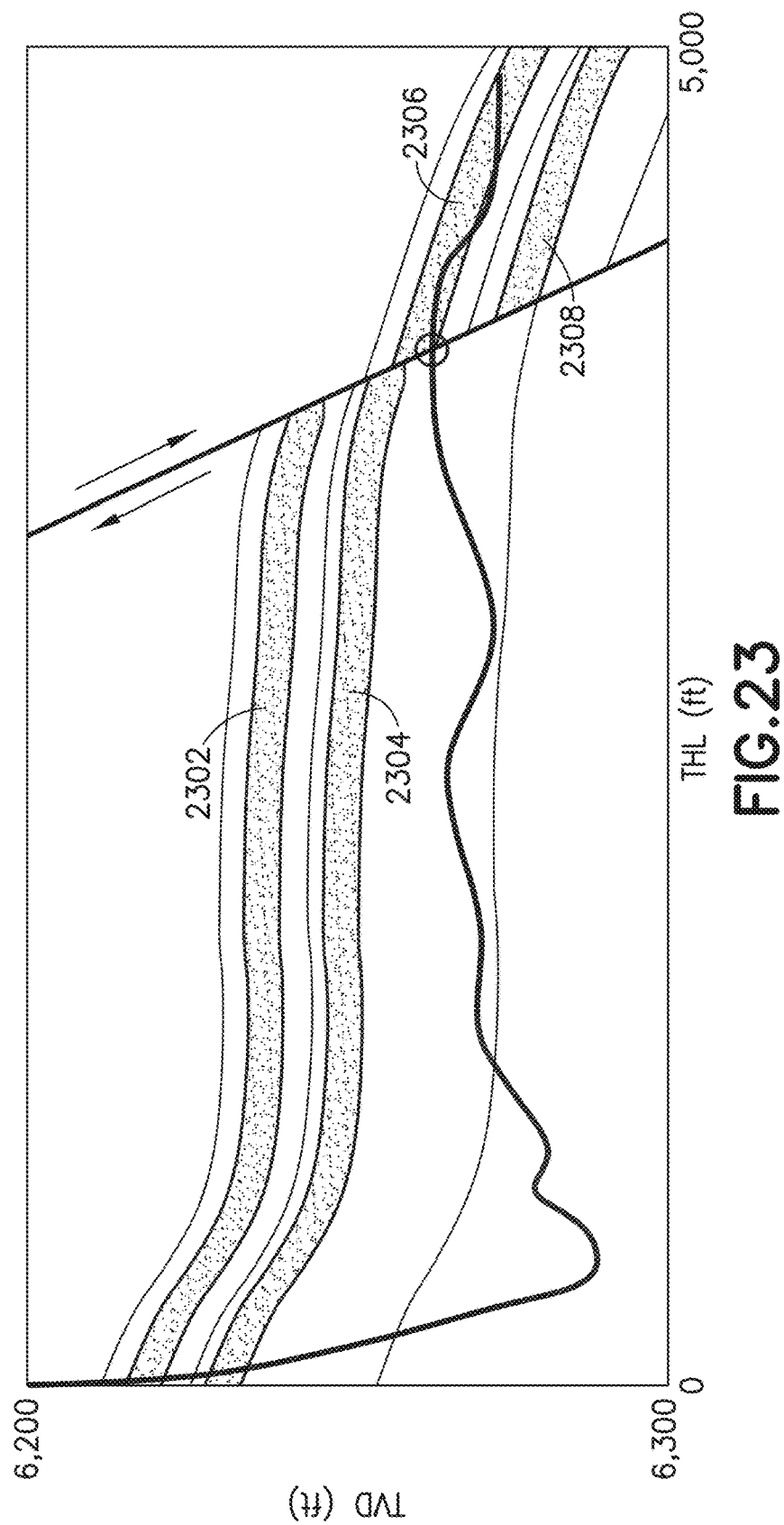
FIG. 23 illustrates a stratigraphic profile with an identified fault using GR log panels from TST3D in accordance with embodiments disclosed herein.

Once the fault intersection location is known, regional tectonic knowledge could suggest whether it is more likely to be a normal (extensional) or reverse (compressional) fault. A GR curtain section with faults could be generated in some embodiments using an approach similar to the one described in FIG. 17. The difference is that in the case of presence of a fault, bending of the layer-cake models may be limited to, or done independently within, each fault block. Additionally, the correlation made in FIG. 21 may be used to constrain the faulted curtain section. FIG. 23 shows a faulted curtain section generated based on information in FIGS. 21 and 22. Note that the wellbore crosses a shale bedding (gray) layer twice, once in the upthrown block layer 2302 and again in downthrown block layer 2306. In contrast, another shale bedding layer is faulted out near the toe of the well, seen once at in the upthrown block layer 2304, but downthrown block layer 2308 is not intersected by the well.

In process 1408 of FIG. 14, directional GR or LWD borehole images may be incorporated into a model of the formation using any of the formation measurements and techniques described above.

Figure 24:
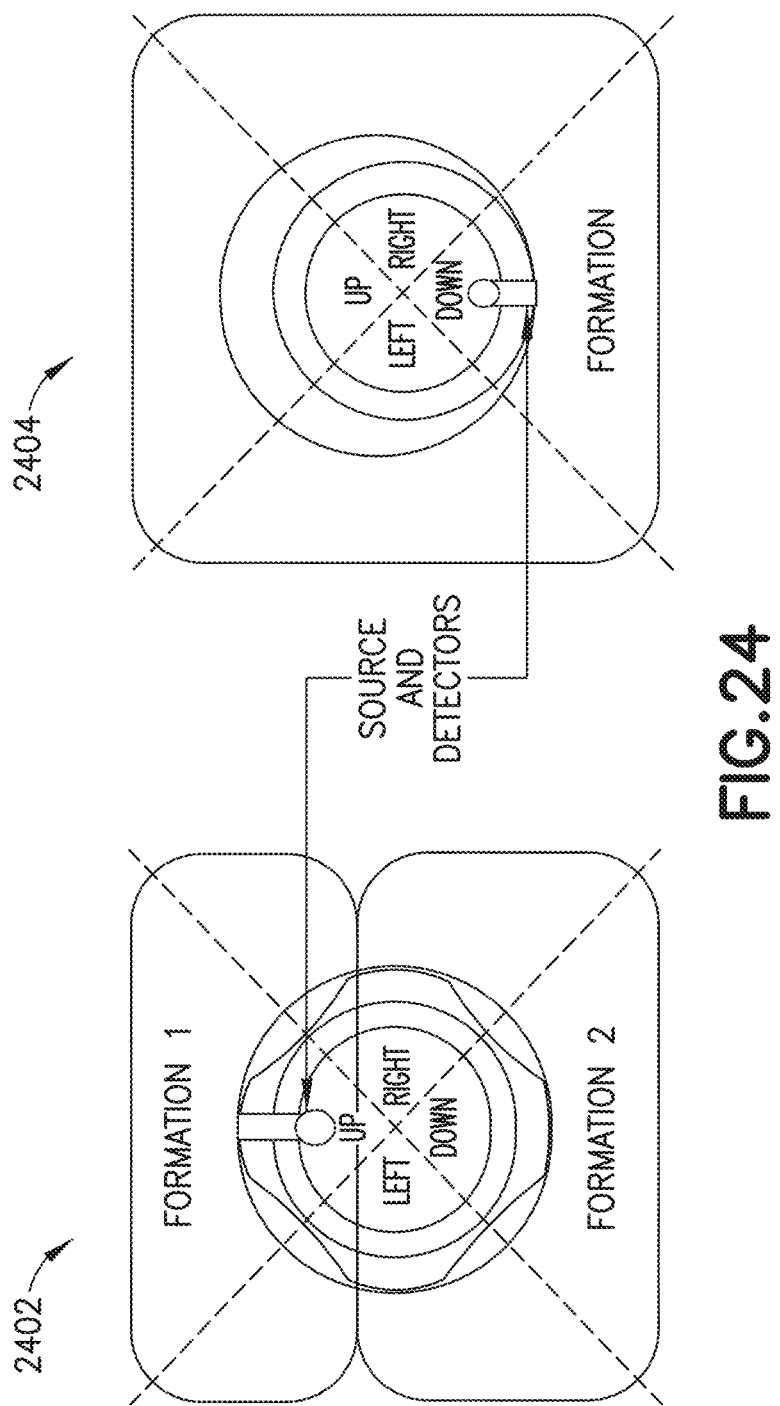
FIG. 24 illustrates cross sections of horizontal wells investigated by an azimuthal tool in accordance with embodiments disclosed herein.

With particular respect to FIG. 24, azimuthal tools such as 2402 and 2404 generate LWD borehole images by measuring formation properties azimuthally with a directional sensor as the BHA rotates around the borehole, providing 360° coverage in some embodiments. Stabilized, centered tools such as 2402 may have minimal standoff from the formation, while the slick tools (as demonstrated by 2404) contact the surface of the borehole directly. In one or more embodiments, azimuthal measurements may assist the differentiation of formations types and layer contacts (as shown in 2402) and help applications such as geosteering.

Figure 25:
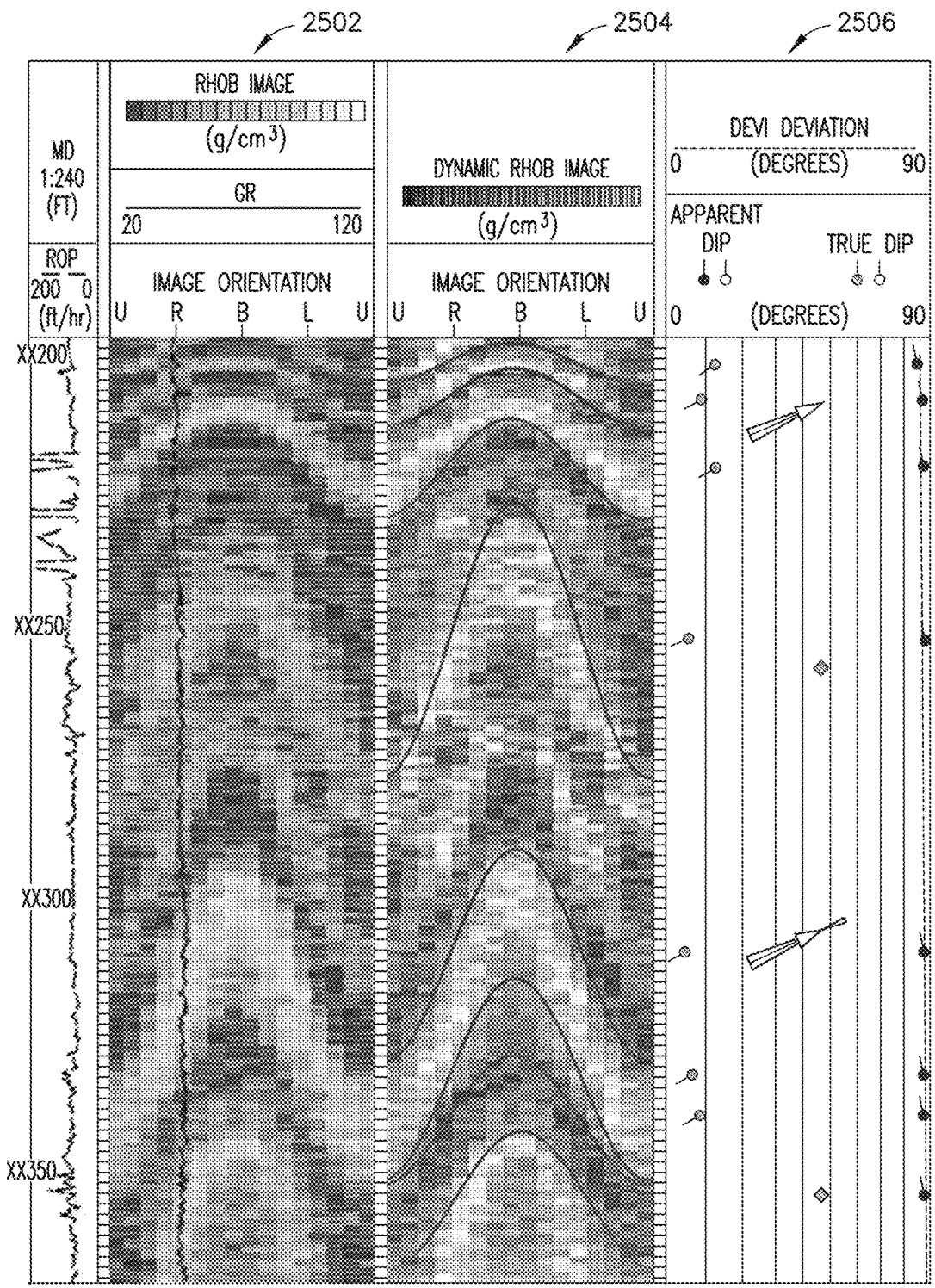
FIG. 25 depicts borehole image measurements in accordance with embodiments disclosed herein.

From the borehole images, geological structures, such as bed boundaries, faults, and fractures, may be identified in real time. With particular respect to FIG. 25, borehole images from 16-sector density RHOB measurements may be used to identify structural and porosity information while drilling. Unlike laterolog resistivity measurements, nuclear measurements and images can be made in conductive and nonconductive mud systems. A graduated color scale is assigned to the range of measurements encountered. Borehole images, oriented by tool magnetometers and accelerometers, are plotted with reference to the top of the hole or true north. In FIG. 25, the scale is in feet and abbreviations are as follows: U=up, R=right, B=bottom, and L=left. True dips are shown as gray tadpoles in 2506.

A shown in FIG. 25, images indicate whether the bit moved up or down within the stratigraphic section in areas of structural uncertainty. This may facilitate steering the well to follow and drill a specified target, such as a porous or permeable layer. For TST3D workflow, such images can be used to increase confidence in the stratigraphic and structural interpretation. When available, borehole images may be incorporated into the final model.

Figure 26:
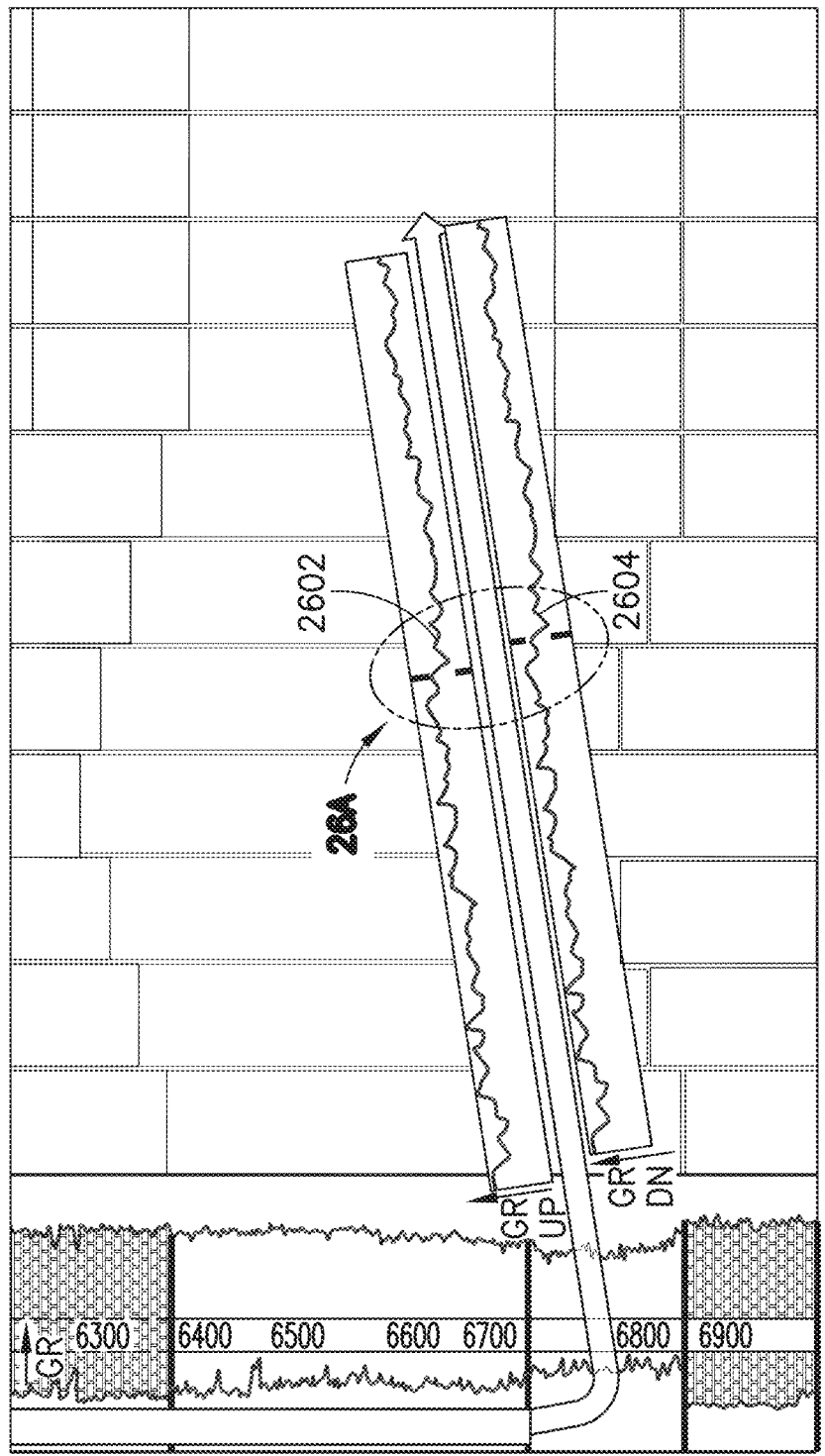
Figure 27:
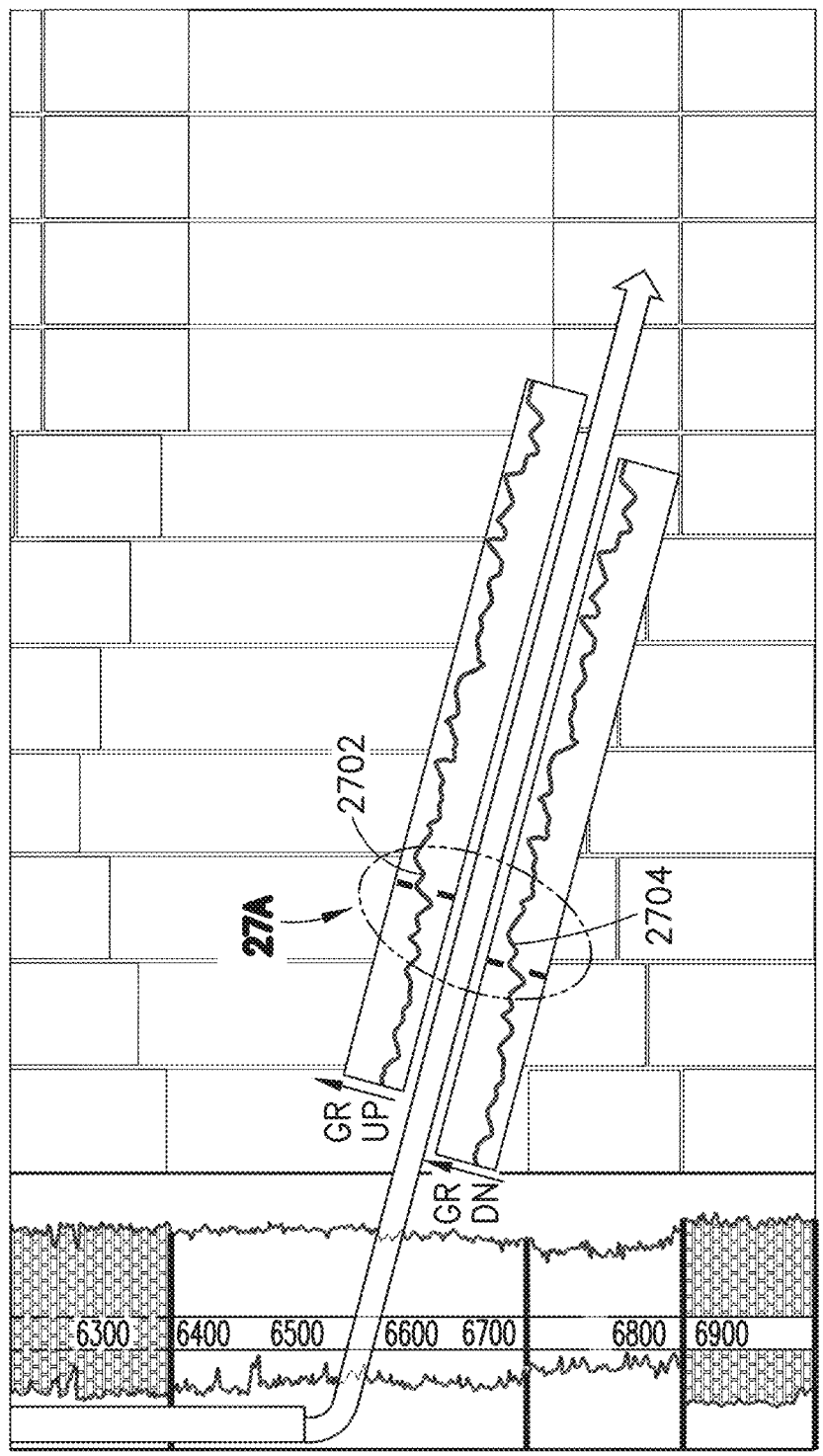
FIGS. 27 and 27A are a schematic diagram of an apparent negative phase shift between up and down facing GR logs in a borehole penetrating a stratigraphic section in accordance with embodiments disclosed herein.
Figure 28:
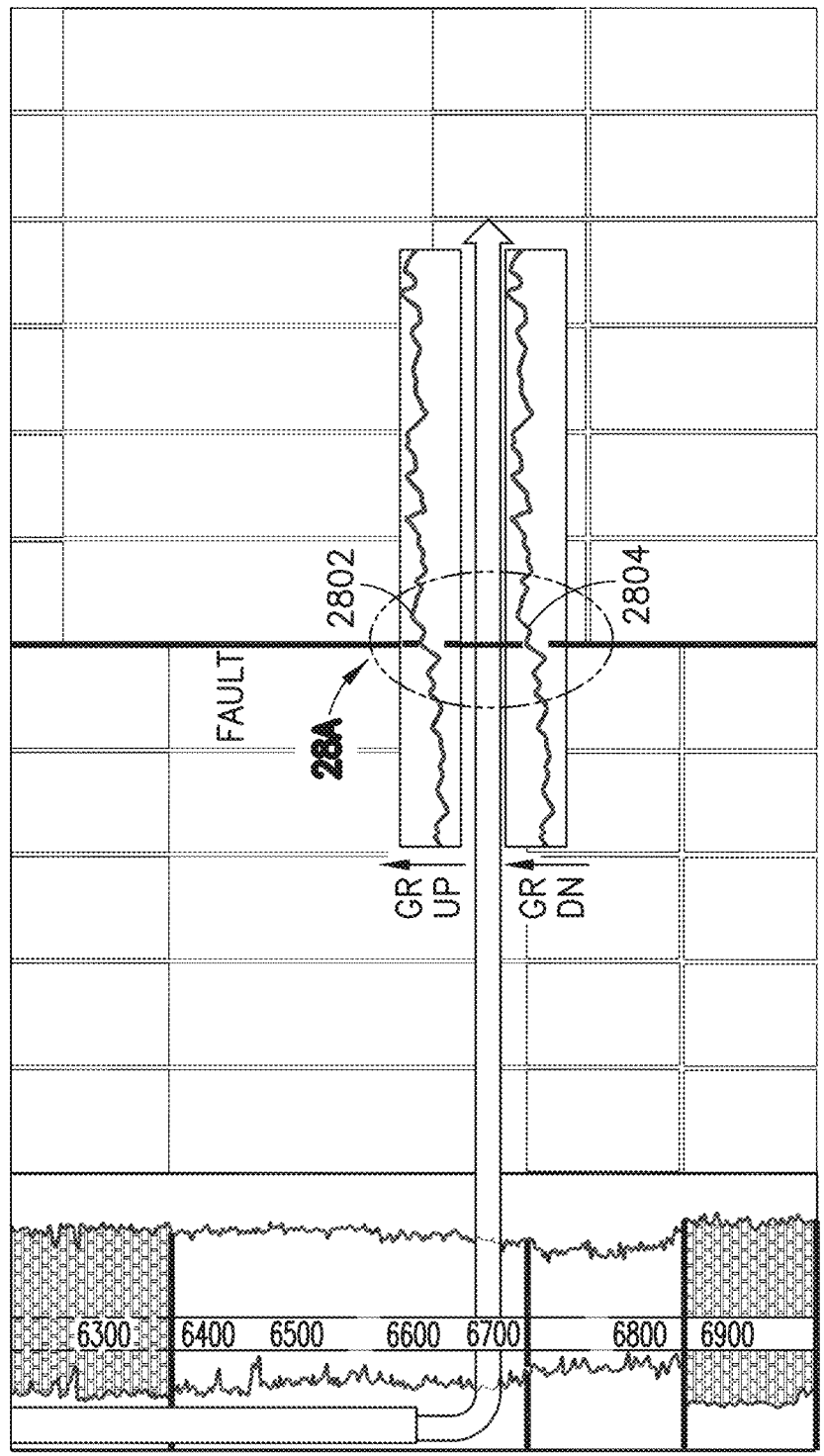

In some embodiments, directional GR logs may be more widely available than other LWD borehole images due to operational cost constraints. FIGS. 26 through 28 show possible ways in which such logs could be used to determine if the borehole moved stratigraphically up or down through the section. Left and right GR logs could be used to assess the amount of noise in the measurement in some embodiments.

Apparent "phase shifts" in log peaks could be determined in the up and down GR values to help define the borehole path with respect to stratigraphic layers. For example, a positive phase shift (FIGS. 26 and 26A) suggests the borehole moved up through the section. With particular respect to FIG. 26A, the GR log from the top of the borehole 2602 detects the overlying low-GR formation before the GR log of bottom of the borehole 2604. This kind of information could be used to supplement TST3D determinations to develop more accurate stratigraphic and structural models.

Figure 27A:
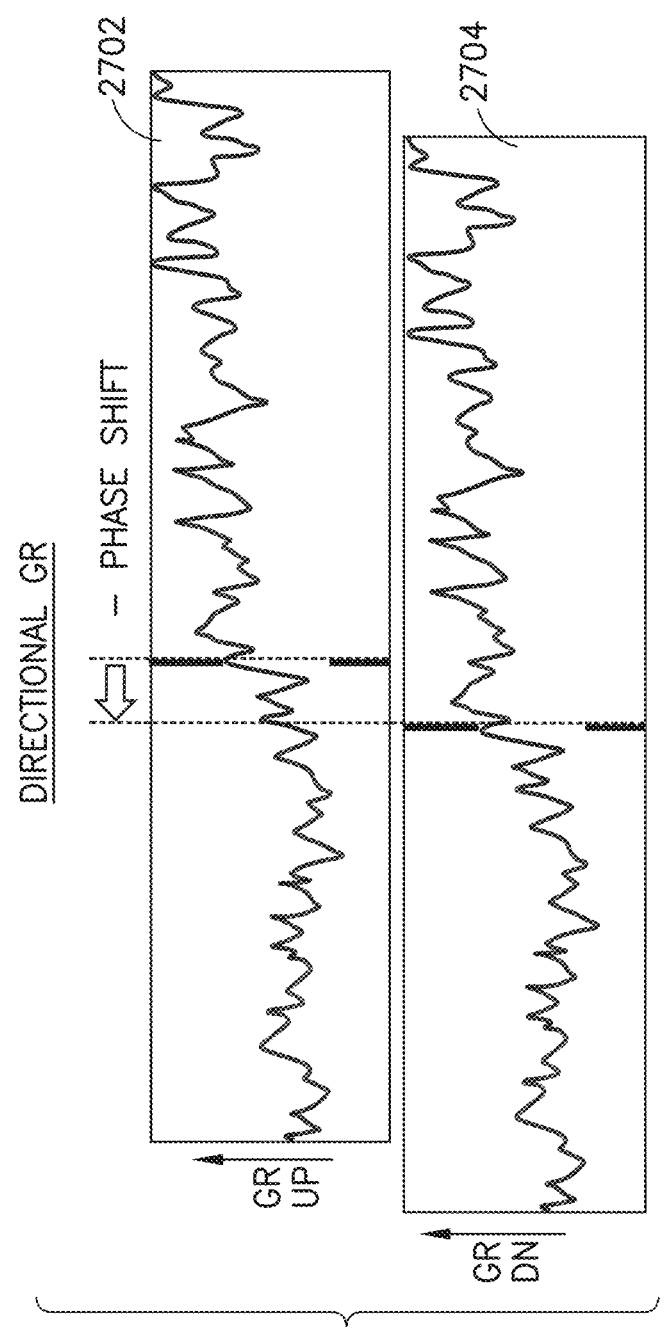

On the other hand, a negative phase shift suggests the borehole moved down through the section. With particular respect to FIGS. 27 and 27A, the GR log from the bottom of the borehole 2704 detects the underlying radioactive-element bearing layer before the GR log from top of the borehole 2702. This kind of information could be used to supplement TST3D determinations to develop more accurate stratigraphic and structural models.

Figure 29:
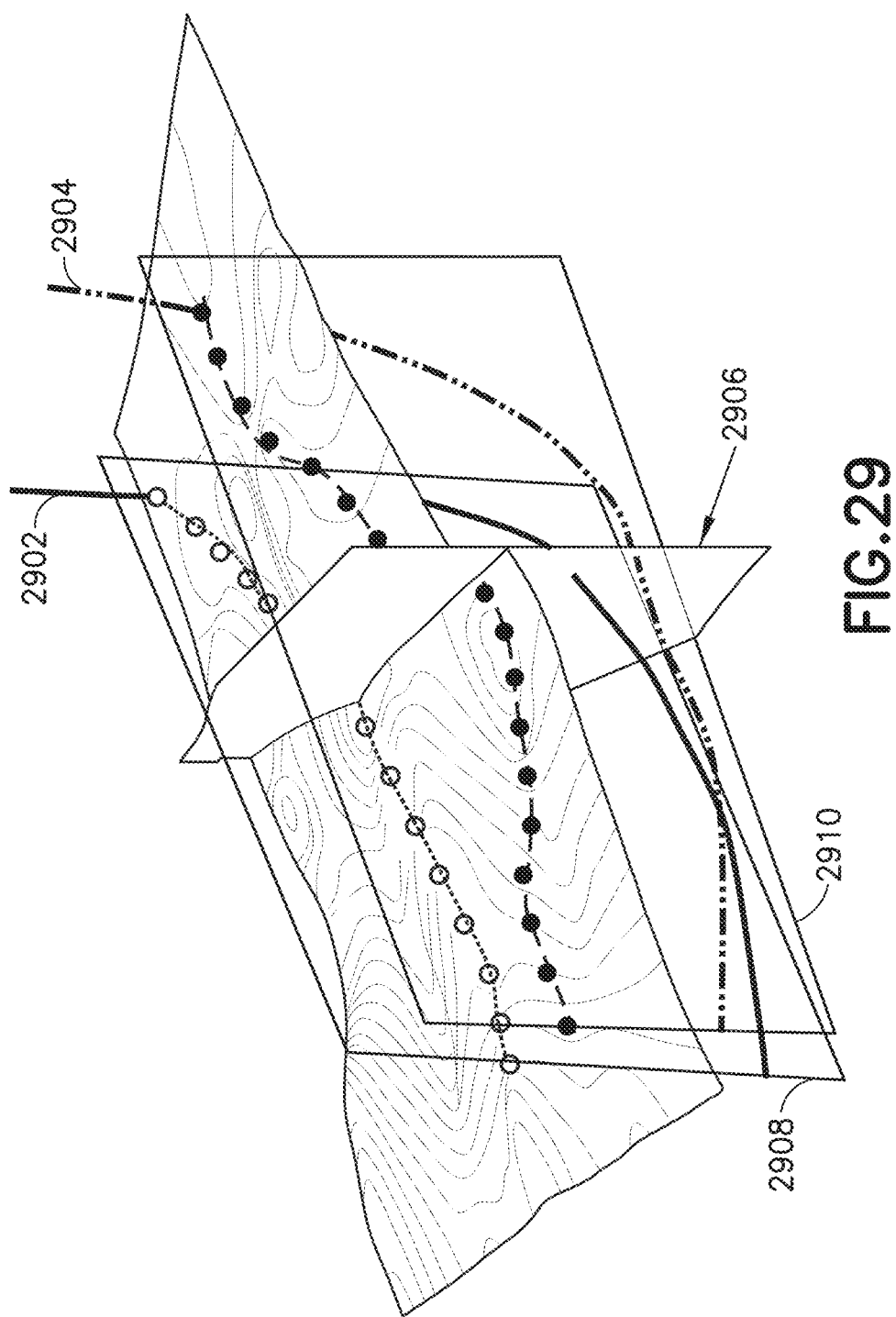
FIG. 29 is an illustration of a refined 3D structural surface created with a fault in accordance with embodiments disclosed herein.

A sudden baseline shift in both up and down GR values, with no apparent phase shift, could be a fault indicator (FIGS. 28 and 28A). FIG. 28A is a schematic diagram of a simultaneous baseline shift with no apparent "phase shift" between up and down facing GR logs in a borehole that moved across a fault, in rock layers parallel to stratigraphic section in accordance with embodiments disclosed herein. With particular respect to FIG. 28A, the GR logs from top and bottom of the borehole simultaneously detect the radioactive carbonate across the fault at 2802 and 2804. This kind of information could be used to supplement TST3D determinations to develop more accurate stratigraphic and structural models;

In process 1414 of FIG. 14, 3D structural models may be created using the information derived from the previously discussed techniques. After converting modeled surfaces in curtain sections into control points (as described in FIG. 18, for example), a 3D structural model can be generated that honors all control points. With particular respect to FIG. 29, an illustration of a 3D structural surface with a fault 2906, generated using extracted points as local constraints or anchor points from curtain sections of two interpreted deviated wellbores, which intersect the surface from the upthrown block, pass through the fault, and move into the downthrown block. As shown in FIG. 29, the model is derived from control points (dots) extracted from curtain sections (2908 and 2910) taken from deviated wellbores 2904 and 2902.

In process 1416 of FIG. 14, TST3D may be re-calculated in some embodiments using updated structural models. In one or more embodiments, an updated structural model may be created by computing TST3D from an initial reference surface, and then honoring control points extracted from the curtain sections. The original reference surface may be replaced by an updated surface in some embodiments. Such updating may be desired in some instances where the updated surface corrects for the presence of both stratal dip and faults, such that a new TST3D depth reference may be re-calculated and verified as to whether the updated stratigraphic and structural model is more accurate reasonably than the original model.

With particular respect to FIG. 30.1, a display of GR logs is shown in re-calculated TST3D panels using an updated (faulted) structural surface as a reference. Comparison of graphs using this technique may serve as a form of validation of whether the interpreted stratigraphic and structural models are plausible and satisfactory. TST3D calculations based on the faulted surface are illustrated in FIGS. 12 and 13. Compared to FIG. 22, the new TST3D model in 30.2 exhibits the fault with vertical offset. Furthermore, the display of the GR log in the re-calculated TST3D panels FIG. 30.1 also suggests the log correlation has been improved because the GR patterns are now aligned horizontally at the same TST3D.

As shown in process 1418 of FIG. 14, TST3D workflow processes may be performed iteratively in some embodiments until plausible and satisfactory stratigraphic and structural models are achieved. Once the models are built, it is then possible to distribute attributes such as porosity, permeability, lithology, total organic carbon, and geomechanical properties for sweet-spot mapping at the interwell and full-field scale. In one or more embodiments, an unsatisfactory result may be remedied by recalculating the reference surface (process 1420) and repeating processes 1402-1416 of FIG. 14.

Automated Fitting Processes

In one or more embodiments, methods of generating structural models of highly deviated or horizontal wells may be generated from TST3D measurements. In some embodiments, structure interpretation may involve three inputs: (1) one or more deviation surveys of a horizontal well, (2) one or more log measurements, such as a LWD gamma ray log or other formation measurement, and (3) a 3D reference structural surface. The process may optimize the data for a 3D reference surface by bending the initial surface by one or more locations (defining a hinge axis) to enhance fit. At each hinge axis and bending angle, the vertical plane along the well path (curtain section) of well log response models is updated and the modeled averaged (or squared) gamma ray logs are compared with the real measurements in a series of sequential TST3D panels that display modeled and real response in a TST projection. The bending location and angles are adjusted until the difference between modeled and real log response falls below a certain quantitative threshold within the each display panel.

While the examples and associated discussion discuss bending operations in terms of changing the dip along a two-dimensional plane, it is also envisioned that the 3D reference surface may also modified by rotation of the surface or changing the azimuthal angles of the surface to enhance the fit with information obtained from one or more measurements. Further, reference surfaces may be modified using a combination of bending and rotation in some embodiments.

In one or more embodiments, the process may proceed from the minimum to maximum measured depth in the wellbore (from heel to toe of the well). Changes in surface bending in the current panel may leave the previously matched panels unchanged or may affect the adjacent previously matched panel but usually in limited MD interval. In some embodiments, a satisfactory structural interpretation may be regarded as when all log measurements and the modeled log models match in all the specified sequential TST3D panels.

In cases in which there may be ambiguity in whether an upward- or downward bend at a hinge axis would lead to a better model, additional constraints may be applied to guide the structural bending process without departing from the scope of the instant disclosure. In one or more embodiments, a dynamic operational tree structure may be created to store the operation steps and respective information generated in the automation process. Each node of the tree corresponds to one bending of the surface and contains the hinge axis and the optimum bending angle information. Alternatively, interpretation results could be generated, stored, and traced by traversing different branches of the tree.

In one or more embodiments, if no pilot well available, a vertical pseudo pilot well may be created by projecting the measurements using computed TST3D onto an equivalent vertical pilot hole that shares the same wellhead location as the horizontal well. The log signature in the pseudo pilot well is updated after each bending operation in the optimization process.

With particular respect to FIGS. 31.1-31.3, an illustration of the beginning of the automated process is shown. FIG. 31.1 shows the gamma ray measurement encountered in the drilled well (broken black curve) and the modeled gamma ray response (black curve), which is generated from the gamma ray curtain shown in FIG. 31.2 (from the top to the bottom). The curtain section in FIG. 31.2 represents a vertical panel along the well path, where the y-axis is true vertical depth (TVD) and the x-axis is true horizontal length (THL). The graph in FIG. 31.3 represents a curtain section of FIG. 31.2 flattened on a particular reference surface datum, wherein the y-axis in this projection is true stratigraphic thickness (TST).

Figure 32:
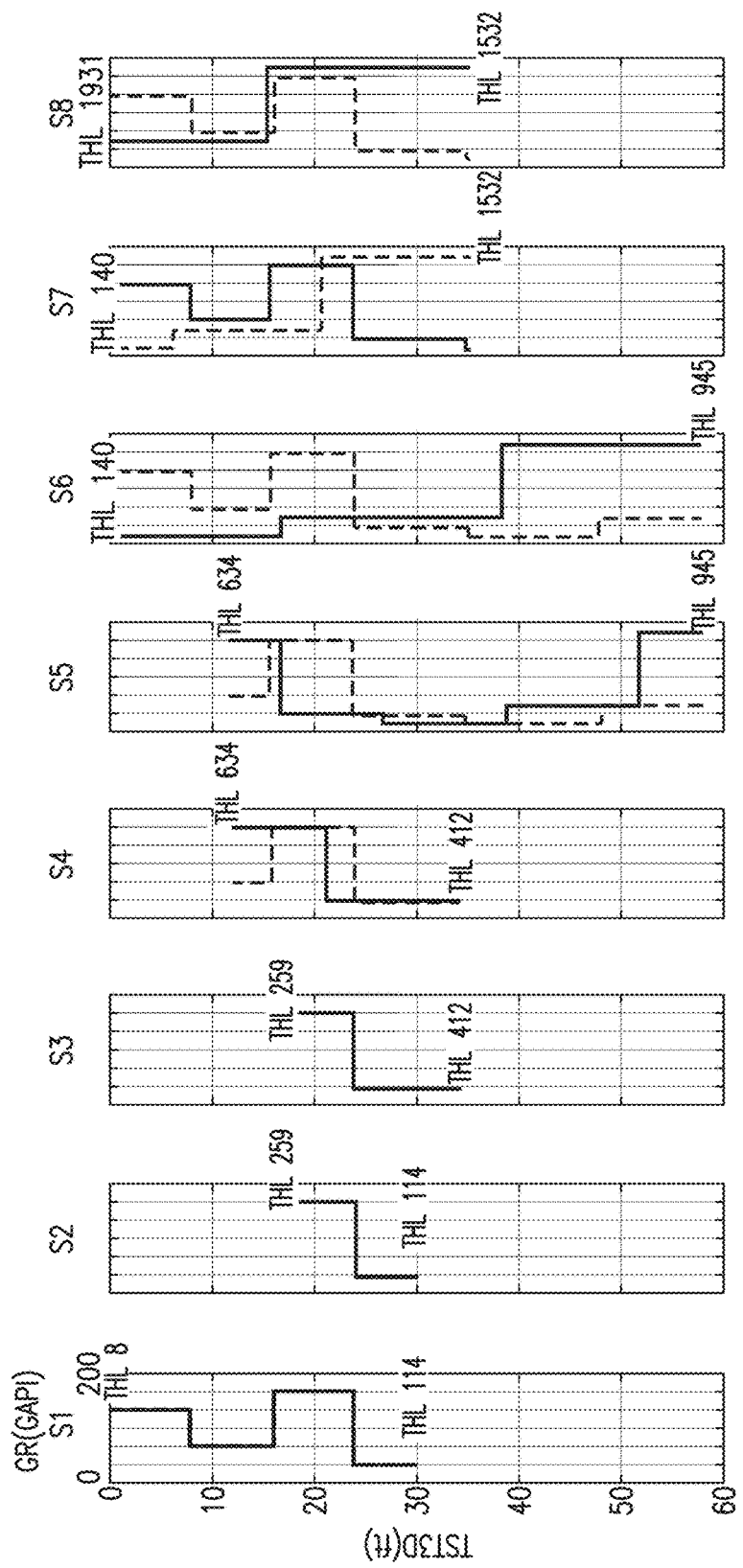
FIG. 32 is an illustration of a comparison of GR log panels from TST3D wellbore measurements in accordance with embodiments disclosed herein.

With particular respect to FIG. 32, after the first bending operation, the gamma ray logs in the first three split panels S1-S3 have been matched satisfactorily, but mismatch between the traces is observed in panels S4-S8. Additional bends in the model may be added farther down the well from where satisfactory matches were made (at larger measured depth). The optimum bending true dip angle may be altered to minimize mismatch error in some embodiments. The angle β, beta, indicated in the curtain section (3102 in FIG. 31.2) is the apparent dip of the 3D reference surface in the plane of the curtain section. In one or more embodiments, the process progresses toward the toe of the wellbore until the mismatch between measured and modeled response lies below an acceptable quantitative threshold as determined by the user.

In some embodiments, an automated approach may be applied to create structural models using data derived from multiple horizontal wells by either using the intersection of each interpreted structural profile from a given well as control points or perturbing a common structural surface. Further, automated structural interpretation workflows based on basic well log responses such as LWD gamma ray measurements from deviated and horizontal wells, may be faster and more accurate compared with some manual interpretation processes.

In one or more embodiments, automated processes may be performed by comparing the measurements and forward-modeled log response using TST3D panels projected in a TST reference frame, and using optimization algorithms to minimize the mismatch between actual and modeled log response. The matching between the measurement and the forward-modeled logs may enhance the correct spatial alignment of the log measurement signatures at the same true stratigraphic thickness in some embodiments.

As introduced above in regards to forward modeling approaches to increase fit between forwarded log models such as squared logs and measured data (see, for example, the discussion regarding FIG. 17), where there is ambiguity in whether an upward- or downward bend at a hinge axis would lead to a better model, additional constraints may be applied to guide the structural bending process. These constraints may include, for example, a regional dip constraint, a minimum or maximum bending limit, or a pattern matching method to find similar log signature responses based on pilot well logs or recently encountered measurements.

In embodiments in which a reference log from a vertical pilot well is not available, a pseudo pilot well reference log may be created dynamically during the automated interpretation process by projecting the measurement of the horizontal well onto an equivalent vertical hole using the computed TST. Further, this reference log response may be updated every time a new bend is introduced into the model in some embodiments.

In one or more embodiments, a dynamic tree structure may be used to store all the operational steps and respective information. For example, a tree structure may be used to store all possible interpretation structural models, and retrieval of the information may involve following the appropriate active tree branches. Such approaches may allow a user or automated fitting method to generate alternative reasonable interpretations efficiently, instead of a single unique solution.

Automated processes in accordance with the present disclosure may be applied to create structural models of multiple horizontal wells in some embodiments by either using the intersection of each individual interpreted structure profile as control points or perturbing an initially shared 3D structural surface. In addition, automated approaches for structural interpretation of horizontal wells may be used for other logs and measurements in addition to gamma ray. For example, by screening many possible interpretations that are generated by the automated approach through forward modeling of other measurements, errors may be minimized by decreasing reliance on data that is either of low quality or low information content that is not corroborated by the additional information.

Automated Work Steps

The following example is included to illustrate an embodiment in an automated process which is used to perform wellbore characterization using TST3D approach. While the log measurements used in the example are derived from GR logs, it is envisioned that any wellbore log or measurement methods capable of describing formation characteristics as a function of depth may be adapted for use in embodiments of the present disclosure.

In one or more embodiments, work steps for the automation of the structural interpretation may include of the following steps:

(1) Upload measurements from a pilot well and perform log squaring (such as segmentation and averaging) of well log data.

In some embodiments, wellbore characterization may be begin by obtaining stratigraphic information from a pilot wellbore or pseudo pilot wellbore in order to determine formation characteristics such as surface layer boundaries and bedding layer dip. As used herein, "log squaring" is an averaging process that segments a log into sections based on a segmentation scheme (e.g., identifying curve inflection points), and then computes an average or representative value for all the measurement values between the segment points. Log squaring may be used in some embodiments to facilitate numerical comparison between measured and modeled log values in a stratigraphic interval.

Figure 33:
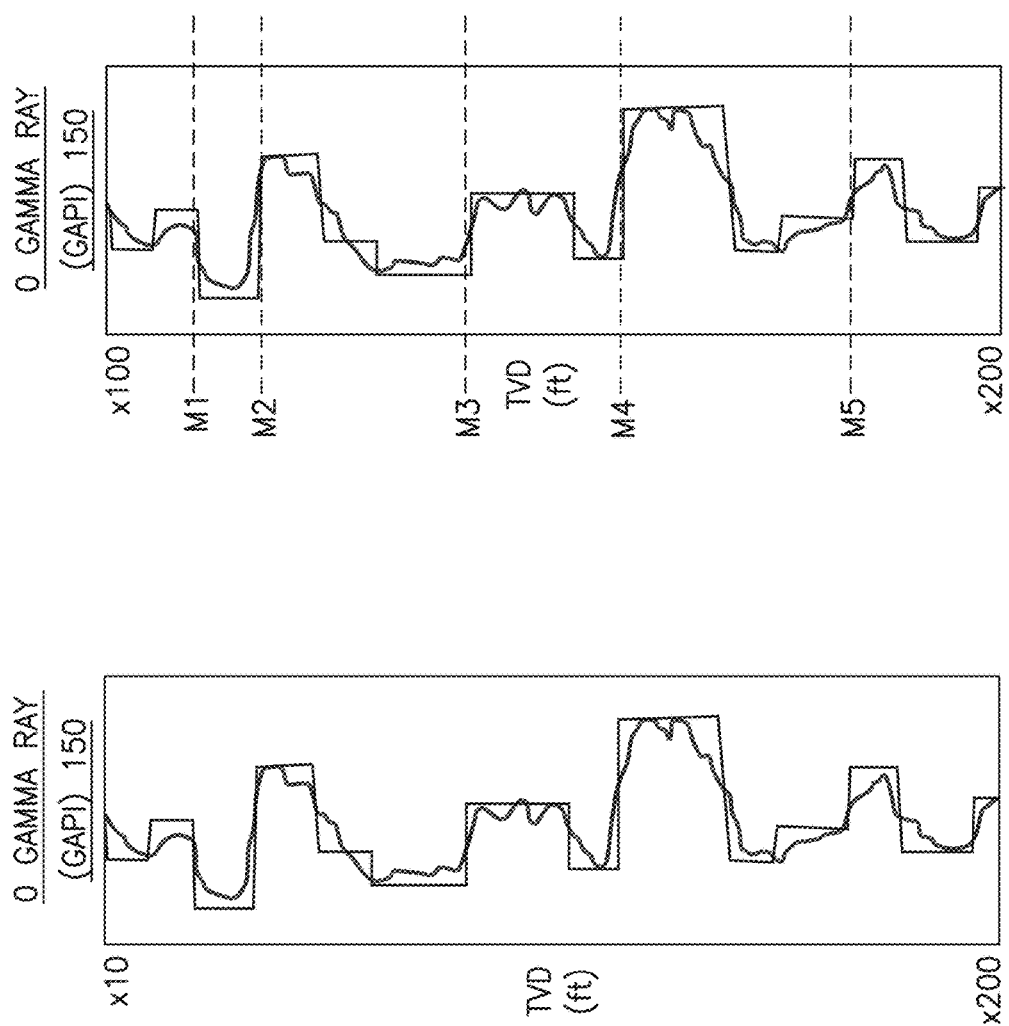
FIGS. 33.1 and 33.2 depict the selection of surface markers with a squared GR log in accordance with embodiments disclosed herein.

With particular respect to FIG. 33.1, an example of a GR log displayed in TVD from a vertical pilot well is shown in which a squared log curve (thinner solid line) is superimposed upon the data to aid the identification of surface layer boundaries.

(2) Define surface markers by picking well tops.

In some embodiments, surface markers may be selected from squared log data to define the boundaries between distinct stratigraphic layers. With particular respect to FIG. 33.2, five surface markers (horizontal dashed lines) are selected based on the squared log in FIG. 33.1 for use in the working example. In one or more embodiments, marker selection may be done algorithmically or manually by a user.

(3) Create a layer-cake model of GR data based on the squared GR log.

In some embodiments, a layer-cake model may be generated to represent the obtained stratigraphic information graphically. As used herein, "layer-cake" may refer to a model having constant thickness or constant layer property within the modeled layers across a defined spatial domain.

Figure 34:
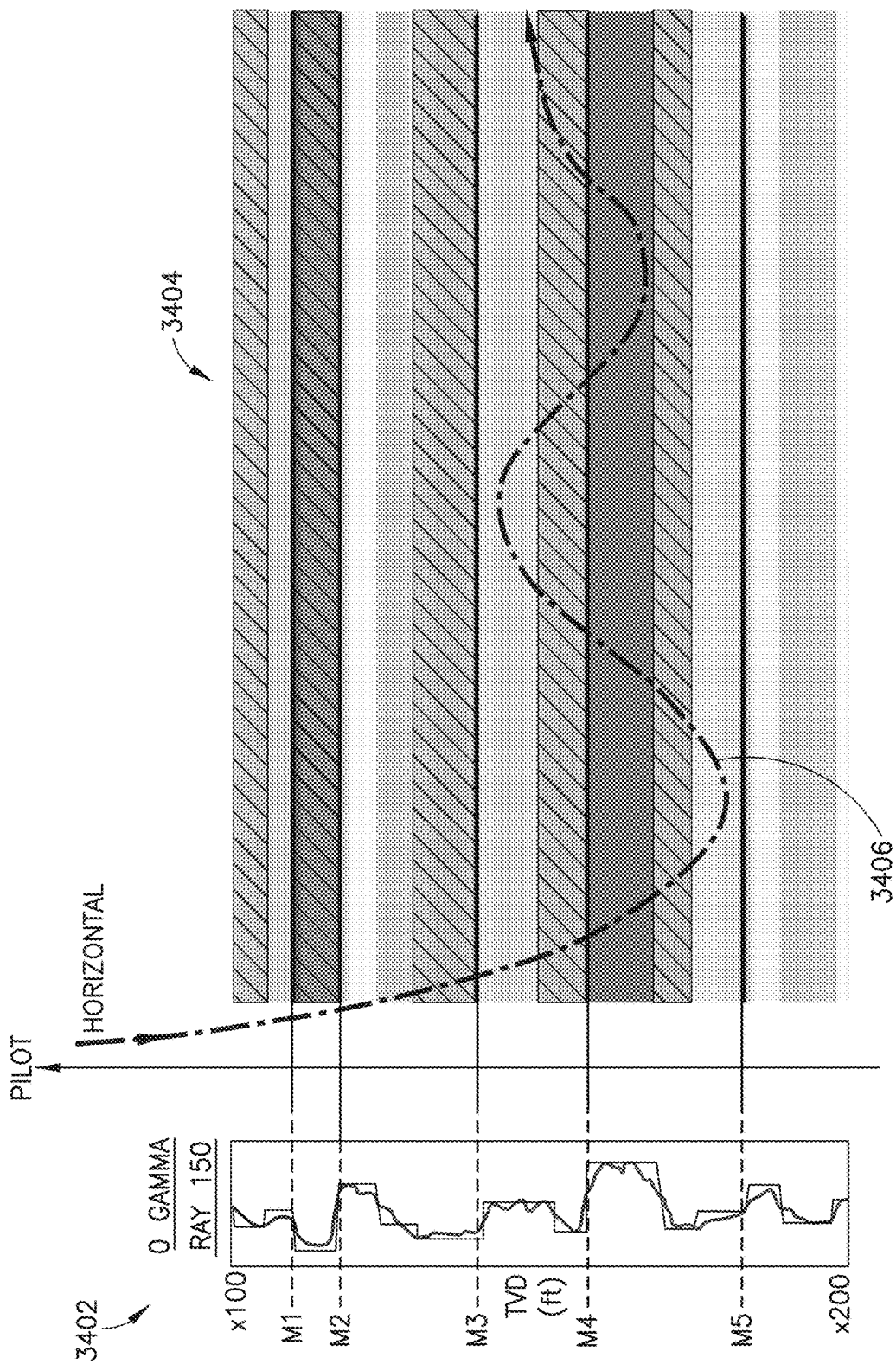
FIG. 34 is an illustration of an initial gamma ray model crated using a squared GR log form a vertical pilot well in accordance with embodiments disclosed herein.

With particular respect to FIG. 34, an illustration of an initial layer-cake model of GR response 3404 created from a GR squared log 3402 obtained from a vertical pilot well. The vertical well section was determined by a horizontal well trajectory that is indicated by a thick dashed line 3406. In the initial gamma ray section model, shading indicates the magnitude of the gamma ray values from low (light gray) to high (dark gray) and the horizontal dashed lines are the surface markers identified and extended from the pilot well. A constant layer thickness and constant layer property within a given layer was assumed in creating the gamma ray section model.

The remaining procedures may be performed in an iterative fashion by bending a reference surface, producing an updated GR log section that may be used for comparison with forward modeled GR response measurements.

(4) Upload a 3D reference surface.

In one or more embodiments, a 3D reference surface that is input into the working model and may be, for example, derived from a stratigraphic surface modeled from well or seismic data. In some embodiments, in which surface data is not available, a simple dipping plane ($\beta=\beta_0$) with a specified dip azimuth ($\alpha=\alpha_0$) may be generated and input into the model.

Figure 35:
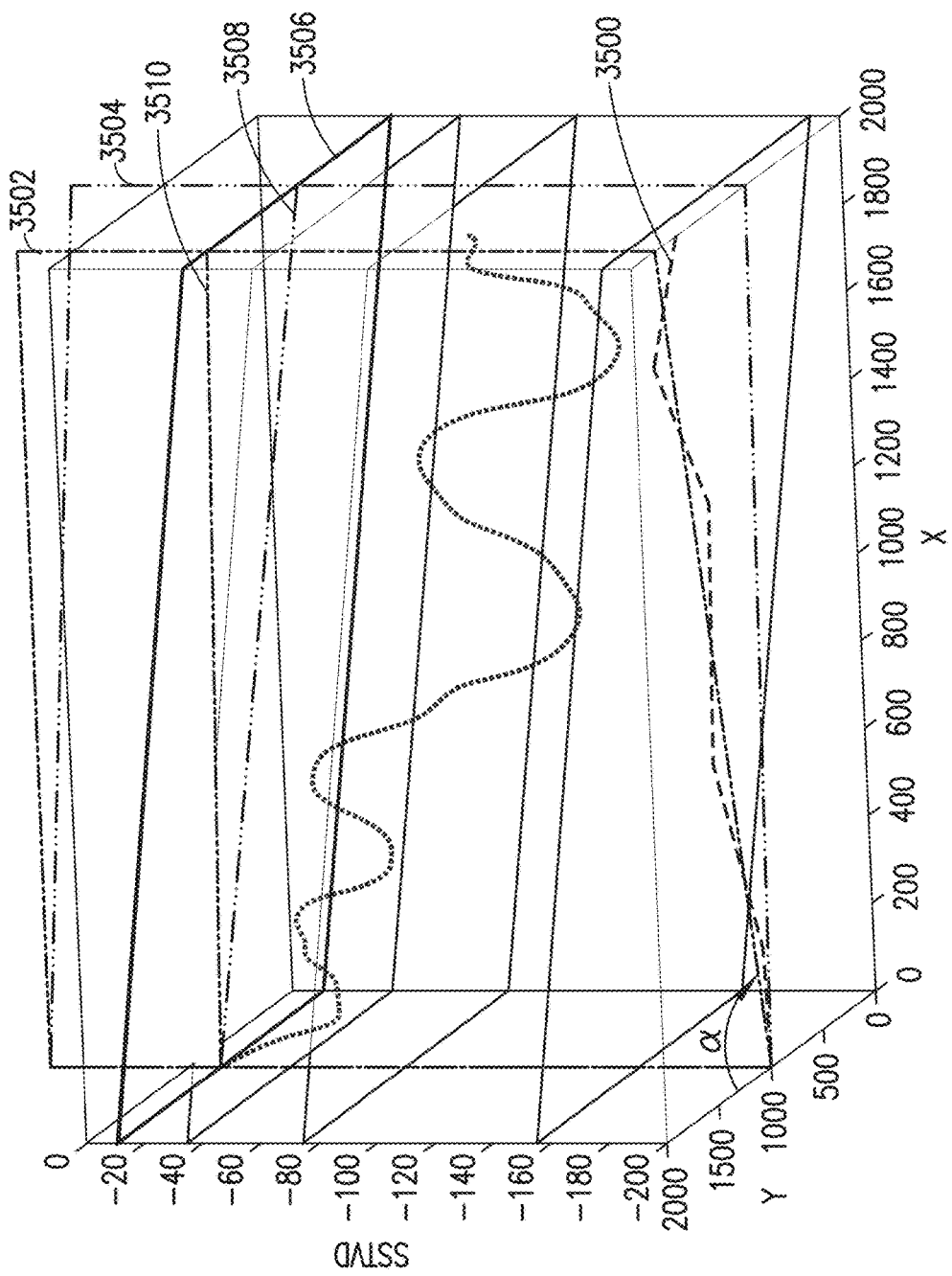
FIG. 35 is a perspective view illustrating a synthetic well trajectory and an initial dipping reference surface in accordance with embodiments disclosed herein.

With particular respect to FIG. 35, an initial dipping plane with the N-S strike direction and a horizontal well path is shown. MD is defined as zero as the wellbore penetrates the reference surface and increases as the wellbore moves towards the TD (total depth) of the well path. The dotted zig-zag line 3500 in the XY-plane represents the horizontal (map view) projection of the well trajectory. In the embodiment shown in FIG. 35, the vertical plane 3502 represents a best-fit plane of the wellbore trajectory that has an azimuth $\alpha$. However, the use of a best-fit plane may be excluded in some embodiments. The reference surface 3506 dips east (090 azimuth); the vertical plane 3504 is perpendicular to the strike direction (N-S direction) of the dipping plane. Both the true dip and apparent dip angles may be measured by the angles between the dashed line 3508 and the dashed line 3510, which are the intersection lines of both vertical planes, and the horizontal plane respectively.

The relationship between the true dip angle of a reference plan and its apparent dip angle in a deviated or horizontal well section may be written in some embodiments as:

$$\tan \beta_2 = \cos(\alpha) \tan \beta_1 \qquad (3)$$

where $\beta_1$ is the true dip and $\beta_2$ is the apparent dip; $\alpha$ is the azimuthal angle of the well section; the azimuth angle of the dipping plane in this illustration is 90 (the plane faces South direction).

Figure 36:
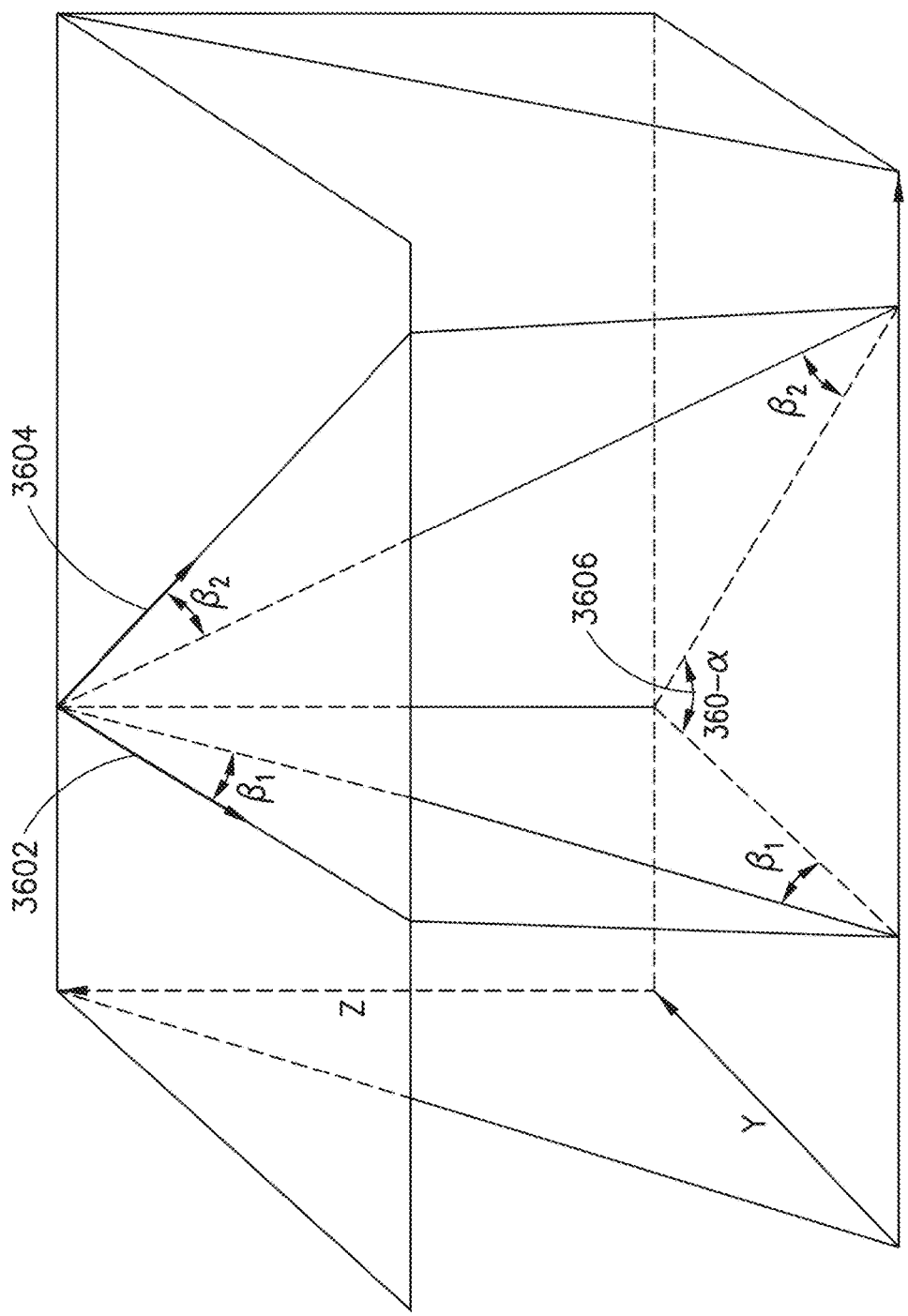
FIG. 36 is a perspective view illustrating the relationship between the true bedding dip angle and apparent bedding dip angle along an arbitrary vertical section in accordance with embodiments disclosed herein.

With particular respect to FIG. 36, a schematic illustrates the relationship between true dip $\beta_1$ 3602 and apparent dip $\beta_2$ 3604 angles along an arbitrary vertical section in accordance with some embodiments of the present disclosure. The Y-axis points to the North and 3606 is the azimuthal angle ($\alpha$) of a vertical section. The reference plane dips to the South 180 degrees.

As shown in equation (3), apparent dip cannot exceed the true dip. As the azimuthal angle ($\alpha$) increases from 0 to 90 degrees, the apparent dip angle decrease from the true dip angle to zero that corresponds to the case of the vertical intersection plane being perpendicular to the dip direction of the bedding plane or parallel to the strike direction of the bedding plane.

(5) Compute TST3D along the wellbore based on the reference surface and the well survey.

In the next process, TST3D is computed between the reference surface and the well survey data. In some embodiments, a vertical pilot may be created near a well head of a deviated well path and a well log curve, such as from a gamma ray log, may be extracted. In this example, the synthetic 3D gamma ray model is a layer-cake model in the form of a squared log of the pilot hole, and may be used directly to generate an initial curtain section.

As shown in FIGS. 37.1-37.3, a 3D layer-cake gamma ray model was constructed having a top layer surface created by bending a horizontal plane in three different locations by 3 true dip angles: at 3, 2, and 1 degrees respectively. A horizontal well trajectory (such as that shown in FIG. 35) may then be generated and the gamma ray values at each MD location where it intersects with the 3D gamma ray model may be extracted to serve as true measurement.

With particular respect to FIGS. 37.1-37.3, an illustration of an embodiment of a first iteration of an automated interpretation process is shown. In FIG. 37.1, the black curve is the measurement and the broken line staircase curve is the forward-modeled gamma ray log along the wellbore as the wellbore insects with each gamma ray model layer in the curtain section model. FIG. 37.2 represents a vertical panel along the well path, where the y-axis is true vertical depth (TVD) and the x-axis is true horizontal length (THL). FIG. 37.3 is a gamma ray section in terms of TST3D, which shows flattened layer-cake gamma ray distribution produced when the layer thickness is assumed to be constant. The wellbore may then be divided into a series of segments according to the monotonic change of the currently computed TST3D values.

In the above example, the bedding true dip angle ($\beta_1$) is 1 degree and the apparent dip angle ($\beta_2$) as indicated in the curtain section can be computed using equation (3). The x-axis represents the THL (True Horizontal Length), which is defined as the total length of the projected zig-zag lines in XY plane from the current MD point to the initial MD locations (MD=0).

In FIGS. 37.1-37.3, evidence of mismatch is shown between the measurement (broken line in FIG. 37.1) and the forward-modeled response log (black line in FIG. 37.1). This can be explained by the fact that the initial dip angle (1 degree) deviates from the truth that the first piece of the reference surface is a plane with a true dip angle ($\beta_1$) of 3 degrees.

(6) Display the error between the measurement and the forward model by sequential TST3D split panels.

In the next step, sequential TST3D panels are compared and adjusted to correct for observed mismatches between panels. With particular respect to FIG. 38, GR log data obtained in FIGS. 37.1-37.3 is displayed in a series of TST3D split panels. Each panel corresponds to the segment of the wellbore that either drills down or up in the entire MD interval once a reference surface is specified. The initial reference surface with the true dipping angle ($\beta_1$) is 1 degree is used in FIGS. 37.1-37.3.

Particularly, the misalignment of the GR model data (broken line curve) compared to the measured GR data (black) is observed in the progression of panels, which may be an indication that the wrong reference surface dip is being used at that location in the model data. In one or more embodiments, one goal of an automated algorithm may be to match the measurements with the forward-modeled log model panel by panel (shown from left to the right in FIG. 38) by gradually updating the reference surface by bending the initial reference surface at series of hinge axis by optimum true dip angles.

(7) Compare TST3D Panels to Optimize Fit.

Figure 41:
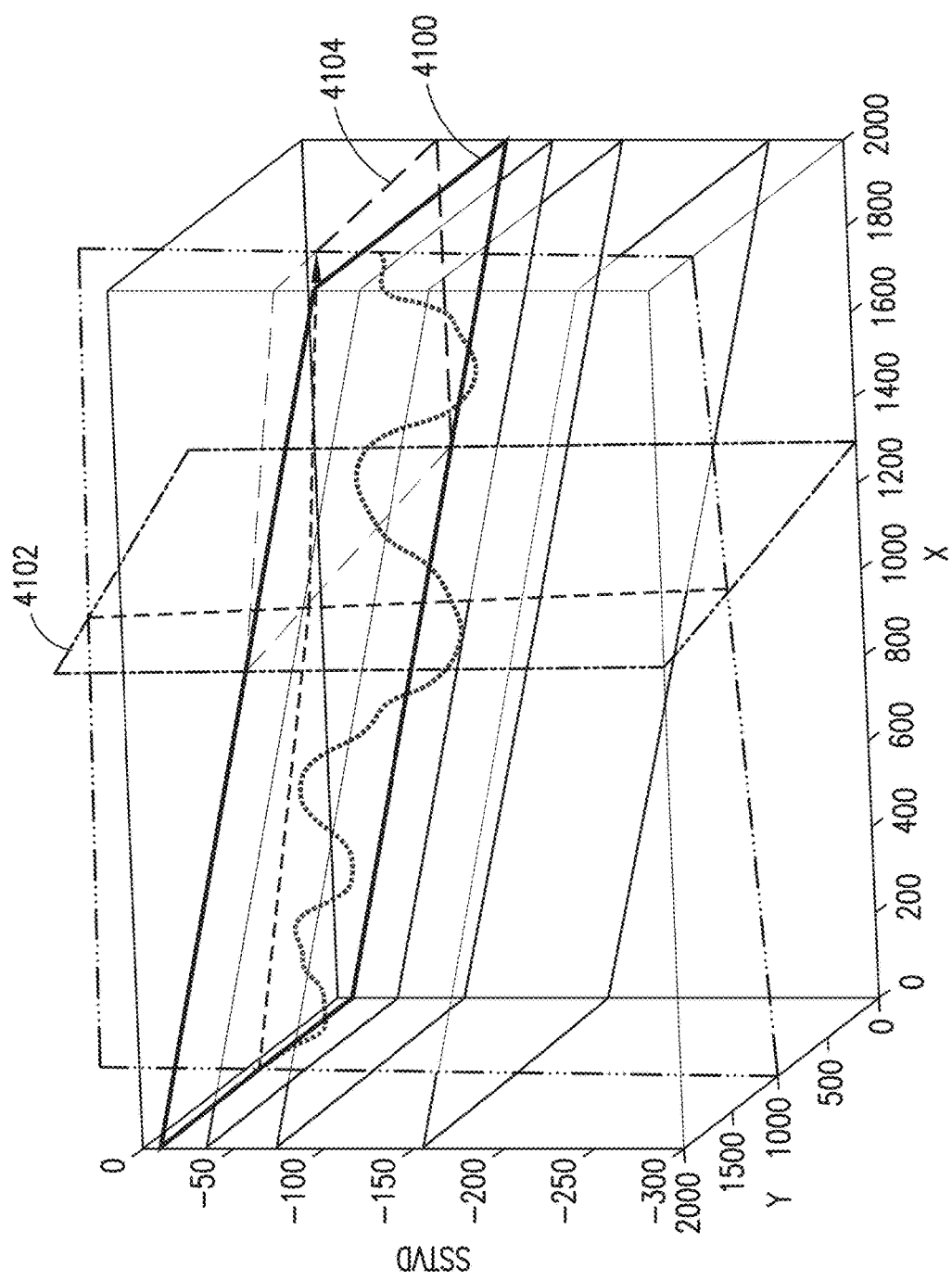
FIG. 41 is a perspective view illustrating a bending operation on a reference surface in accordance with embodiments disclosed herein.

In the next step, gamma ray curtain sections may be optimized by matching a first several consecutive TST3D split panels (see S1-S8 of FIG. 38, for example) by bending the reference surface plane (see FIG. 35 and FIG. 41 for the illustration) to correct for the best fit true dip angle that reduces mismatch error among possible bending dip angles below a predefined threshold. Mismatch error may be calculated in some embodiments as the average relative error in each of the studied TS3D split panel intervals, computed, for example, by the following formulae:

$$H(\beta_i) = \frac{1}{K_1} \sum_{k=1}^{K_1} E_k(\beta_i) \qquad (4)$$

$$E_k(\beta_i) = \frac{1}{N(k)} \sum_{j=1}^{N(k)} \frac{|GR(k, j) - GR\_sq(k, j)|}{\max\{GR(k, j); j = 1, 2, \ldots, N\}} \qquad (5)$$

where $E_k(\beta_i)$ is the average relative mismatch error between the GR measurement and its squared log value in the k-th split panel with k=1, 2, . . . , $K_1$ (in which $K_1$ is the total panel number) being the consecutive satisfactorily matched panels; Function N(k) is the total number samples of the k-th panel; $H(\beta_1)$ is the average error across the matched $K_1$ panels for the bending true dip angle (of the surface) $\beta_i$ (i=1, 2, . . . , m). The best bending true dip angle of the reference surface is determined by the results that leads to minimum $H(\beta_1)$.

In some embodiments, the azimuthal angle of the surface plane ($\alpha_0$) may remain unchanged during optimization processes in accordance with the present disclosure and the perturbation of the reference surface is only associated to the changing of its true dip angle. The respective apparent dip of the wellbore section may be computed using equation (3) in some embodiments and the optimal true dip angle $\beta_1$ of the reference surface may be conducted by looping through all possible angles within an angle interval centered at the current value by a fixed pre-defined incremental amount and with plausible limits on the bending angle from one segment to another.

Figure 40:
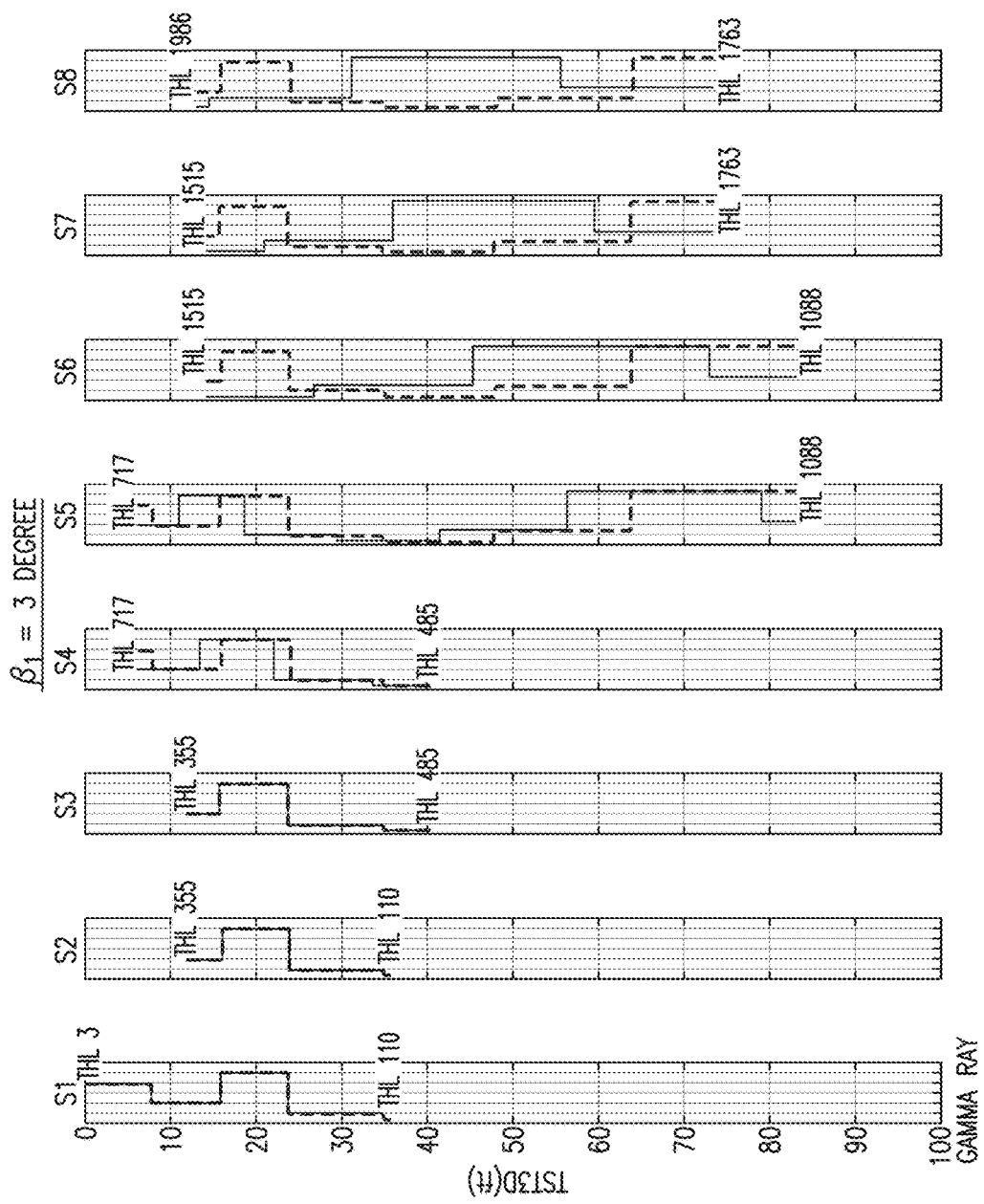
FIG. 40 illustrates a display of TST3D split panels created from subsequent iterations of an automated interpretation process in accordance with embodiments disclosed herein.

FIGS. 39.1-39.3 show the gamma ray curtain section models and FIG. 40 shows the TST3D split panels resulting from the optimal bending of the reference surface by a true dip angle $\beta_1$ of 3 degrees. Note that the mismatch between the gamma ray measurement and the forward-modeled log response in the first panel of FIG. 38 has been corrected in FIG. 40. Furthermore, there is satisfactory matching in the S2 and S3 panels as well. In this example, the parameter $K_1$>=3 as defined in equation (4) above.

Figure 38:
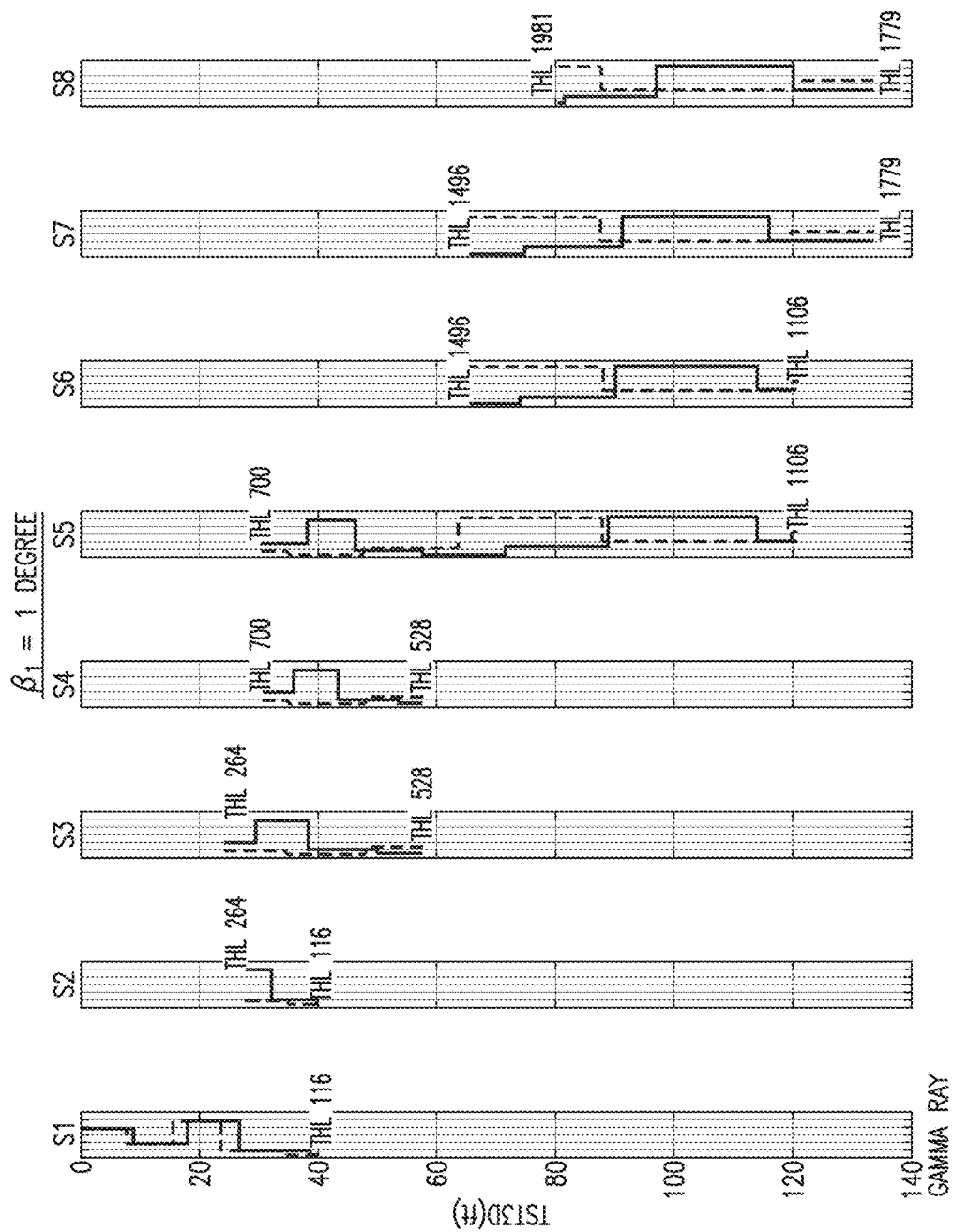
FIG. 38 illustrates a display of TST3D split panels created from GR log measurements and forwarded log data in accordance with embodiments disclosed herein.

With particular respect to FIGS. 39.1-39.3, a GR log model is bent to achieve the optimum initial bending angle in which, for this particular example, a plane having true dip angle of 3 degrees gives the best fitting of the forward-modeled gamma ray model compared to the measurement in the first three split panels (see FIG. 38). FIGS. 39.1-39.3 show the resulting corresponding gamma ray curtain section and the measurement and matched forward model.

With particular respect to FIG. 40, the corresponding TST3D split panels are shown after the adjustment described in FIGS. 39.1-39.3. After bending the initial plane by a true dip angle of 3 degrees, the TST3D of every measurement point on the well path is re-computed and the split panels are updated as shown. Here satisfactory agreement between the gamma ray measurement (black curve) and the forward log (broken line curve) is achieved in the panels S1-S3. The first mismatch occurs (which is assumed to have a mismatched error larger than a predefined threshold) in the S4 around the location TST3D=25 feet, which corresponds to approximate true horizontal length (THL) of 600 feet. Next, the bending location moves forward to minimize the error in S4, which lies in the first third of the interval between the starting THL (485 feet) and the place where the error occurs (roughly THL=600 feet). However, in other embodiments the error within the first third of the interval may be a user-defined parameter between interval (0, 1).

(8) Find the next bending hinge axis location of the surface plane and search for the optimal true dip angle.

Once the bending hinge axis is determined, the optimal bending true dip angle can be determined. With respect to FIG. 41, an illustration of the bending operation on the reference surface is shown. The bending location along the wellbore is first estimated as illustrated by the reference surface 4100. A vertical plane 4102 perpendicular to the reference surface bedding dip and intersecting the estimated THL or corresponding MD location of the wellbore is drawn and the intersecting line between this vertical plane and the previously updated reference surface is used as hinge rotation axis to bend the surface to position 4104. Here, the surface bend angle is selected by minimizing the gamma ray error in updated TST3D split panels to determine an optimum true dip angle for the newly bent section of the well.

Figure 43:
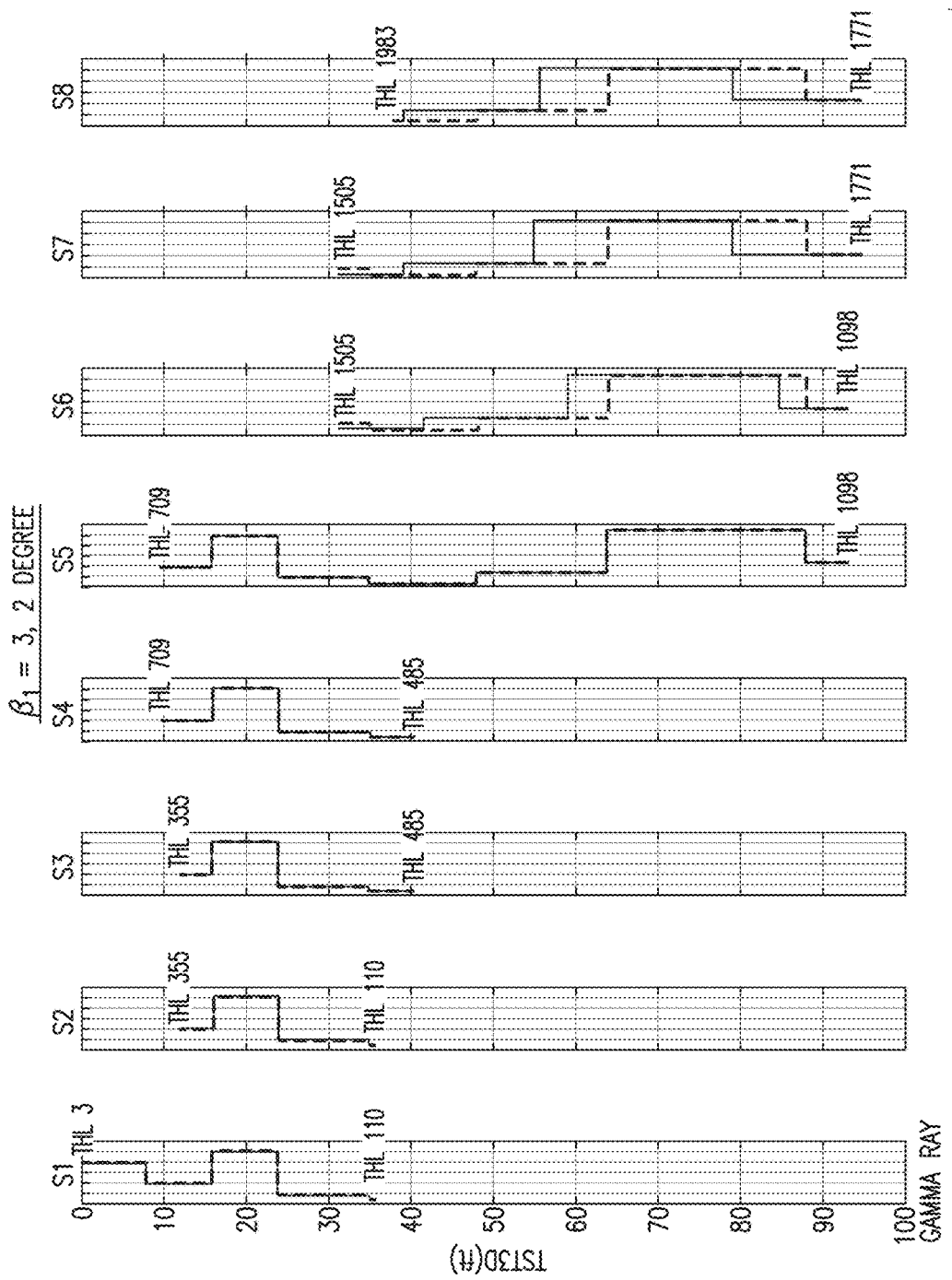
FIG. 43 illustrates a display of TST3D split panels created from subsequent iterations of an automated interpretation process in accordance with embodiments disclosed herein.

FIGS. 42.1-42.3 and FIG. 43 illustrate the results of the gamma ray curtain section models and the split panels after the second optimized bending operation (true dip angle $\beta_1$=2 degrees) on the reference surface. Here, the mismatch in the panel S4 of FIG. 40 has been corrected to lead to satisfactory matching in both of the panels S4 and S5 of FIG. 43.

With particular respect to FIGS. 42.1-42.3. The updated gamma ray curtain section models after the second round of automated bending (to a true dip angle of 2 degrees). Compared with FIGS. 39.1-39.3, the mismatch between the measurement and the forward gamma ray model has been corrected in the THL interval (600-1150).

With particular respect to FIG. 43. This TST3D display results from the updated reference surface after the $2^{nd}$ optimum bending of the surface in FIGS. 42.1-42.3. The model and measured logs in the THL interval corresponding to split panels S4 and S5 in FIG. 40 are now matched.

(9) Continue Optimization

In the next step, the analysis is moved to the next position in which bending and dip angle correction is desired by repeating the process outlined in step (8). The process is continued until the mismatch in the successively updated TST3D split panels has been corrected and the error has dropped below a user-specified threshold.

Figure 45:
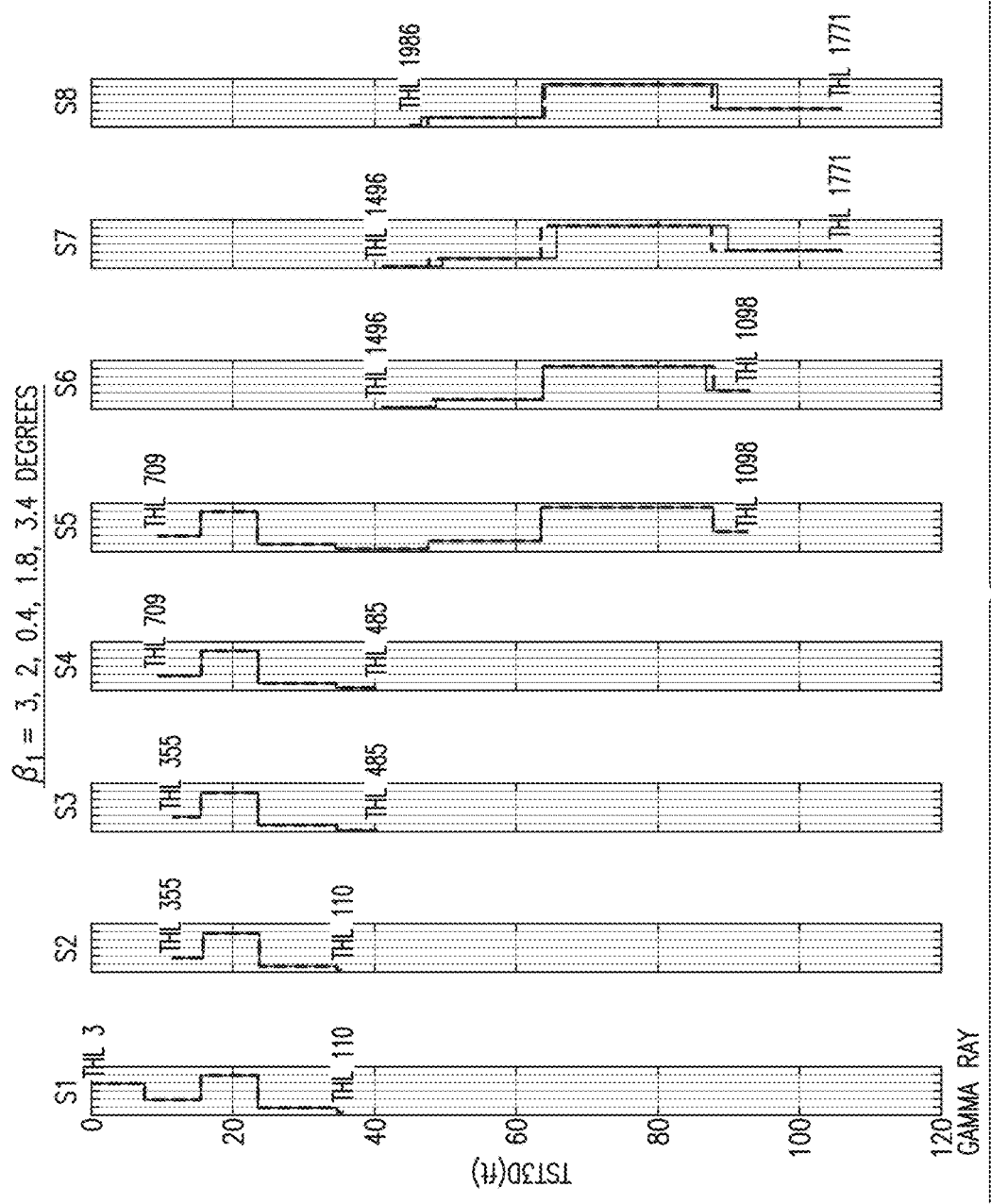
FIG. 45 illustrates a display of TST3D split panels created from subsequent iterations of an automated interpretation process in accordance with embodiments disclosed herein.

FIGS. 44.1-44.3 and FIG. 45 show the final results by successively applying optimal operation on the reference surface. With particular respect to FIGS. 44.1-44.3, the final result after four consecutive automated hinge line rotations of the reference plane is shown. The bending true dip angle sequence is 3, 2, 0.4 and 1.8 degrees, respectively, as a function of increasing MD. As shown by the complete overlap of the modeled and measured GR log data in FIG. 44.1, a satisfactory match between the gamma ray measurement and the forward model is obtained.

With particular respect to FIG. 45, the final TST3D split display comparison of measured and forward-modeled GR measurements exhibiting satisfactory matching across the split panels is achieved, which indicates that GR measurement signatures are well correlated and aligned at the same TST3D.

(10) Determine Quality of Data and Repeat Steps (1)-(9) to Reach a Satisfactory Result.

The structural profile of the horizontal well generated using steps (1)-(9) is one interpretations of a given set of structural and well data. It is noted that even though the final result in FIGS. 44.1-44.3 is obtained by four successive bending angles (i.e., 3, 2, 0.4, 1.8, and 3.4); the alternative solution having the bending angles 3, 2, and 1 is also a permissible solution because the computed mismatch between model and measurement lies below the set threshold for this example. Additionally, the bending locations differ from those from the true model. It then follows that multiple interpretations may be used to describe the structure of a given area.

(11) Store Multiple Results in an Operation Tree if Desired.

Multiple solutions may be stored using an operation tree (OT) in some embodiments. With particular respect to FIG. 46, an OT is generated in the course of the automated process to store bending information (for example, bending locations and true dip angles). With particular respect to FIG. 46, an embodiment of an operation tree (OT) structure is shown in which optimal operational information for both of the hinge rotation axis locations and true dip angles may be stored during the course of the automated matching process. The root of the tree is called a virtual node that indicates the initial status of the bending of the initial reference surface. As the operation proceeds to start bending the surface, two alternative optimal solutions are stored as its 2 children nodes, where Node 1_1 represents the best solution and the Node 1_2 indicates the second-best solution. In the diagram, solid circles indicate an active nodes used in the calculation, while dashed circles are used to indicate nodes that may be reactivated if the current best solution fails to provide a satisfactory global match. As shown, fitting proceeds along line 4600 through active nodes, traversing the tree from the top down to final step Node N_1, where N is the total number of the operations. In some embodiments, the OT may be expandable as non-active nodes are activated to arrive at alternative interpretations.

Figure 46:
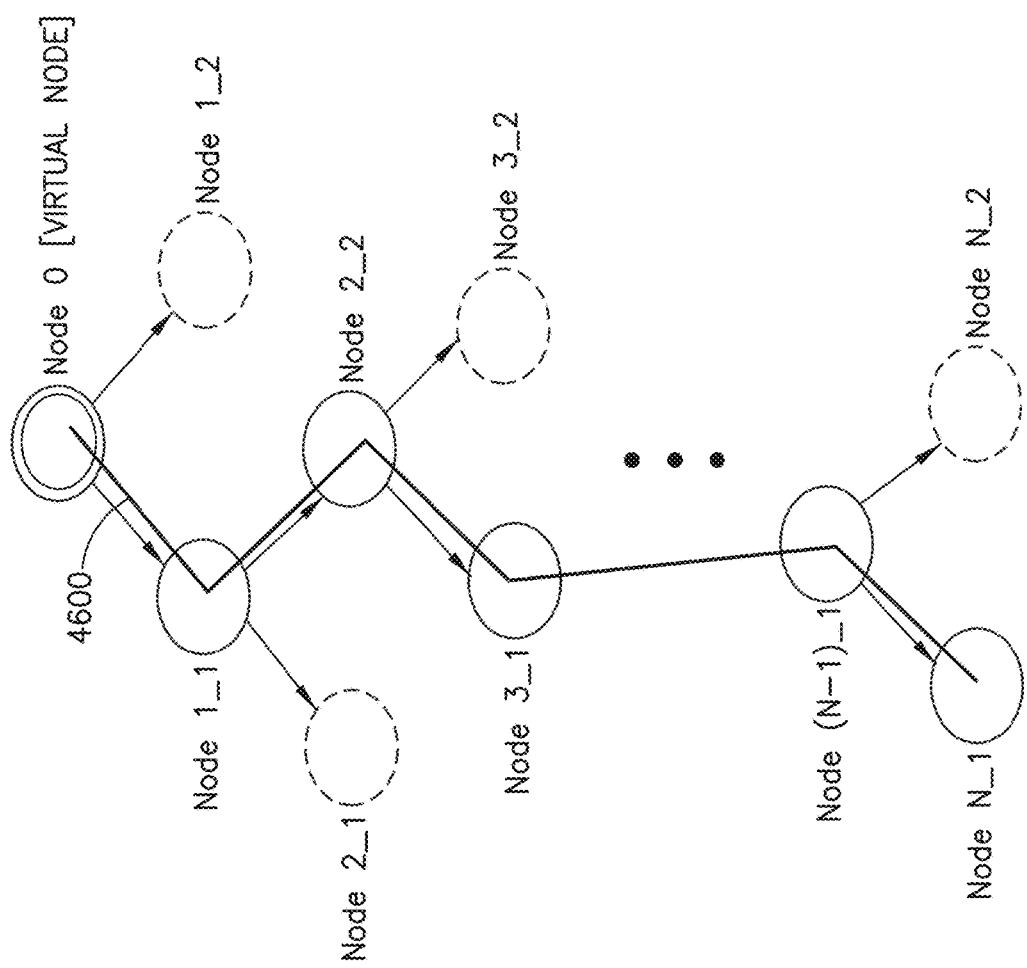
FIG. 46 is a schematic of an operation tree used to store the optimal operation information during the course of an automated interpretation process in accordance with embodiments disclosed herein.

In the presented example, a bending operation on a reference surface plane begins at the root of the tree, or virtual node, and unique solutions for the first surface are stored as children nodes (Node 1_1 and Node 1_2, for example). In FIG. 46, Node 1_1 is regarded as the best solution and the Node 1_2 is regarded as the second-best solution. In some embodiments, inactive nodes such as Node 1_2 may be activated in instances where the best solution fails, and the process then defaults to the second-best solution described by the inactive node. During automated processes, this second-node may be kept to allow for better local matches when using information from more than one bending location in a sequence.

After the first branch, the second optimal bending operation performed on the surface and leads to two new nodes. In this manner, the tree continues to grow until a satisfactory match is obtained between the structural model and the obtained wellbore data measurements across the calculated TST3D split panels. In some embodiments, this may result in a binary tree giving one possible interpretation, while also storing a number of alternative solutions in the leaf nodes. In other embodiments, an OT with multiple children nodes could be generated in a similar fashion by retaining multiple ranked optimal results.

The operation tree is expandable in the sense that any inactive node in the tree can become activated and may be used in another alternative interpretation. This may allow for the generation of a larger number of possible interpretations, all of which may lead to a reasonable final model. Different interpretations could be obtained by rolling back the tree nodes to any levels and starting the perturbation of the surfaces from there to the end of the TD. In some embodiments, OTs may provide not only a useful tool to store possible bending operations, but also a quantitative method to describe the uncertainties in the structural interpretations.

Calculation of TST3D in the Absence of a Vertical Pilot Well

If there is no vertical pilot hole available near the horizontal well, a pseudo (or virtual) vertical pilot well may be created from the available GR log data from the initial downward trajectory of the log and updated to replace the true vertical pilot at every iterative step using the computed TST3D. However, it is noted that when no true pilot available, GR log data may be limited to the formation intervals intersected by the wellbore; if the horizontal or deviated well travels to greater depths than are available in the pseudo pilot wellbore, features present at lower depths may not represented in a pseudo pilot hole.

Figure 47:
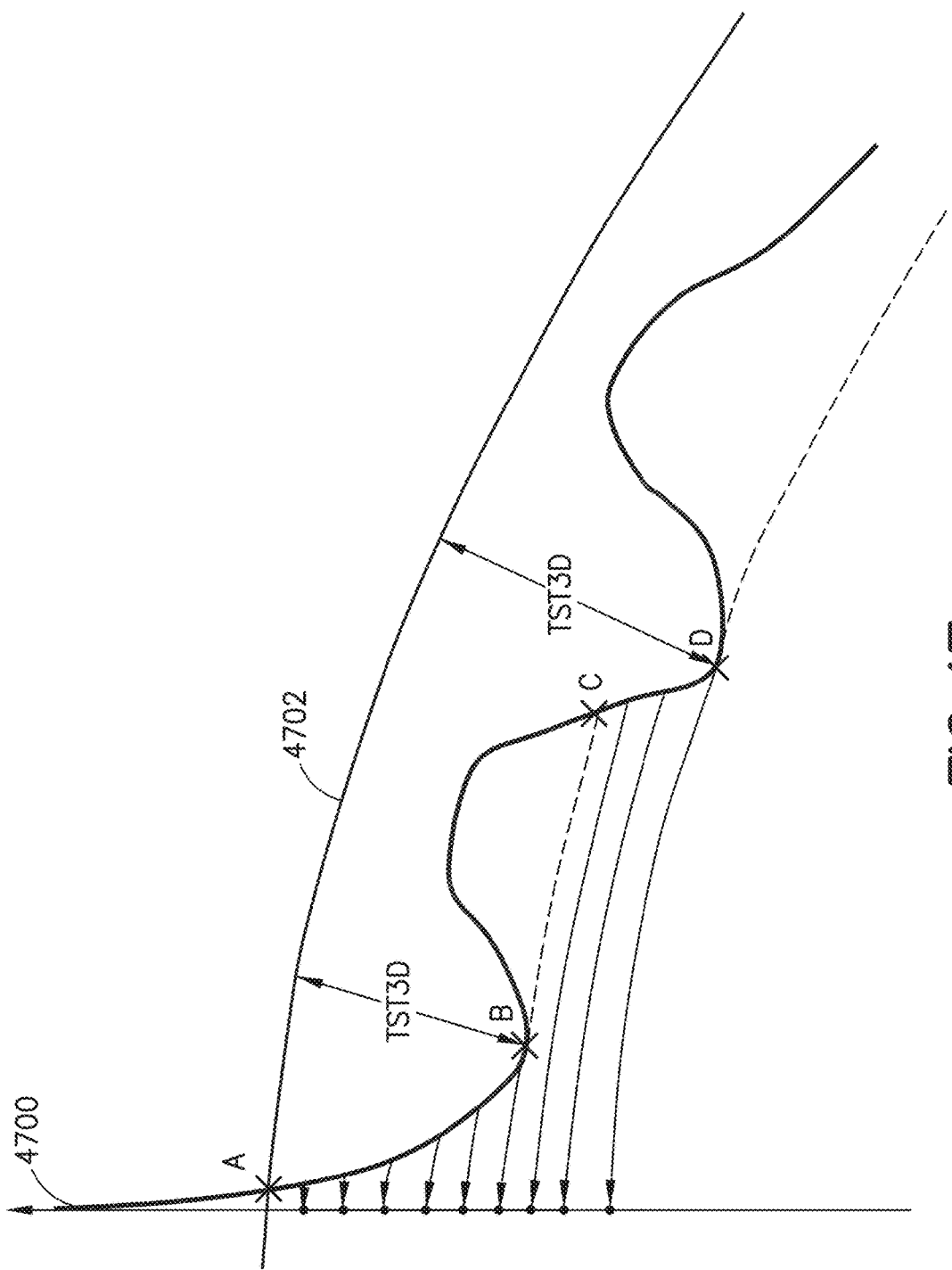
FIG. 47 is an illustration of the creation of a vertical pseudo-pilot well using TST3D based on a deviated well trajectory and a given reference surface in accordance with embodiments.

With particular respect to FIG. 47, an embodiment in which a pseudo pilot hole 4700 is created through the projection of an available horizontal GR log onto the vertical direction by following the reference surface plane 4702 using the TST3D. In some embodiments, the gamma ray samples along the wellbore are projected onto a pseudo vertical pilot hole if they correspond to the monotonic increase of the computed TST3D as the MD increases—that is, GR values along the wellbore are added to the pseudo pilot log signature if TST3D is larger than the TST3D values of all previous MD samples.

In this illustration, as the MD increases from A to B along the wellbore GR values are projected onto the vertical pseudo pilot hole because the TST3D values increase continuously. Similarly, values from C to D are added to (projected onto) the pseudo pilot log signature, because the TST3D values are greater than those at B and are increasing. However, from B to C the measurements are ignored, because the TST3D values are less than the TST at B.

Because sampling density may vary after the projection, depending on the relative angle between the wellbore and the dipping stratigraphy, an interpolation combined with resampling may be used in some embodiments to obtain evenly spaced GR samples in order to facilitate log squaring in subsequent operations.

With particular respect to FIGS. 48.1-48.3, a curtain section model generated using the dataset having no pre-existing true vertical pilot wellbore is shown. In this example, the GR log data in 4800 is used as a pseudo pilot wellbore to build the initial gamma ray model by extracting the computed TST3D along the wellbore as indicated in FIG. 47. In this model, the maximum TST lies at a MD of 1100 feet and THL is approximately 1090 feet. The curtain section in FIG. 48.2 is obtained after two consecutive automated bending operations on the surface plane with the true dip angles being 1.6 and 3.2 degrees, respectively.

With particular respect to FIGS. 49.1-49.3, the final curtain section model that results from seven consecutive automated bending operations of the reference surface used to calculate TST3D is shown. In this example, the true dip angles used to adjust the reference surface where 1.6, 3.2, 1.8, 1, 1.8, 3.4 degrees in sequence, respectively. The pseudo pilot well used in the last bending operation is shown at 4900. Note that the gamma ray signature in this pseudo pilot looks slightly different and is thicker in comparison with the pseudo pilot 4800 in FIGS. 48.1-48.3, which may be explained by the fact that the final structural model implies that the wellbore in FIGS. 49.1-49.3 intersects a thicker total stratigraphic section. In this model, the maximum TST lies at MD=1820 feet and THL approximately 1775 feet.

Summary of the TST3D Process

Figure 50A:
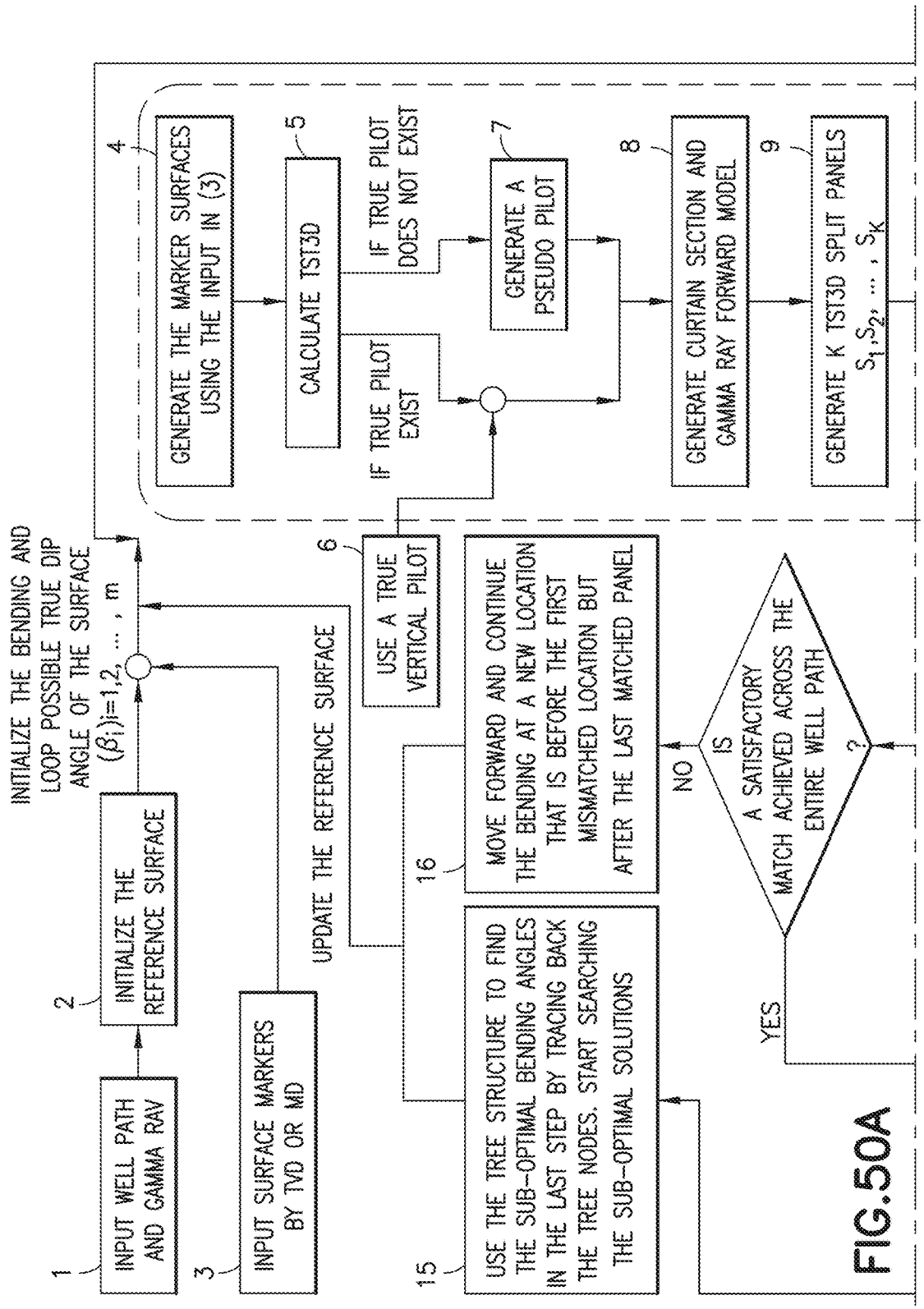

With particular respect to FIG. 50, a flow diagram of the automated TST3D work steps described above is illustrated. Beginning with process (1) in the flow diagram, well path and GR data is collected, and (2) a reference surface is defined. In process (3), surface markers are selected in the wellbore data obtained in (1), and used to generate marker surfaces in process (4). In process (5), TST3D is calculated and compared with information from either a (6) vertical pilot well, or (7) a pseudo pilot well derived from a section of a horizontal well. In process (8), a curtain section from wellbore data is compared to forward-modeled wellbore data, and is used to generate a sequence of TST3D split panels in process (9). The mismatch error is calculated in process (10); in addition, other "second-best" matches are determined in process (11). The information from processes (10) and (11) is then used to determine the position where the corresponding error occurs in the TST3D split panel data.

At this point a determination is made whether dip angles (e.g., $\beta 1, \beta 2, \beta M$) have been tested. If not, processes (4)-(12) are repeated as necessary, otherwise the operation continues to the next step. In process (13), the average mismatch error $H(\beta i)$ is ranked, where the error $H(\beta i)$ is the averaged value of the mismatched error along the consecutive split panels S1, S2, . . . SK1, which are considered to be matched satisfactorily. At this point, decision is made whether at least one optimal bending angle is obtained. If no, the operation proceeds to process (15) in which an OT is used to find the sub-optimal bending angles in the last step by tracing steps backwards through inactive tree nodes to find an optimal solution. The sub-optimal bending angle solutions are then fed back through processes (4)-(13).

When at least one optimal bending operation is achieved after process (13), the operation proceeds to process (14) in which optimal bending angles are chosen and stored into an OT. If a satisfactory match has been achieved across the entire well path, then an output is generated containing the stratigraphic profiles corresponding to the optimal mismatch errors $H(\beta i)$. If no satisfactory match has been achieved across the entire well path the operation proceeds to process (16) to continue bending operations in a new location prior to the unsatisfactory match noted in process (14) but after the last matched TST3D panel. The new location is then analyzed according to the operation outlined by processes (4)-(14).

Using Additional Constraints for Optimizing Structural Interpretation

In one or more embodiments, the automated structural interpretation process may contain a number of equivalent solutions from different bending choices (location and amount) based solely on a goodness-of-fit criteria selected by the user, such as the average relative error used in the examples provided above.

In some embodiments, subsets of selected solutions, while optimal on a local scale, may lead to either globally unacceptable or structurally incorrect interpretations. Sources of error may include, for example, (1) how well the pilot or pseudo-pilot log response matches local values due to lateral variations in formation properties and layer thickness, (2) low relative angle between the well path and the local structural dip (which creates long well intervals with minor log variation), or (3) the presence of faults. Further, while some approaches may assume that a well deviation survey is error-free, measurement-while-drilling (MWD) direction surveys may have well inclination accuracy specifications of 0.2 degrees and azimuth accuracy of 1 degree or more in some embodiments.

In the case where there is ambiguity in whether an upward or downward bend at a hinge axis would lead to a better model, additional constraints may be applied to guide the structural bending process. These constraints can include a regional dip constraint, a minimum or maximum bending limit, or a pattern matching method to find similar log signature responses based on pilot well log response or recently encountered measurements.

Local Dip Constraint

In areas where there is sufficiently dense local well coverage or with regional depth-converted 3D seismic surveys tied to well data, there may be a very good local approximation of structural dip. Borehole image data nearby may constrain estimates of local dip. If this is the case, the user may specify an approximate average dip. In some embodiments, this may allow a weighting or penalty function to be created to favor those solutions close to the regional value. As the interpretation proceeds, the average dip in the curtain section could provide a local average dip constraint as well.

Bending Limit Constraints

Similar to the local dip constraint, there may be structurally plausible limits on how much bending can be introduced from one section to another. For example, a dip change of more than 3-5 degrees between sections is less common in practice. Thus, dips of larger than 5 degrees may signal the presence of a fault. Bending limit constraints may be used in some embodiments for both panel-to-panel constraints in TST3D measurements, and globally for the entire curtain section. In some embodiments, constraints selected for the entire curtain section may specify a minimum and maximum dip that can be encountered.

Log Signature Matching Constraint

In one or more embodiments, the pattern of wellbore logs can contain clues as to the direction a well is moving with respect to a given stratigraphic section. For example, if a well path drills first down, then up through a previously encountered stratigraphic section, if there is sufficient log character, one may see a mirror-image reflection of the previous log section. Thus, changes in the length of the log signature may be an indication of relative dip difference in the current section. Pattern matching algorithms may be used to identify potential matches based on log signature that are either pattern (drilling in same direction stratigraphically) or mirror images (reversing direction stratigraphically) and use the scaling information to make an initial estimate of the dip in that section. Furthermore, after a bending operation, there may be obvious mismatches in measured vs. modeled log response that strongly suggest the best choice for the next bending operation. For example, in FIG. 43, the log mismatch in panels S6-8 show vertical (in TST3D) shifts in the location of log marker levels (e.g., around 55-65 feet in TST3D). This pattern offset suggests that a shallower bend is required to bring S6-8 into registration with the measured log response. Such log pattern matching could accelerate the interpretation in potentially ambiguous bending cases.

Manual Surface Intersection Constraints

In one or more embodiments, there may be independent evidence or a user interpretation that a particular stratigraphic marker was encountered in a well at a particular location. In such cases a user may manually insert a local marker crossing at a defined location. This may cause the average dip across the curtain section to change and should be taken into account. A marker-crossing constraint may require an interpretation to take a particular bending direction.

Incorporating Multiple Measurements into the Creation of Structural Models.

Many possible structural interpretations using the OT tree structure described above with respect to FIG. 46 may be generated first and then followed by applying forward modeling of other formation measurements, including LWD and wireline log measurements such as resistivity and density attributes, or any formation measurement described herein, to investigate whether the forward-modeled values match the real measurements.

Creation of Structural Models for Multiple Horizontal Wells

In some embodiments, at least two methods may be envisioned to generate 3D structural interpretations from information derived from multiple horizontal wells in a studied area. However, it is also envisioned that those having ordinary skill in the art may apply the general principles described herein to arrive at other variants of these methods without departing from the scope of the present disclosure.

Method 1

For each horizontal well, a curtain section model can be created using the automated work steps described above by the aid of either a true pilot well or pseudo pilot wells. In some embodiments, the starting references for an individual horizontal well may be different. Each final curtain section results in an intersection line between the updated surface and the wellbore section, which may be extracted and exported as anchor points to constrain the 3D modeling of the formation structures in a given study area. Other available data such as neighboring well tops picked from other wells and trend maps from seismic surveys may be used in some embodiments to provide further constraints about the 3D structures.

Figure 51:
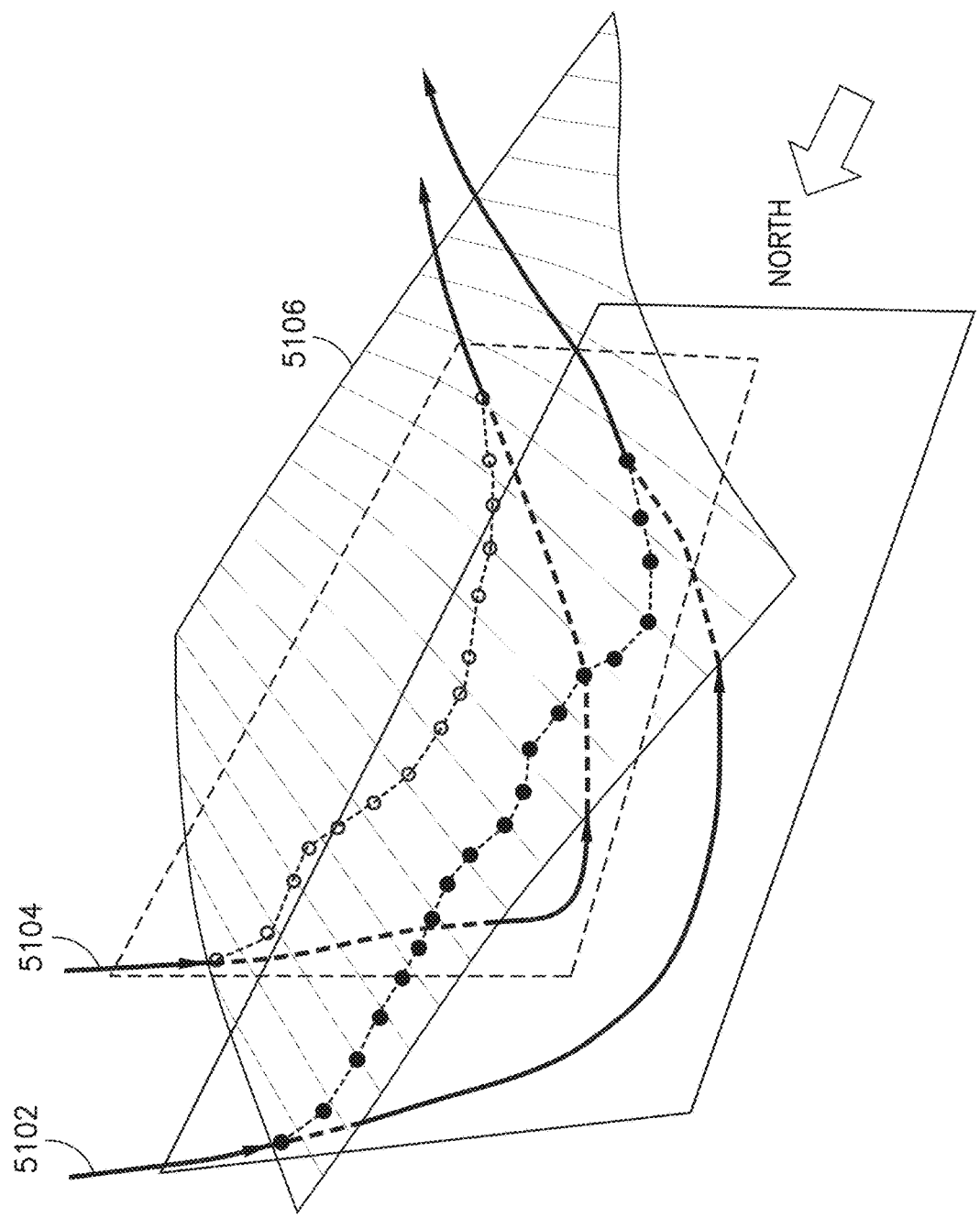
FIG. 51 is a structural interpolation for multiple deviated wells in accordance with embodiments disclosed herein.

With particular respect to FIG. 51, the construction of 3D structure models based on two horizontal wells using interpreted curtain section lines as constrained points is shown. Two horizontal wells 5102 and 5104 are treated individually to generate a curtain section that matches the gamma ray measurement using the automated work steps described above. The curtain section reference surfaces and markers are exported as anchor points to constrain the interpolation of the 3D structures in the studied area. Reference surface 5106 is the resulting 3D model.

Method 2

Other approaches in accordance with the present disclosure may use a shared reference surface when creating curtain section for each horizontal well. As the reference surface plane is bent during optimization, surface bends are applied to all or a subset of the remaining horizontal well curtain sections. In embodiments utilizing this method, consistency among the curtain sections may be improved, which may then lead to 3D structural models that are more accurate in approximating deviated wellbore trajectory. However, such approaches may have tradeoffs between time and accuracy, as calculation times may increase when optimizing operations on a reference surface that satisfies the constraints for all the horizontal wells.

In one or more embodiments, structural interpretation of deviated wells may be performed by automated methods in accordance with the present disclosure. Compared with the manual approach, automation schemes in accordance with the present disclosure may be more efficient and accurate. It allows generating alternative interpretations that match the measurement reasonably. The inputs are minimal: a horizontal well survey, gamma ray measurement, and possibly regional structural dip and surface information that can be used to help the creation of the initial reference surface for the TDT3D computation. The display of gamma ray measurement and its forwarded log by TST3D split panels provides a very useful tool that enables the automation process.

In some embodiments, the method and work steps described herein may be used to create 3D structural models for multiple horizontal wells and to match multiple measurements in an efficient fashion. Although gamma ray measurements are used for the demonstration of the workflow and in examples presented herein, other measurements acquired by formation evaluation tools known in the art may be used to perform formation interpretation and characterization of deviated and horizontal wells by following the similar procedures. Further, methods discussed herein may be used in real-time drilling in addition to studying post-drilled wellbores. In one or more embodiments, methods may include modeling a curtain section during drilling operations as data is collected (with increasing MD), such as logging-while-drilling and geosteering applications.

Some of the methods and processes described above, including processes, as listed above, can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, or general purpose computer) for executing any of the methods and processes described above. The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

In some embodiments, processes may be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Although only a few examples have been described in detail above, those skilled in the art will readily appreciate that many modifications are possible in the examples without materially departing from this subject disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

The invention claimed is:

1. A method for stratigraphic and structural modeling of a wellbore comprising:

obtaining at least one deviation survey from a wellbore through a subterranean formation;

determining a wellbore path through the subterranean formation;

defining a contoured three dimensional reference surface;

calculating a true stratigraphic thickness in three dimensions of a bed or rock body in the subterranean formation, wherein calculating the true stratigraphic thickness comprises using a shortest distance in three dimensions between the three dimensional reference surface and any point along the determined wellbore path described by a formation measurement;

generating, using an automated interpretation process, a three dimensional stratigraphic model using the computed true stratigraphic thickness in three dimensions, wherein the automated interpretation process performs a plurality of iterations matching the computed true stratigraphic thickness to the at least one deviation survey to generate the three dimensional stratigraphic model; and determining, using the automated interpretation process, a deviated wellbore path through the subterranean formation based on the generated three dimensional stratigraphic model, wherein the deviated wellbore path comprises a longer path through the bed or rock body than the determined wellbore path.

2. The method according to claim 1, wherein defining a contoured three dimensional reference surface comprises:
utilizing data from one or more selected from a group consisting of a structure map from multiple well tops or markers, mapped seismic horizon data, an arbitrary horizontal plane, and an arbitrary dipping plane.

3. The method of claim 1, wherein the formation measurement used to calculate the true stratigraphic thickness in three dimensions is one or more formation measurements selected from a group consisting of resistivity, conductivity, sonic, acoustic, density, gamma ray, neutron porosity, pressure measurements, formation fluid sampling, core sampling, and cuttings analysis.

4. The method of claim 1, further comprising basing one or more drilling calculations on the computed true stratigraphic thickness in three dimensions.

5. The method of claim 1, further comprising:
transmitting a control signal to a bottom hole assembly following the determined wellbore path, wherein the control signal corresponds to a steering command that causes the bottom hole assembly to change to the deviated wellbore path based on the generated three dimensional stratigraphic model.

6. The method according to claim 1,
wherein the three dimensional stratigraphic model comprises a plurality of sequential display panels corresponding to different intervals of the wellbore, and
wherein the plurality of iterations reduce a mismatch between the plurality of sequential display panels and the at least one deviation survey.

7. The method according to claim 1,
wherein the at least one deviation survey comprises acquired wellbore data,
wherein generating the three dimensional stratigraphic model comprises computing forward-modeled wellbore data, and
wherein the plurality of iterations match the acquired wellbore data to the forward-modeled wellbore data.

8. A method comprising the steps of:
a. obtaining at least one deviation survey from a wellbore through a subterranean formation;

b. determining a wellbore path through the subterranean formation;
c. defining a contoured three dimensional reference surface within a subterranean formation;
d. calculating a true stratigraphic thickness in three dimensions of a bed or rock body in the subterranean formation, wherein calculating the true stratigraphic thickness comprises using a shortest distance in three dimensions between the contoured three dimensional reference surface and any point along the determined wellbore path described by the at least one deviation survey;
e. generating, using an automated interpretation process, a three dimensional stratigraphic model using the computed true stratigraphic thickness in three dimensions, wherein the automated interpretation process performs a plurality of iterations matching the computed true stratigraphic thickness to the at least one deviation survey to generate the three dimensional stratigraphic model;
f. determining, using the automated interpretation process, whether the generated three dimensional model fits the wellbore path described by the at least one deviation survey; and, if fit is unsatisfactory;
g. defining a new contoured three dimensional reference surface and repeating steps (d) and (e) to generate a subsequent three dimensional stratigraphic model; and
h. determining a deviated wellbore path through the subterranean formation based on the subsequent three dimensional stratigraphic model, wherein the deviated wellbore path comprises a longer path through the bed or rock body than the determined wellbore path.

9. The method of claim 8, wherein generating a three dimensional stratigraphic model comprises:
obtaining one or more formation measurements selected from a group consisting of resistivity, conductivity, sonic, acoustic, density, gamma ray, neutron porosity, pressure measurements, formation fluid sampling, core sampling, and cuttings analysis.

10. The method of claim 8, further comprising basing one or more drilling calculations on the computed true stratigraphic thickness in three dimensions.

11. The method of claim 8, wherein determining whether the generated three dimensional model fits the wellbore path described by at least one deviation survey further comprises identifying one or more faults.

12. The method of claim 8, wherein calculating a true stratigraphic thickness in three dimensions comprises:
creating a pseudo pilot well from wellbore path described by the at least one deviation survey using computed true stratigraphic thickness in three dimensions (TST3D) split panels.

13. The method of claim 8, wherein defining a new contoured three dimensional reference surface comprises:
performing a bending operation on the reference surface to improve the fit of the subsequently generated three dimensional model and the wellbore path described by the at least one deviation survey.

14. The method of claim 13, further comprising creating an operation tree to store alternative solutions for reference surface bending angles.

15. The method of claim 13, wherein improving the fit of the subsequently generated three dimensional model and the wellbore path described by the at least one deviation survey comprises:
obtaining a value for the fit between the data from the subsequently generated three dimensional model and the data from the at least one deviation survey that is within one or more user-defined constraints selected from a group consisting of a regional dip constraint, a minimum bending limit, a maximum bending limit, and a pattern matching method to find similar log signature responses.

16. The method of claim 8, wherein determining whether the generated three dimensional model fits the wellbore path described by the formation measurement further comprising identifying one or more faults.

17. A method comprising the steps of:
obtaining at least one deviation survey from a wellbore through a subterranean formation;
determining a wellbore path through the subterranean formation;
obtaining at least one formation measurement;
defining a three dimensional reference surface using the at least one formation measurement; and
performing the steps of:
a. computing a true stratigraphic thickness in three dimensions of a bed or rock body in the subterranean formation, wherein computing the true stratigraphic thickness comprises using a shortest distance in three dimensions between the contoured three dimensional reference surface and any point along the determined wellbore path described by the at least one deviation survey;
b. generating, using an automated interpretation process, a three dimensional stratigraphic model using the computed true stratigraphic thickness in three dimensions, wherein the automated interpretation process performs a plurality of iterations matching the computed true stratigraphic thickness to the at least one deviation survey to generate the three dimensional stratigraphic model;
c. determining, using the automated interpretation process, whether the generated three dimensional model fits the determined wellbore path described by the at least one formation measurement; and
d. determining, in response to the generated three dimensional model fitting the determined wellbore path, determining a deviated wellbore path through the subterranean formation based on the generated three dimensional stratigraphic model, wherein the deviated wellbore path comprises a longer path through the bed or rock body than the determined wellbore path.

18. The method of claim 17, wherein the at least one single channel log measurement is one or more selected from a group consisting of a wireline log and a wellbore imaging log.

19. The method of claim 17, further comprising:
providing a steering command to a bottomhole assembly based on the generated three dimensional stratigraphic model.

20. The method of claim 17, wherein determining whether the generated three dimensional model fits the wellbore path described by the at least one single channel log measurement further comprises:
calculating a log of true stratigraphic thickness in three dimensions (TST3D),
displaying the calculated log of TST3D,
splitting the calculated log of TST3D into sequential panels, and
correlating the sequential panels to identify possible faults.

21. The method of claim 17, further comprising:
redefining the contoured three dimensional reference surface and repeating steps (a)-(c), wherein redefining the contoured three dimensional reference surface comprises performing a bending operation on the contoured three dimensional reference surface to improve the fit of the subsequently generated three dimensional model and the wellbore path described by the at least one single channel log measurement.

22. The method of claim 21, further comprising:
creating an operation tree to store alternative solutions for reference surface bending angles.

\* \* \* \* \*